(12) United States Patent
Nakazato et al.

(10) Patent No.: US 8,339,637 B2
(45) Date of Patent: Dec. 25, 2012

(54) MANAGEMENT APPARATUS, MANAGEMENT SYSTEM, OPERATION STATUS DETERMINATION METHOD, AND IMAGE FORMING APPARATUS

(75) Inventors: Yasushi Nakazato, Tokyo (JP); Takenori Oku, Saitama (JP); Jun Yamane, Kanagawa (JP); Osamu Satoh, Kanagawa (JP); Kohji Ue, Kanagawa (JP); Masahide Yamashita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 564 days.

(21) Appl. No.: 12/184,734

(22) Filed: Aug. 1, 2008

(65) Prior Publication Data

US 2009/0033993 A1 Feb. 5, 2009

(30) Foreign Application Priority Data

Aug. 3, 2007 (JP) ................................. 2007-203206
Nov. 22, 2007 (JP) ................................. 2007-303505

(51) Int. Cl.
*G01B 5/28* (2006.01)
*G06K 15/00* (2006.01)
(52) U.S. Cl. ........ 358/1.15; 702/35; 358/1.14; 358/1.16
(58) Field of Classification Search ................ 358/1.14, 358/1.13, 1.16; 702/35
See application file for complete search history.

(56) References Cited

U.S. PATENT DOCUMENTS

| | | | | |
|---|---|---|---|---|
| 2003/0002065 A1* | 1/2003 | Tanaka | ......................... | 358/1.14 |
| 2004/0044484 A1* | 3/2004 | Obara et al. | ..................... | 702/35 |
| 2006/0182451 A1 | 8/2006 | Shoji et al. | | |
| 2006/0294252 A1 | 12/2006 | Shoji et al. | | |
| 2007/0258723 A1 | 11/2007 | Nakazato et al. | | |
| 2008/0068639 A1 | 3/2008 | Satoh et al. | | |
| 2008/0075476 A1 | 3/2008 | Nakazato et al. | | |
| 2008/0309958 A1* | 12/2008 | Nagasaka | ..................... | 358/1.13 |

FOREIGN PATENT DOCUMENTS

| | | |
|---|---|---|
| JP | 59-95269 U | 6/1984 |
| JP | 5-100517 | 4/1993 |
| JP | 5-164800 | 6/1993 |
| JP | 5-281809 | 10/1993 |
| JP | 5-323740 | 12/1993 |
| JP | 7-36323 | 2/1995 |
| JP | 7-104616 | 4/1995 |

(Continued)

OTHER PUBLICATIONS

U.S. Appl. No. 12/031,453, filed Feb. 14, 2008, Yasushi Nakazato, et al.

(Continued)

*Primary Examiner* — Charlotte M Baker
*Assistant Examiner* — Justin Katzwhite
(74) *Attorney, Agent, or Firm* — Oblon, Spivak, McClelland, Maier & Neustadt, L.L.P.

(57) ABSTRACT

A data collecting unit receives a plurality of types of status data from an image forming apparatus and stores the status data in a status database. A data generating unit generates a plurality of types of target data for determining a maintenance sign, based on the status data. A first determining unit determines whether each of the status data exceeds a predetermined reference value. A second determining unit performs weighted majority decision based on a determination result from the first determining unit and a weight value set for each of the status data, and determines whether there is a maintenance sign taking all the status data into consideration.

20 Claims, 28 Drawing Sheets

FOREIGN PATENT DOCUMENTS

| | | |
|---|---|---|
| JP | 7-104619 | 4/1995 |
| JP | 8-137344 | 5/1996 |
| JP | 11-296027 | 10/1999 |
| JP | 2000-89623 | 3/2000 |
| JP | 2001-175328 | 6/2001 |
| JP | 2001-356655 | 12/2001 |
| JP | 2003-215986 | 7/2003 |
| JP | 2004-219617 | 8/2004 |
| JP | 2005-17874 | 1/2005 |
| JP | 2005-157679 | 6/2005 |
| JP | 3831143 | 7/2006 |

OTHER PUBLICATIONS

Shinto Eguchi, "Information Geometry for Statistical Pattern Recognition-U-boost learning algorithm", Saiensu-sha Co., Ltd., Mar. 2004, pp. 1-7 (With English Translation).

Japanese Office Action issued May 1, 2012, in Patent Application No. 2007-303505.

* cited by examiner

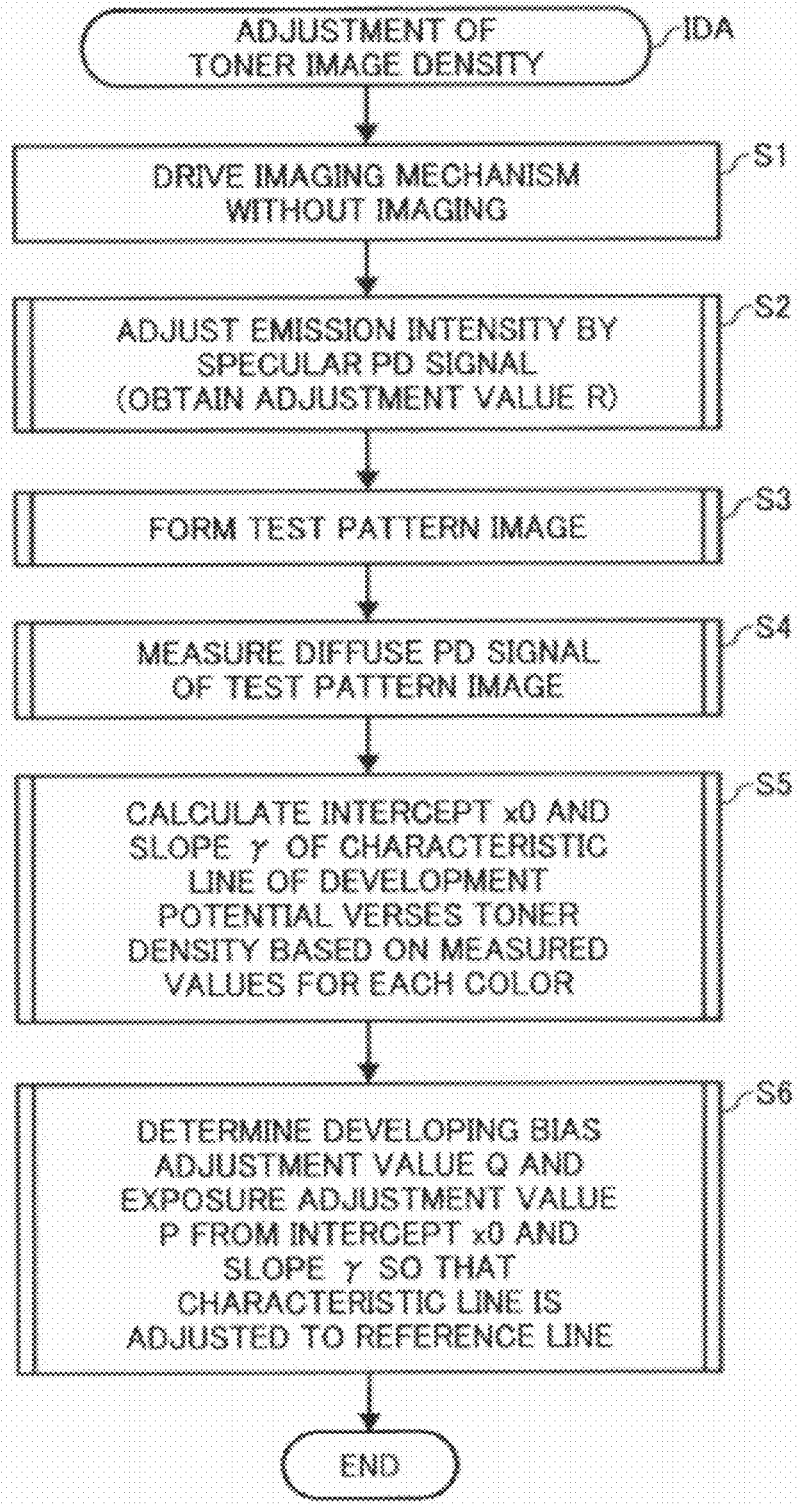

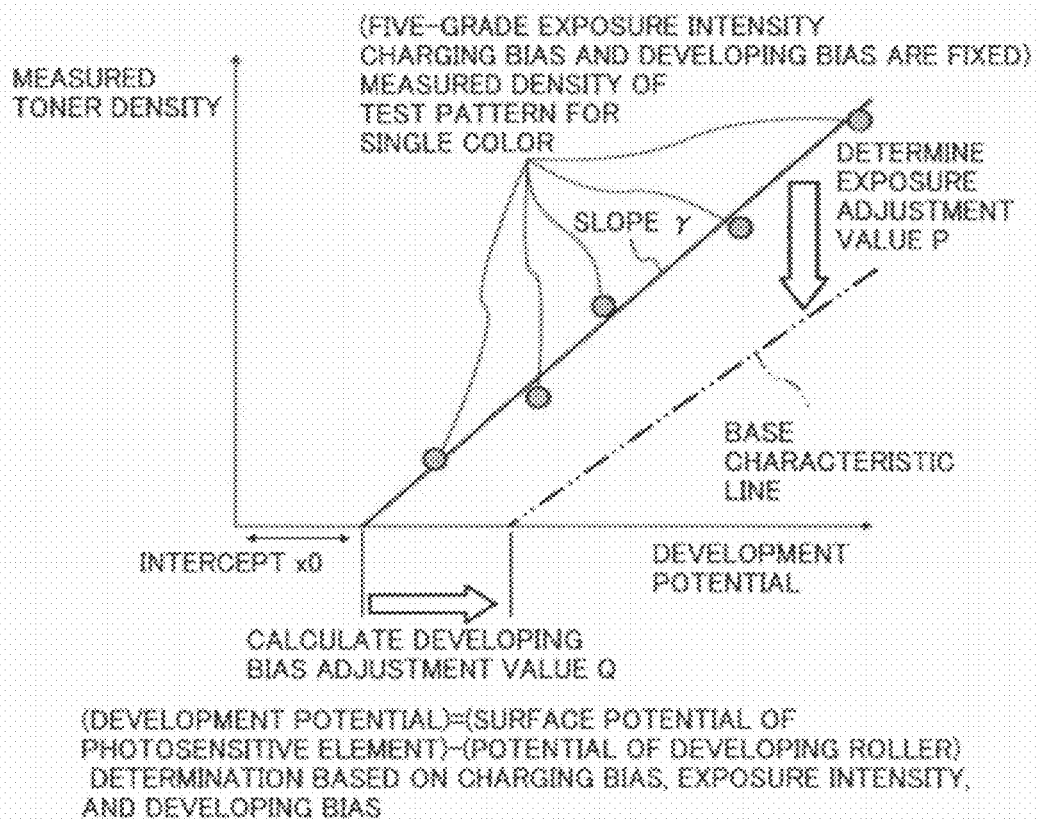

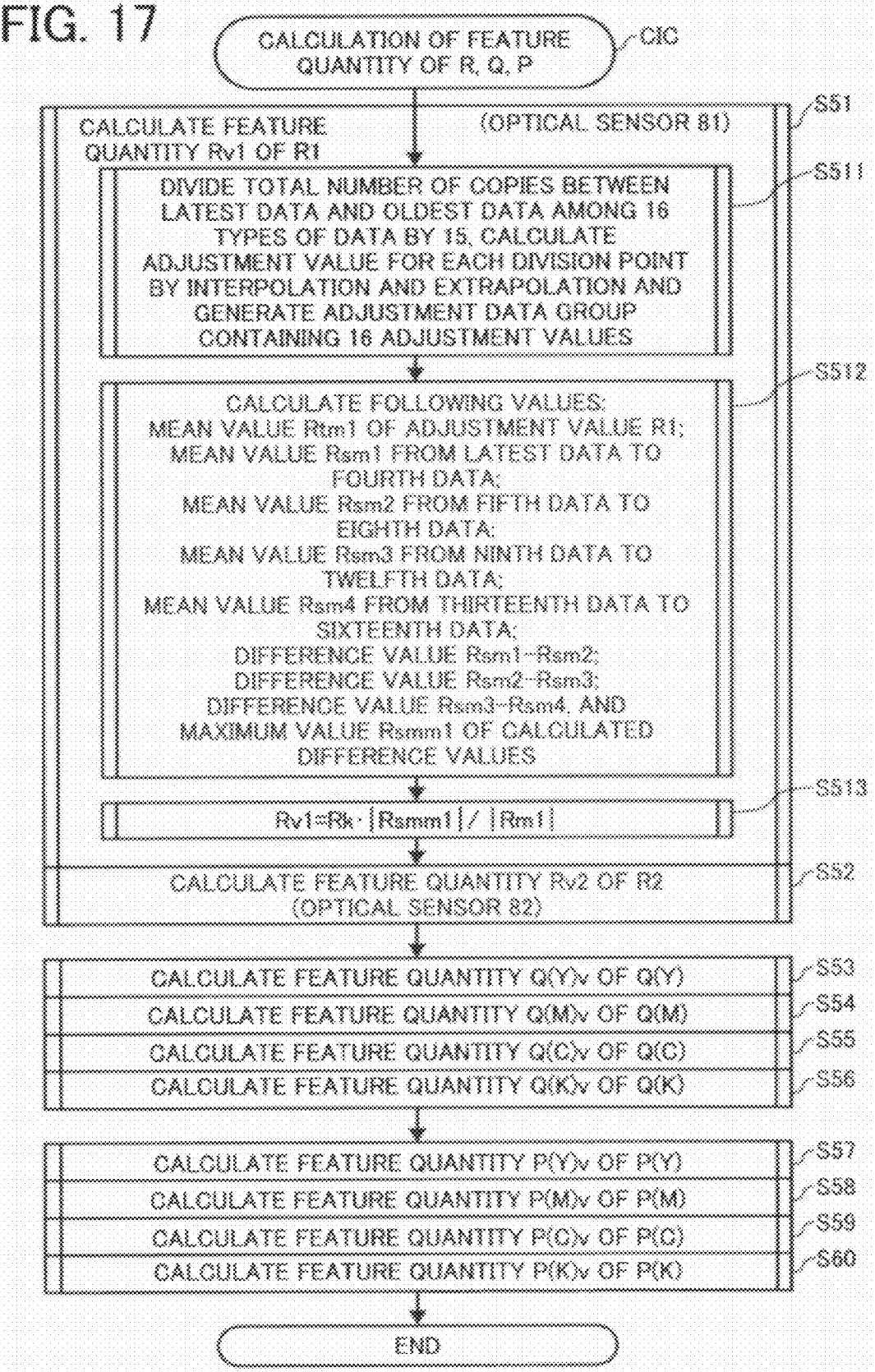

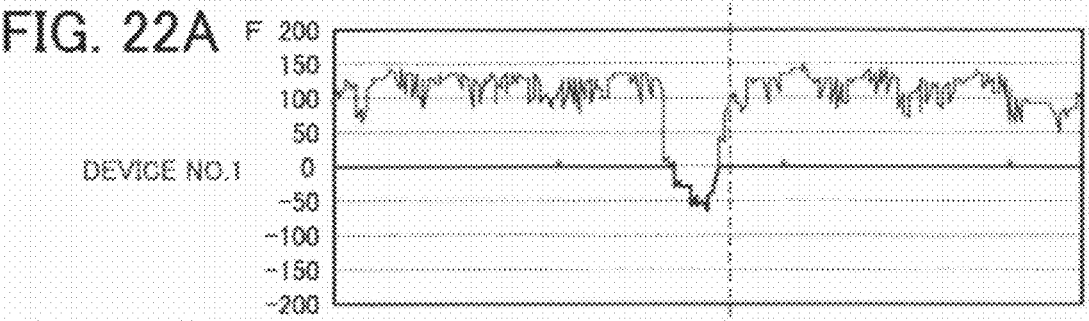
FIG. 22A DEVICE NO.1
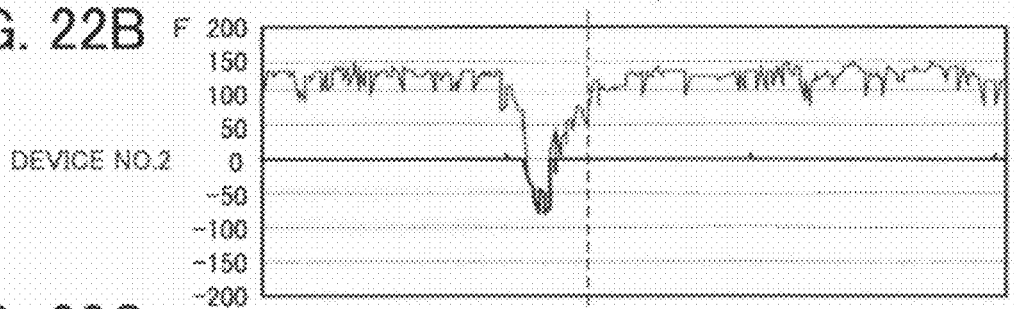
FIG. 22B DEVICE NO.2
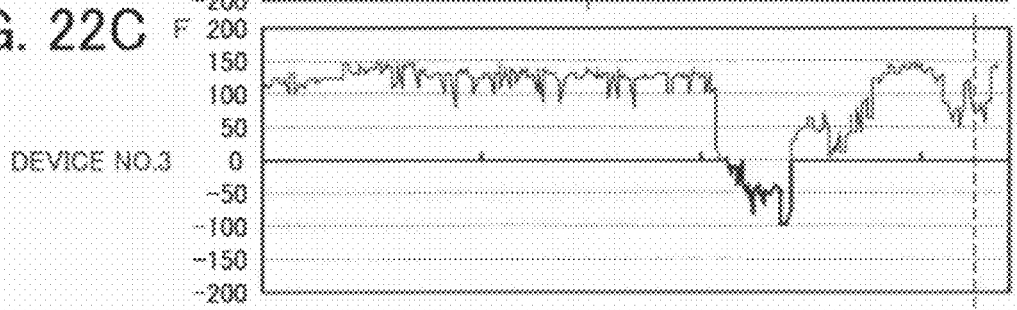
FIG. 22C DEVICE NO.3
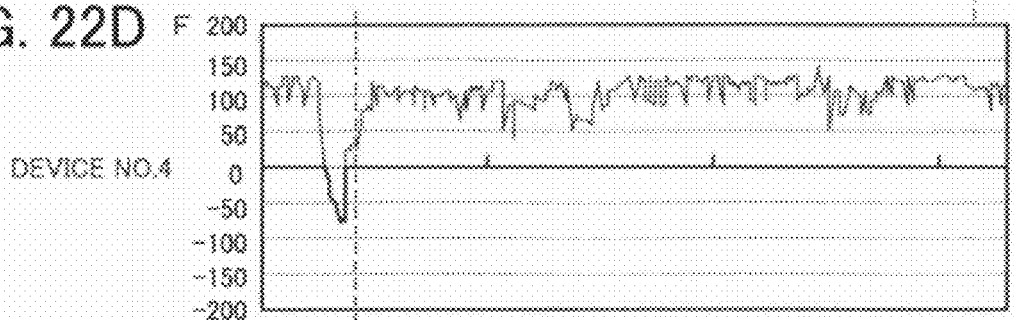
FIG. 22D DEVICE NO.4
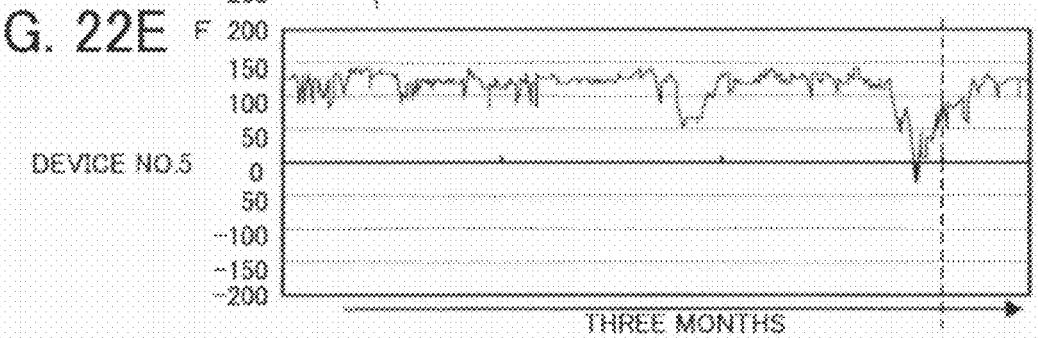
FIG. 22E DEVICE NO.5

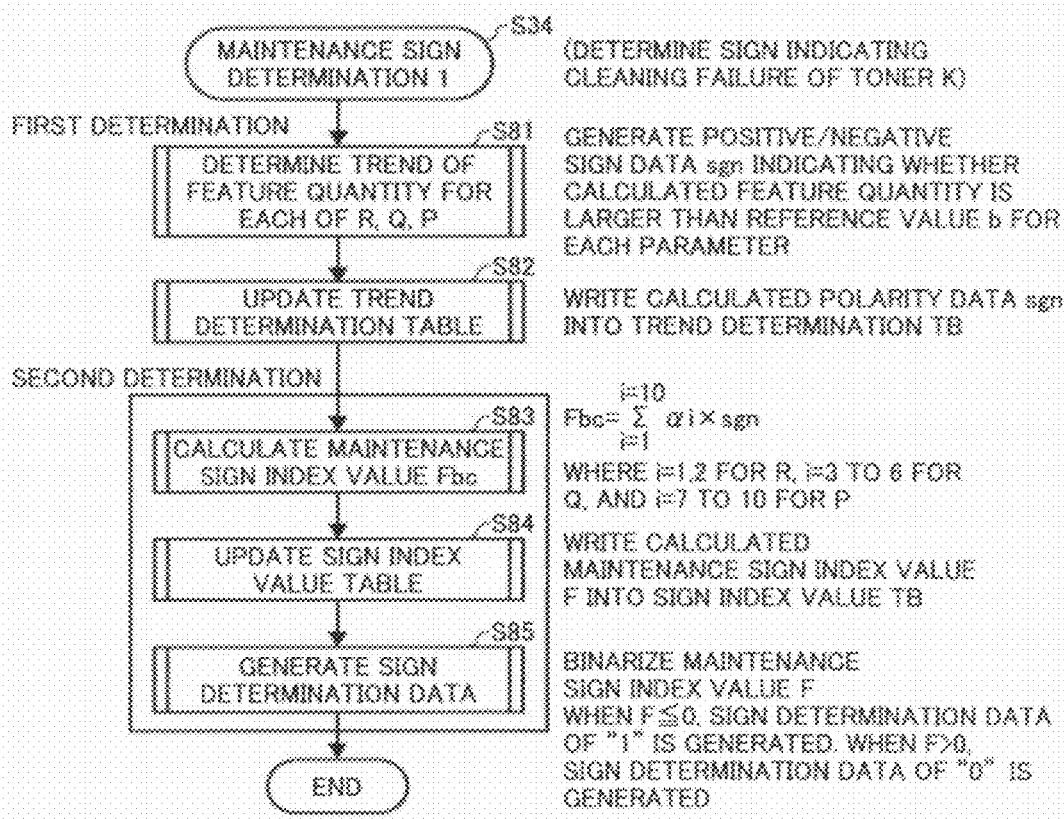

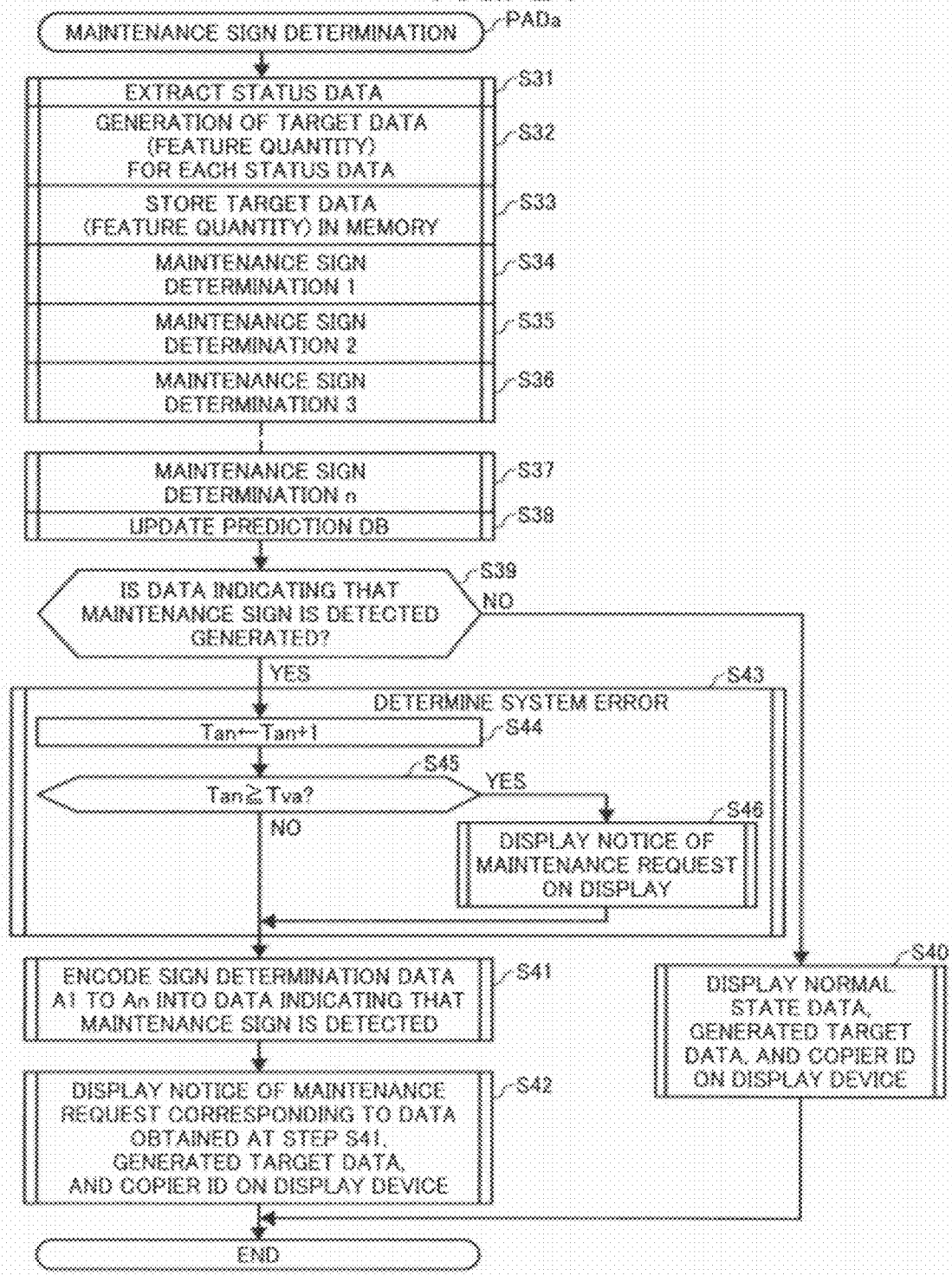

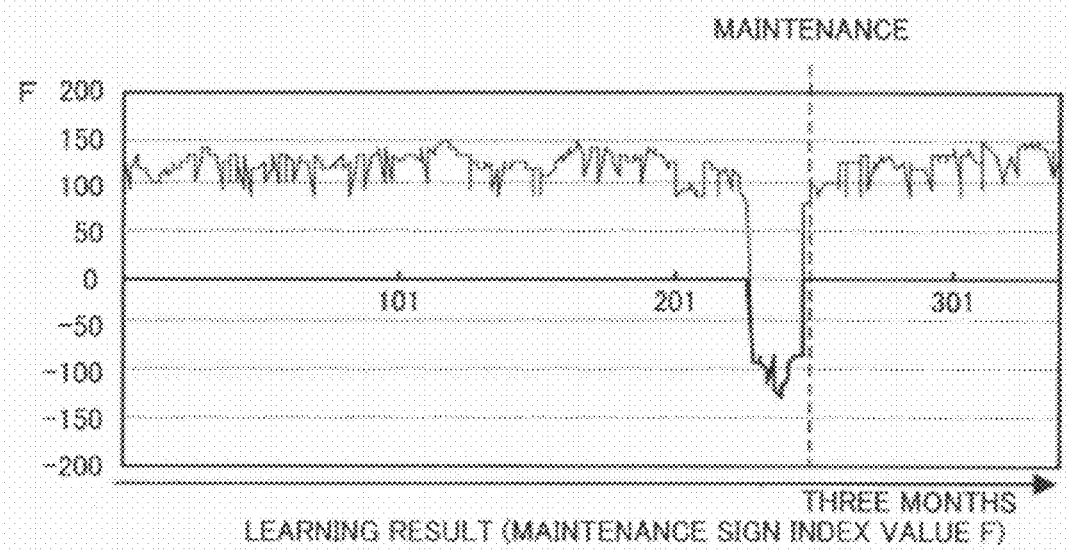

MANAGEMENT APPARATUS, MANAGEMENT SYSTEM, OPERATION STATUS DETERMINATION METHOD, AND IMAGE FORMING APPARATUS

CROSS-REFERENCE TO RELATED APPLICATIONS

The present application claims priority to and incorporates by reference the entire contents of Japanese priority document 2007-203206 filed in Japan on Aug. 3, 2007 and Japanese priority document 2007-303505 filed in Japan on Nov. 22, 2007.

BACKGROUND OF THE INVENTION

1. Field of the Invention

The present invention relates to a management apparatus, a management system, an operation status determination method, and an image forming apparatus.

2. Description of the Related Art

In electrophotographic image forming apparatuses, such as copiers, printers, facsimile apparatuses, or printing presses, an image is formed such that an electrostatic latent image of image data of an original is firstly formed on a photosensitive element that serves as a latent image carrier. The electrostatic latent image is then developed with toners supplied from a developing device. A developed image is lastly fixed on a recording medium such as a sheet. In such image forming apparatuses, various events may cause degradation of performance of the image forming apparatuses. For example, if an image forming apparatus includes an image carrier, such as a photosensitive element or an intermediate transfer belt, the image carrier is worn out because of friction by operation over time. Furthermore, abnormal situations occur in the image forming apparatus due to various reasons. For example, the dusts such as paper pieces from externals to an inside of the image forming apparatus may cause a failure. Toners are undesirably remained on the components because of increased toner adhesion due to excessive toner agitation caused by unexpected operation. Arrangements of components are disturbed due to unexpected operation. A cleaning unit is worn out and fails to remove toners. Performance of a charging unit is degraded due to dusts or an accidental event.

One outcome of such abnormal situations is degradation of image quality of an obtained image. For example, the obtained image contains a disturbing portion such as an unwanted line in a longitudinal direction or in a lateral direction, a faint portion, a stain, a pinhole, or a background fog. However, the image forming apparatus keeps performing operation even in the abnormal situation as long as mechanical components work. Therefore, only after the incomplete image is output, a user can recognize presence of an abnormality or occurrence of a failure in the image forming apparatus. At this state, the image forming apparatus needs to be recovered and the user needs to form the image again, so that a large amount of time and resources are consumed. The electrophotographic image forming apparatus generally has a complicated structure containing a large number of components. The components are subjected to various events that may cause a failure. Therefore, maintenance needs to be performed regularly to prevent occurrence of a failure.

Conventional technologies for predicting occurrence of a failure based on status data of an image forming apparatus so that effective service operation can be attained are disclosed in the following documents.

For example, Japanese Patent Application Laid-open No. 2003-215986 discloses a system that predicts a failure based on the number of occurrence of events indicative of a failure.

In the system, data to be collected is limited to the number of occurrence of events. Therefore, types of failures to be predicted are limited.

Furthermore, Japanese Patent Application Laid-open No. H5-164800 discloses a diagnosis method and a diagnosis apparatus. In this technology, data indicative of occurrence of a failure in a copier and status data of the copier are collected on a server, and a cause of a particular error is detected by statistical processing.

In this technology, data is transmitted from the copier to the server via a network, causing an increase of network loads. Furthermore, the server needs to integrally perform processing on a large amount of copiers, so that capacity of the server needs to be large enough to perform a large amount of calculations, increasing system configuration costs.

Moreover, Japanese Patent Application Laid-open No. 2001-175328 discloses a system and a method for detecting a cause of a failure in a single copier by integrally using data about sensors and counters in the copier. Specifically, a virtual sensor based on quantitative analysis using a hybrid diagnosis is arranged, data is formatted by an event generator, and the diagnosis system as a qualitative analysis device is used in a hybrid manner to diagnose a failure or predict a failure.

In this method, a maintenance sign determination is performed by a copier, so that loads on a management system is small. However, the maintenance sign determination is executed using a method that causes large calculation loads, such as a neutral network or a Bayesian inference. Therefore, loads on a processing device or a memory device in the copier increase, causing delay in operation of the copier, such as image processing or mechanical control, resulting in decrease of a processing speed.

Furthermore, Japanese Patent Application Laid-open No. 2005-17874 discloses a technology for predicting a failure. Specifically, a signal indicating a failure is detected first from among signals output from various sensors in an image forming apparatus (sign detection). Then, an index value is calculated based on various types of data, so that change of status of the image forming apparatus is determined based on data indicating how the index value changes over time.

In this technology, it is possible to determine whether a device is in a normal state, a failure state, or a maintenance sign detected state, using a statistical and mathematical method by digitizing a status signal obtained from a sensor or operation control data. In this state, a status index is generated based on a distance between status data using a method such as Fisher's linear discriminant or cluster analysis. In this method, status data is normalized for appropriately generating a homogeneous space to generate a status index based on a distance between status data in different units. However, the effective normalization methods are limited. Therefore, sufficient results cannot always be obtained. For example, in the MT method, data is normalized based on variation in a normal state using a Mahalanobis distance. However, this method is not always effective. Alternatively, it is possible to determine whether a maintenance sign is detected by qualitatively evaluating operation control data or a status signal obtained from a sensor. However, it is difficult to generate a method for appropriately evaluating a plurality of pieces of status data that largely change and in different units for an image forming apparatus having a complicated structure. Therefore, it takes a long time to perform maintenance sign determination, so that unnecessary operation may be performed during the long maintenance sign determination. Furthermore, outcome of the maintenance sign determination does not always match an actual operation status of a device. In this case, a diagnosis needs to be made through a trial and error process. Therefore, the diagnosis cannot be performed in a practical manner and even a diagnosis control device or the like needs to be provided. As a result, necessary costs increase.

Japanese Patent Application Laid-open No. H5-281809 discloses a method of detecting a failure on a particular unit or a component in an image forming apparatus.

Furthermore, Japanese Patent Application Laid-open No. H5-100517, Japanese Patent Application Laid-open No. H7-36323, Japanese Patent Application Laid-open No. H7-104616, Japanese Patent Application Laid-open No. 2001-356655, or Japanese Patent Application Laid-open No. 2000-270141 discloses a method for predicting a lifetime of a particular unit or a component in an image forming apparatus or a method for diagnosing occurrence of a failure based on the lifetime.

Moreover, Japanese Patent Application Laid-open No. H8-137344, or Japanese Patent Application Laid-open No. 2000-89623 discloses a method for detecting abnormality on a toner image caused by a failure in an image forming apparatus.

Furthermore, Japanese Patent Application Laid-open No. H5-323740, Japanese Patent Application Laid-open No. H7-104619, Japanese Patent Application Laid-open No. 2004-219617 discloses a method for optically detecting a state of the surface of a photosensitive element.

The image forming apparatuses are used in various locations such as offices or factories. Furthermore, environmental or mechanical conditions such as temperature, humidity, type of sheets, operation amount, or image patterns depend on locations or users of the image forming apparatuses. Because of variation in the conditions, statuses of the components or supplies (e.g., toners, developers, charging units, photosensitive elements, or cleaners) in the image forming apparatuses may be disturbed depending on time, places, or the like, so that prompt maintenance is necessary. However, with the conventional technologies, it is difficult to appropriately recognize a sign of a failure in consideration with various conditions. Therefore, it is difficult to promptly perform maintenance.

SUMMARY OF THE INVENTION

It is an object of the present invention to at least partially solve the problems in the conventional technology.

According to an aspect of the present invention, there is provided a management apparatus including a data collecting unit that receives a plurality of types of status data from an image forming apparatus and stores the status data in a status database; a data generating unit that generates a plurality of types of target data for determining a maintenance sign, based on the status data; a first determining unit that determines whether each of the status data exceeds a predetermined reference value; and a second determining unit that performs weighted majority decision based on a determination result from the first determining unit and a weight value set for each of the status data, and determines whether there is a maintenance sign taking all the status data into consideration.

Furthermore, according to another aspect of the present invention, there is provided a management apparatus including a data collecting unit that receives a plurality of types of status data from an image forming apparatus and stores the status data in a status database; a data generating unit that generates a plurality of types of target data for determining a maintenance sign, based on the status data, which includes a feature extracting unit that generates temporal target data indicating a temporal transition of the status data based on a predetermined number of pieces of status data selected backwards by time from temporally latest status data; a first determining unit that determines whether each of the status data exceeds a predetermined reference value; and a second determining unit that performs weighted majority decision based on a determination result from the first determining unit and a weight value set for each of the status data, and determines whether there is a maintenance sign taking all the status data into consideration. The image forming apparatus includes a photosensitive element, a charging unit that charges a surface of the photosensitive element, an exposing unit that applies a light on the surface of the photosensitive element charged by the charging unit to form an electrostatic latent image, a developing unit that develops the electrostatic latent image formed on the photosensitive element with toner, to form a toner image, a transferring unit that transfers the toner image formed on the photosensitive element onto a recording sheet via an intermediate transfer member, an optical sensor that applies a first light onto a surface of the intermediate transfer member and detects density of the toner image on the intermediate transfer member, an intensity adjusting unit that adjusts light intensity of a reflected light of the first light to a reference level, and a density adjusting unit that adjusts density of a toner image of a test pattern formed on the intermediate transfer member by adjusting a developing bias of the developing unit and exposure intensity of the exposing unit based on a value detected by the optical sensor. The status data contains at least one of a first physical parameter indicative of a result of adjustment of light intensity by the optical sensor and a second physical parameter indicative of a result of adjustment of density by the density adjusting unit. The feature extracting unit generates the temporal target data for each of the first physical parameter and the second physical parameter. The first determining unit makes a determination on each of the first physical parameter and the second physical parameter. The second determining unit performs weighted majority decision and makes a determination based on the first physical parameter and the second physical parameter.

Moreover, according to still another aspect of the present invention, there is provided an operation status determination method including extracting a plurality of status signals based on an output of at least one sensor; calculating a temporal feature amount of each of the status signals; generating a determining device for each temporal feature amount; and determining an operation status of a device by performing weighted majority decision on a determination result from the determining device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart of a process of adjusting density of a toner image by an engine control board shown in FIG. 8;

FIG. 10 is a graph of a relationship (a characteristic line) between a development potential at a time of forming a toner image of a test pattern on the intermediate transfer belt and density of the toner image detected by the optical sensors;

FIG. 17 is a flowchart of a process of generating target data (feature amount) of an emission intensity adjustment value of the optical sensors, a developing bias adjustment value for each color, and an exposure adjustment value for each color;

FIGS. 22A to 22E are graphs representing changes of maintenance sign index values in five different copiers;

FIG. 23 is a flowchart of a processing procedure of the maintenance sign determination shown in FIG. 16;

FIG. 24 is a flowchart of maintenance sign determination performed by a management apparatus according to a fourth embodiment of the present invention;

FIG. 29 is a graph representing data obtained based on learning data used when updating data for maintenance sign determination.

DETAILED DESCRIPTION OF THE PREFERRED EMBODIMENTS

Exemplary embodiments of the present invention are explained in detail below with reference to the accompanying drawings.

Figure 1:
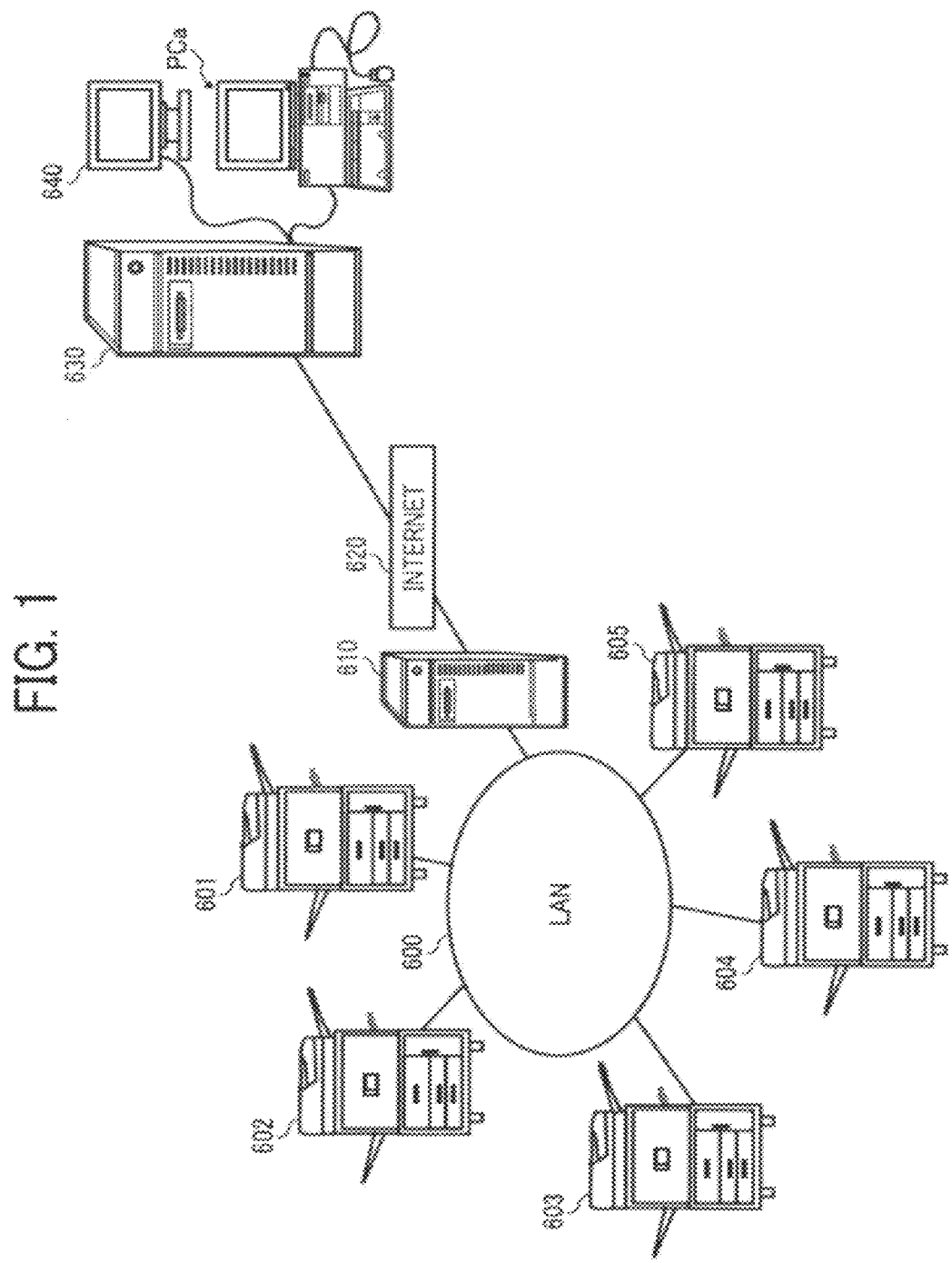
FIG. 1 is a schematic diagram of a management system according to a first embodiment of the present invention.

FIG. 1 is a schematic diagram of a copier management system that includes a multifunction copier 601 according to a first embodiment of the present invention. The copier 601 is an image forming apparatus and connected to a server 610 and copiers 602 to 605 that have the same functions as those of the copier 601 via a LAN 600. The copier 601 is also connected to a management apparatus 630 outside of the LAN 600 via a network such as the Internet 620. Each of the copiers 601 to 605 transmits status data about status of each copier to the management apparatus 630 at a predetermined timing. The predetermined timing is, for example, when the total number of copies exceeds a set value and right after an operating voltage is turned ON or printing operation is finished.

Figure 14:
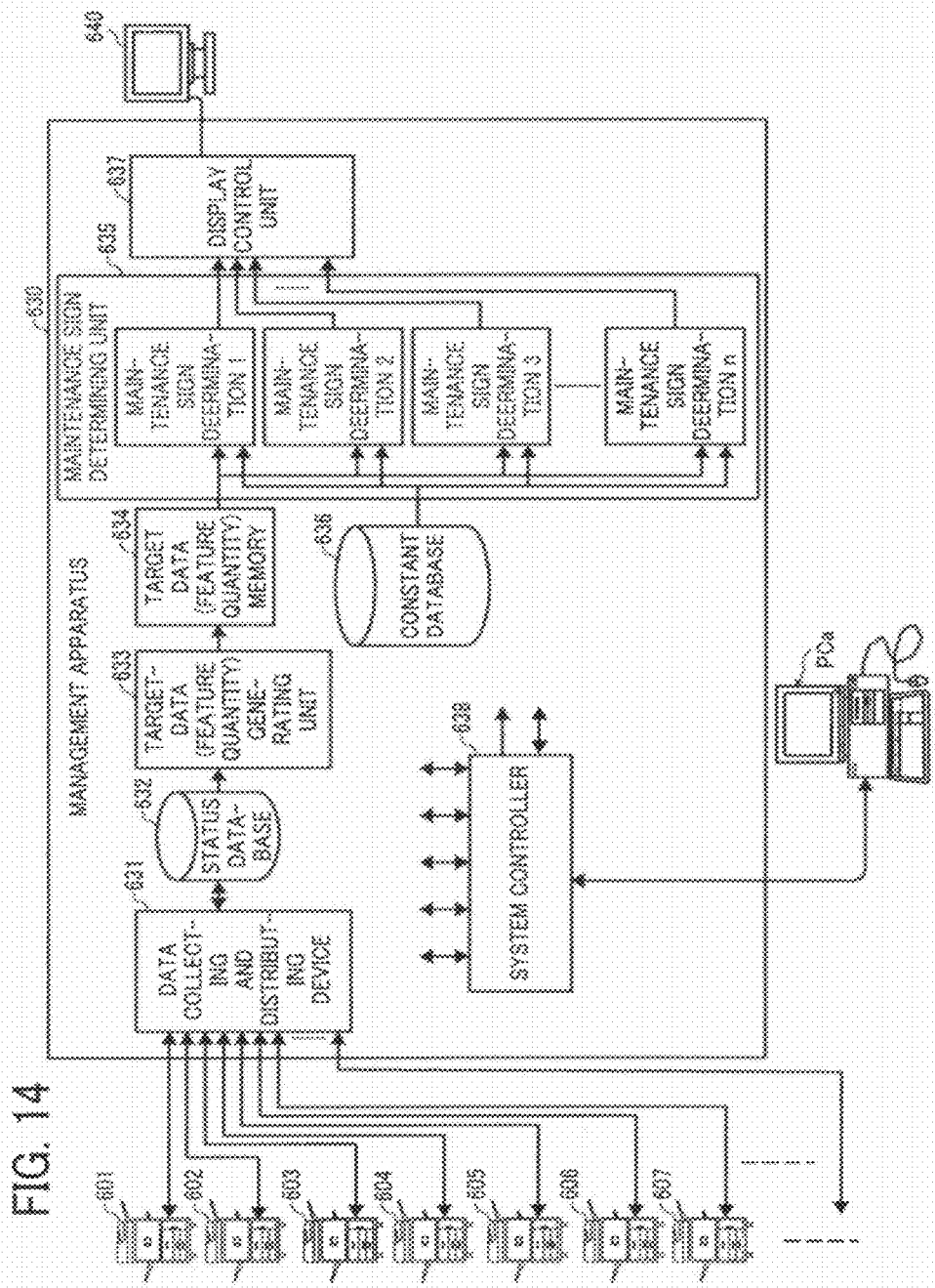
FIG. 14 is a block diagram of a management apparatus shown in FIG. 1.
Figures 19, 20:
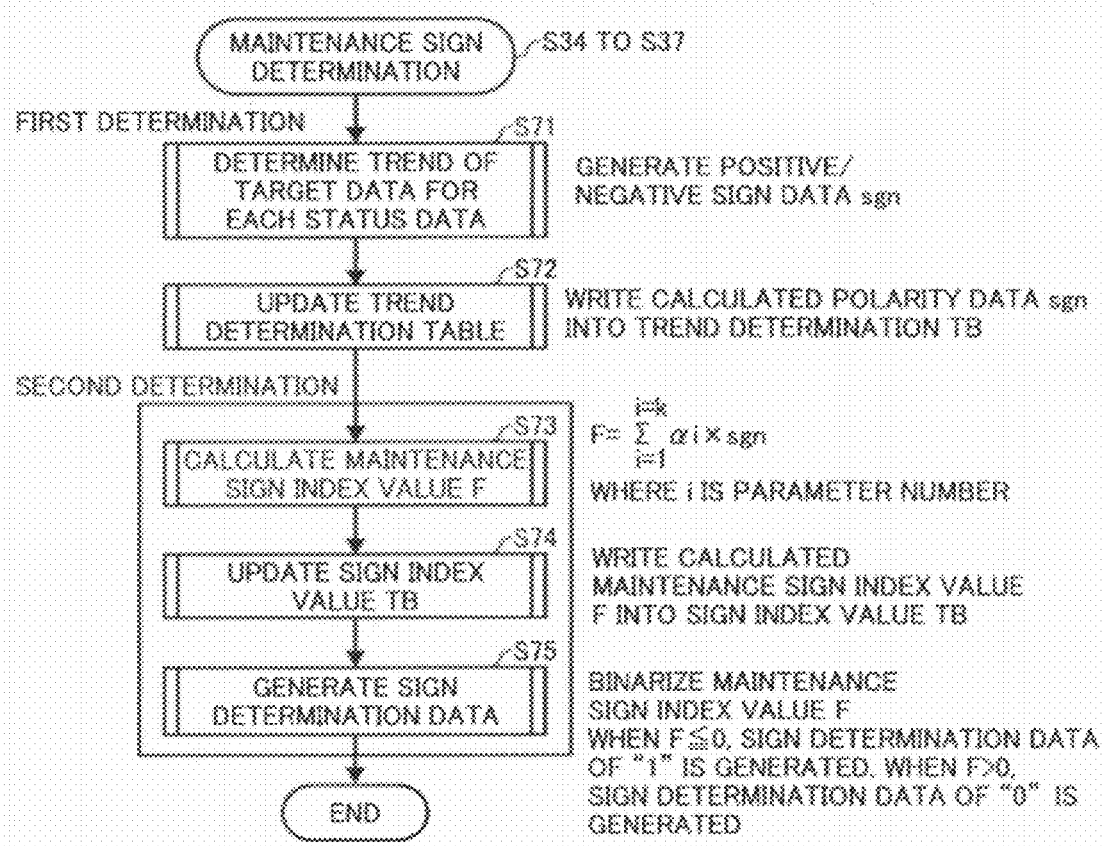
FIG. 19 is a flowchart of data processing commonly performed in maintenance sign determination 1 to n shown in FIG. 16.
FIG. 20 is an example of a sign determination reference table containing a reference value for determining a maintenance trend for each target data and a weight value to be added to the maintenance trend when calculating a maintenance sign index value.

The management apparatus 630 includes, as shown in FIG. 14, a status database 632 that stores therein status data, a feature amount extracting unit (a target-data generating unit 633), a maintenance sign determination system (PAD shown in FIG. 16) that includes a first determining unit (not shown) and a second determining unit (not shown). The management apparatus 630 performs maintenance sign determination on each of copiers to be managed. The management apparatus 630 stores therein a software program of the maintenance sign determination PAD and a sign determination reference table (FIG. 20). The software program of the maintenance sign determination PAD is executed using the feature amount extracting unit (the target-data generating unit 633) and a maintenance sign determining unit 635 that includes the first determining unit and the second determining unit. The sign determination reference table (FIG. 20) is a reference data group of the maintenance sign determining unit 635. A determination result obtained by the maintenance sign determination system and indicating that a maintenance sign is detected is displayed on a display device 640 of the management apparatus 630, in association with an identification data (ID) of a target copier. An operator of the management apparatus 630 informs a responsible service center that the target copier need to be maintained, and takes necessary counteractions such as order of necessary parts. If an event related to a maintenance sign can be resolved by users, the operator requests an administrator of the target copier to instruct the users about maintenance. Then, the users can resolve the maintenance sign by using a copier operation manual or an electronic manual installed in an operation board 500.

The management apparatus 630 is connected to a personal computer PCa that is operated by an operator. Operations such as generation or correction of the maintenance sign determining unit 635 and the sign determination reference table (FIG. 20) can be performed by the personal computer PCa based on each copier's status data stored in a database in the management apparatus 630. Furthermore, the maintenance sign determination system (PAD in FIG. 16) of the management apparatus 630 can be updated by the personal computer PCa based on the status data. Specifically, it is possible to add or delete the maintenance sign determining unit 635 and the sign determination reference table (FIG. 20) to or from the management apparatus 630.

Figure 2:
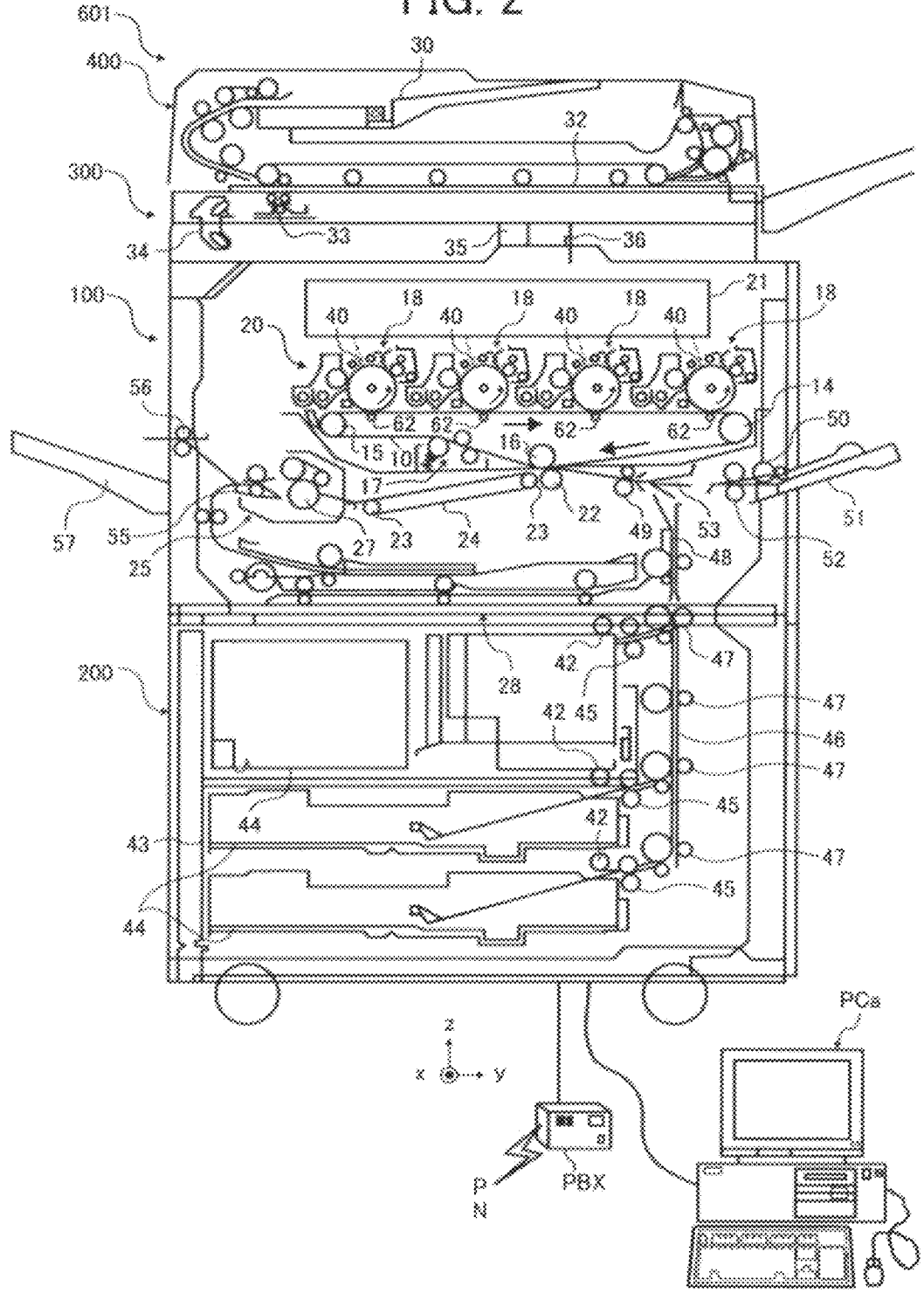
FIG. 2 is a side view of a multifunction color copier shown in FIG. 1.
Figure 8:
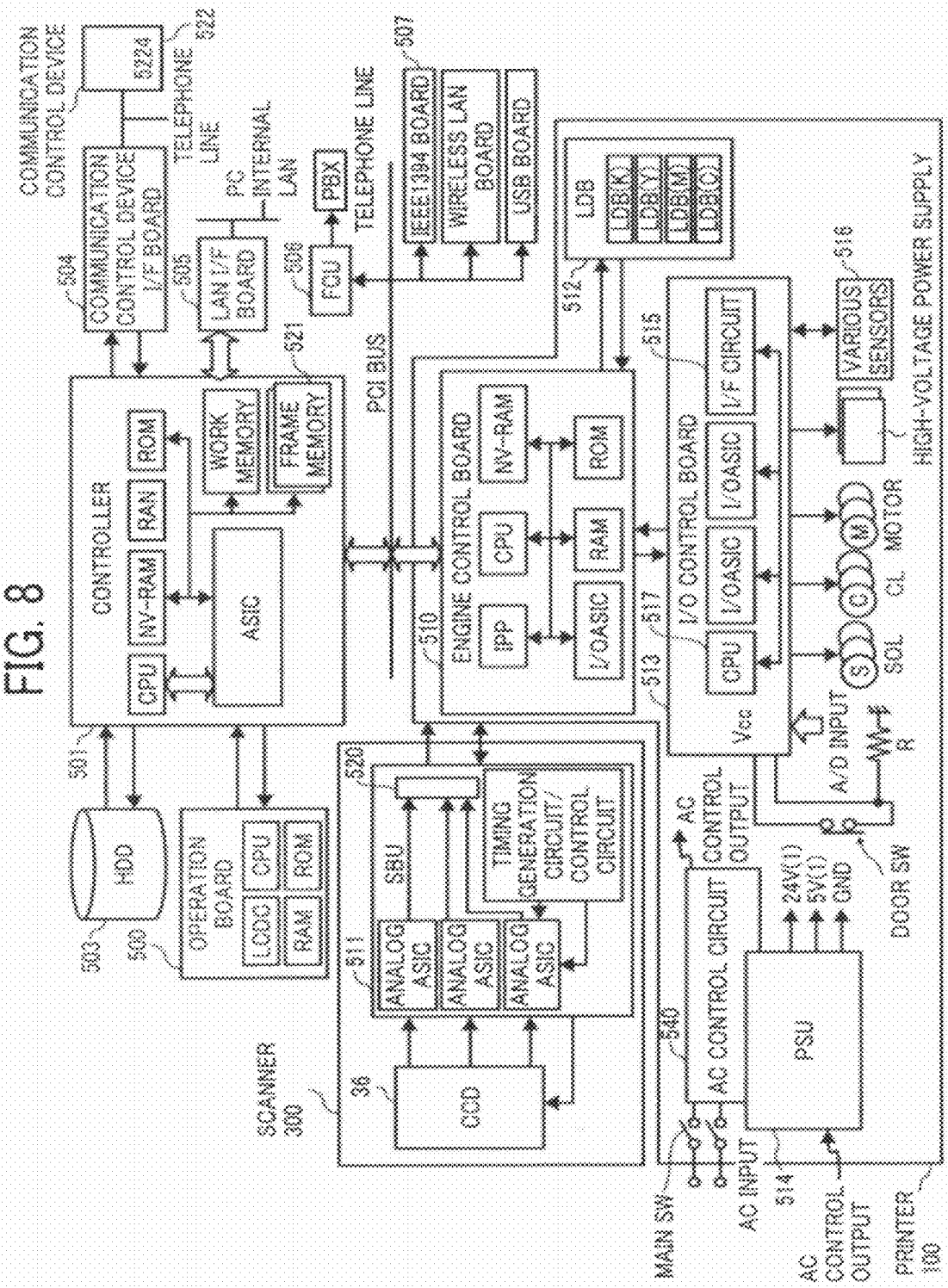
FIG. 8 is a block diagram of an image processing system of the copier shown in FIG. 2.

FIG. 2 is a schematic diagram of the copier 601. The copier 601 includes a printer 100 capable of outputting a color image, a sheet feed unit 200, a scanner 300 capable of reading a color image, and an auto document feeder (ADF) 400. The printer 100 and the sheet feed unit 200 serve as an image forming unit. The scanner 300 is mounted on the printer 100 and the ADF 400 is mounted on the scanner 300. The scanner reads image data of an original placed on a contact glass 32 by using a CCD (read sensor) 36, and sends read image data to an image processing processor (IPP) in an engine control board 510 (FIG. 8). The engine control board 510 controls a laser (not shown) or a light emitting diode (LED) (not shown) arranged in an exposing unit 21 of the printer 100 to apply a write laser light L (FIG. 4) to four drum-shape photosensitive elements 40 (K, Y, M, C, see FIG. 3) based on image data received from the scanner 300. Due to application of the write laser light L, an electrostatic latent image is formed on a surface of each of the photosensitive elements 40 (K, Y, M, C). Then, the electrostatic latent image is developed to a toner image through a predetermined developing process. Reference codes K, Y, M, and C represent black, yellow, magenta, and cyan, respectively.

The printer 100 includes the exposing unit 21 as an exposing unit, process units 18 that form toner images for each color, primary transfer rollers 62 (K, Y, M, C) and a secondary transfer unit 22 as transfer members, a fixing unit 25, a sheet discharging unit (not shown), a toner feed unit (not shown), a toner discharging unit (not shown), and the like. The sheet feed unit 200 includes an auto feed unit arranged below the printer 100 and a manual feed unit arranged on a side of the printer 100. The auto feed unit includes three multi-staged sheet cassettes 44 in a paper bank 43, sheet feed rollers 42 that pick up a sheet as a recording medium from the sheet cassettes 44, separation rollers 45 that separate sheets received from the sheet feed rollers 42 and feed a separated sheet to a sheet feed path 46, and conveyor rollers 47 that convey the sheet to a sheet feed path 48 in the printer 100. The manual feed unit includes a bypass tray 51, separation rollers 52 that separate sheets on the bypass tray 51 and feed a sheet to a bypass sheet feed path 53, a guide member 50, and the like.

A pair of registration rollers 49 is arranged at a trailing end of the sheet feed path 48 of the printer 100. The registration rollers 49 receive a sheet fed from one of the sheet cassettes 44 or the bypass tray 51, and convey the sheet to a secondary transfer nip between an intermediate transfer belt 10 as an intermediate transfer member and the secondary transfer unit 22 at a predetermined timing.

For copying a color image by the copier 601, an operator sets an original on a platen 30 of the ADF 400. Alternatively, an operator opens the ADF 400 to set an original on the contact glass 32 of the scanner 300 and then closes the ADF 400 to hold a set original. When a start switch (not shown) is pressed while an original is set on the ADF 400, the original is conveyed to the contact glass 32 and then scanned by the scanner 300. When the start switch is pressed while an original is set on the contact glass 32, the scanner 300 immediately starts scanning the original. Then, a first carriage 33 and a second carriage 34 move, so that a light emitted from a light source (not shown) of the first carriage 33 is reflected by a surface of the original and travels toward the second carriage 34. The light is then reflected by a mirror (not shown) of the second carriage 34 and reaches the CCD 36 via an imaging lens 35. As a result, image data is read from the original.

After image data is read as described above, the printer 100 drives a driving motor (not shown) and rotates one of supporting rollers 14 to 16. The rest two of the supporting rollers 14 to 16 are driven along with rotation of that one of the supporting rollers 14 to 16. As a result, the intermediate transfer belt 10 as an intermediate transfer member extended around the rollers endlessly moves around the rollers. The printer 100 then performs laser writing processing as described above and developing processing that will be described later. The printer 100 rotates the photosensitive elements 40 (K, Y, M, C) to form monochrome images of black, yellow, magenta, and cyan on the photosensitive elements 40, respectively. The monochrome images are sequentially superimposed one on top of the other due to electrostatic transfer by a primary transfer nip between each of the photosensitive elements 40 (K, Y, M, C) and the intermediate transfer belt 10. As a result, toner images are formed on the photosensitive elements 40 (K, Y, M, C).

The sheet feed unit 200 operates one of the sheet feed rollers 42 to feed a sheet that is in a size appropriate for image data, so that the sheet is fed to the sheet feed path 48 of the printer 100. The sheet conveyed into the sheet feed path 48 is sandwiched by the registration rollers 49 to suspend sheet conveying. At a predetermined timing, the sheet is fed from the registration rollers 49 to the secondary transfer nip between the intermediate transfer belt 10 and secondary transfer rollers 23 of the secondary transfer unit 22. In the secondary transfer nip, the full-color toner image on the intermediate transfer belt 10 and the sheet are closely made into contact with each other at a synchronous timing. Then the full-color toner image is secondary transferred onto the sheet due to a transfer electric field and nip pressure generated in the nip. As a result, a full-color image is formed on the sheet with white background.

After passing through the secondary transfer nip, the sheet is conveyed to the fixing unit 25 due to movement of a secondary transfer belt (conveyor belt) 24 of the secondary transfer unit 22. Then, the full-color image is fixed onto the sheet due to pressure by pressure rollers 27 of the fixing unit 25 and heat by a heated belt (not shown). The sheet is discharged onto a sheet tray 57 through a pair of discharging roller 56. The sheet tray 57 is arranged on a side of the printer 100. For performing two-sided printing, the sheet is guided downward by a reversing member 55. The sheet is then inverted and conveyed along a sheet reversing unit (sheet feed path) 28. The sheet conveyed into the sheet feed path 48 is sandwiched by the registration rollers 49 to suspend sheet conveying. At a predetermined timing, the sheet is fed from the registration rollers 49 to the secondary transfer nip between the intermediate transfer belt 10 and the secondary transfer rollers 23 of the secondary transfer unit 22.

Figure 3:
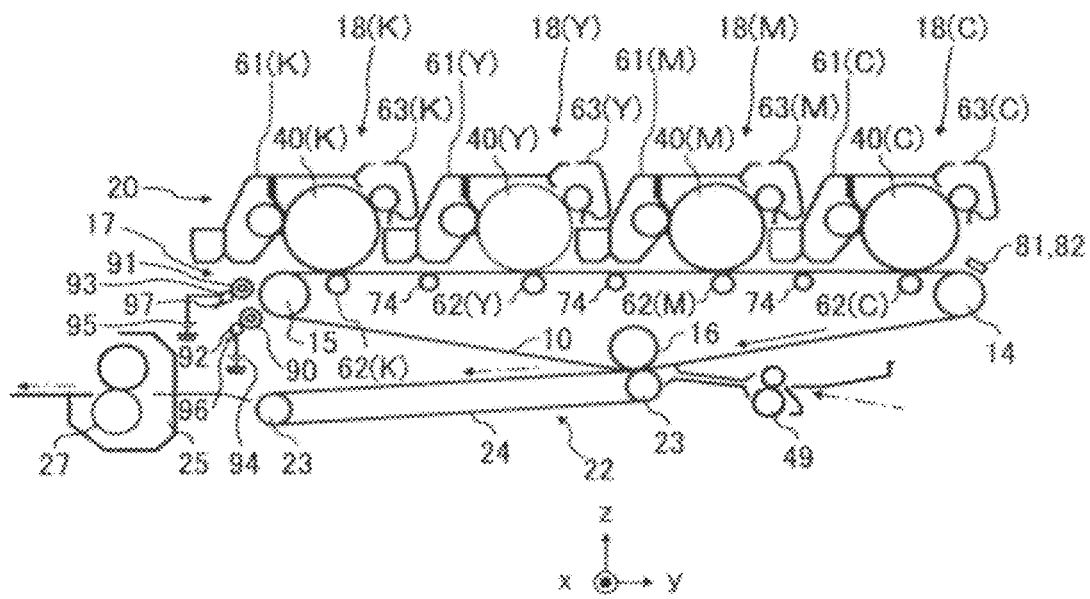
FIG. 3 is an enlarged view of an intermediate transfer belt shown in FIG. 2 and functional units around the intermediate transfer belt.

FIG. 3 is an enlarged view of functional units around the intermediate transfer belt 10. The printer 100 includes a belt unit (not shown), the four process units 18 (K, M, Y, C) that form toner images for each color and are arranged in a tandem unit 20, the secondary transfer unit 22, a belt cleaning unit 17, the fixing unit 25, and the like. The belt unit rotates the intermediate transfer belt 10 extended around the rollers such that the intermediate transfer belt 10 comes into contact with the photosensitive elements 40 (K, Y, M, C). In the primary transfer nips for each of K, Y, M, C where the photosensitive elements 40 (K, Y, M, C) come into contact with the intermediate transfer belt 10, the primary transfer rollers 62 (K, Y, M, C) press a back surface of the intermediate transfer belt 10 toward the photosensitive elements 40 (K, Y, M, C). Primary transfer bias is applied to the primary transfer rollers 62 (K, Y, M, C) by a power source (not shown). As a result, a primary transfer electric field is generated in the primary transfer nip for each of K, Y, M, C. Due to the primary transfer electric field, toner images on the photosensitive elements 40 (K, Y, M, C) are electrostatically transferred onto the intermediate transfer belt 10. Conductive rollers 74 are arranged between each of the primary transfer rollers 62 (K, Y, M, C) such that the conductive rollers 74 come into contact with the back surface of the intermediate transfer belt 10. The conductive rollers 74 prevent the primary transfer bias applied to the primary transfer rollers 62 (K, Y, M, C) from flowing into the adjacent process units 18 via a middle-resistance base layer placed on the back surface of the intermediate transfer belt 10.

The process units 18 (K, Y, M, C) accommodate the photosensitive elements 40 (K, Y, M, C), developing units 61 (K, Y, M, C), cleaning units 63 (K, Y, M, C), and other units, respectively. Each of the process units 18 (K, Y, M, C) is supported by a shared supporting member so that the process units 18 can be removed from the printer 100. For example, the process unit 18 (K) for black includes the photosensitive element 40 (K) and the developing unit 61 (K) that develops an electrostatic latent image formed on the surface of the photosensitive element 40 (K) into a black toner image. Furthermore, the process unit 18 (K) includes the cleaning unit 63 (K) that cleans residual toners from the surface of the photosensitive element 40 (K), a neutralizing unit 64 (see FIG. 4) that neutralizes the surface of the photosensitive element 40 (K) after cleaning the residual toners, a charging unit (charging roller) 60 (see FIG. 4) that uniformly charges the surface of the photosensitive element 40 (K) after its surface is neutralized by the neutralizing unit 64, and the like. The process units 18 (Y, M, C) for each color have the same structures as the process unit 18 (K). The copier 601 is a tandem type in which the process units 18 (K, Y, M, C) are aligned along a moving direction of the intermediate transfer belt 10.

Figure 4:
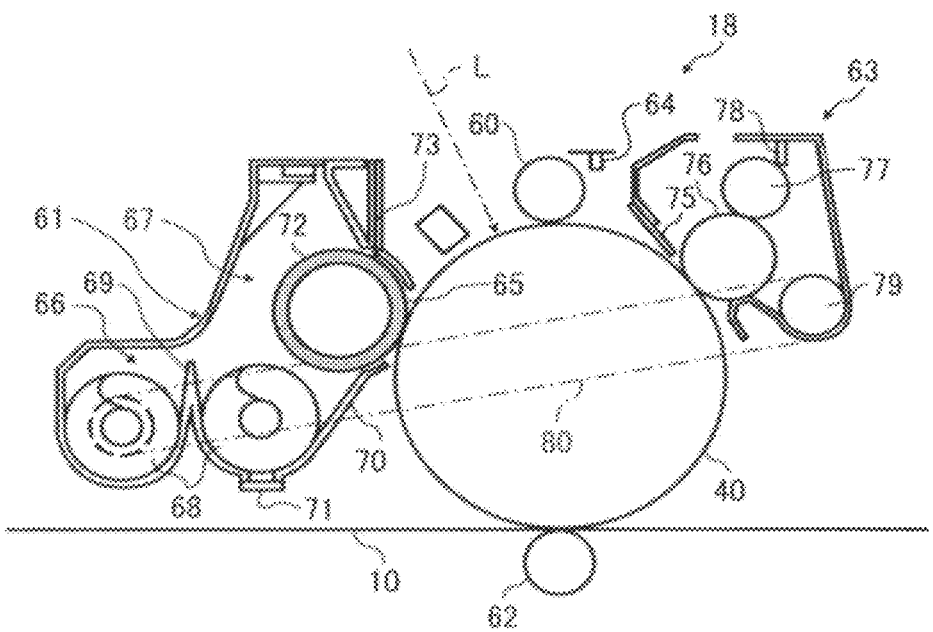
FIG. 4 is an enlarged view of an imaging unit shown in FIG. 3.

FIG. 4 is an enlarged view of one of the process units 18 (K, Y, M, C) for explaining their common structure. That is, each of the process units 18 (K, Y, M, C) has a structure shown in FIG. 4. The process unit 18 includes the charging unit 60, the developing unit 61, the primary transfer roller 62 as a primary transfer member, the cleaning unit 63, and the neutralizing unit 64 around the photosensitive element 40. The photosensitive element 40 is a drum made of aluminum and coated with a photosensitive layer that is made of organic photosensitive material. The photosensitive element 40 can be an endless belt. The charging unit 60 is subjected to application of charging bias while being rotated and made in contact with the photosensitive element 40. The charging unit 60 can be a scorotron charger that performs charging processing without coming into contact with the photosensitive element 40.

The developing unit 61 develops a latent image by using two-component developer containing magnetic carrier and nonmagnetic toners. The developing unit 61 includes an agitating unit 66 and a developing unit 67. The agitating unit 66 conveys and feeds supplied two-component developer to a developing sleeve 65 while agitating the two-component developer. The developing unit 67 transfers toners in the two-component developer adhered to the developing sleeve 65 onto the photosensitive element 40.

The agitating unit 66 is arranged at a position lower than the developing unit 67. The agitating unit 66 includes two screws 68 arranged in parallel to each other, a partition plate 69 between the screws 68, and a toner density sensor 71 arranged on the bottom of a developing unit case 70.

The developing unit 67 includes the developing sleeve 65 arranged opposite to the photosensitive element 40 across an opening of the developing unit case 70, a magnetic roller 72 fixedly arranged inside the developing sleeve 65, and a doctor blade 73. An edge of the doctor blade 73 is made closer to the developing sleeve 65. A minimum space between the doctor blade 73 and the developing sleeve 65 is set about 500 micrometers. The developing sleeve 65 is a magnetic and rotatable tube. The magnetic roller 72 includes five magnetic poles N1, S1, N2, S2, and S3 (not shown) that prevent the magnetic roller 72 from being rotated along with the developing sleeve 65. The magnetic poles N1, S1, N2, S2, and S3 are arranged in that order from the doctor blade 73 along a rotation direction of the developing sleeve 65. Therefore, the two-component developers on the developing sleeve 65 are magnetized by each of the magnetic poles N1, S1, N2, S2, and S3 at a predetermined position in the rotation direction. As a result, the two-component developers supplied from the agitating unit 66 are retained on the surface of the developing sleeve 65, and a magnetic brush (not shown) is formed along a magnetic line on the surface of the developing sleeve 65.

The magnetic brush is controlled to have a predetermined thickness when passing through a position opposite to the doctor blade 73 along with a rotation of the developing sleeve 65, and then conveyed to a developing area (not shown) opposite to the photosensitive element 40. The magnetic brush with the developers is then transferred onto an electrostatic latent image due to a potential difference between a voltage of developing bias applied to the developing sleeve 65 and a voltage of an electrostatic latent image on the photosensitive element 40. As a result, the electrostatic latent image is developed. The magnetic brush then returns inside the developing unit 67 along with a rotation of the developing sleeve 65, and is removed from the surface of the developing sleeve 65 due to a repelling magnetic field between magnetic poles of the magnetic roller 72. Then, the magnetic brush is returned to an inside of the agitating unit 66. In the agitating unit 66, an appropriate amount of toners are added to the two-component developer based on a result of detection by the toner density sensor 71. The developing unit 61 can be other devices that employ one-component developer without magnetic carrier, instead of two-component developer.

The cleaning unit 63 is configured such that a cleaning blade 75 made of polyurethane rubber is pressed toward the photosensitive element 40. However, the cleaning unit 63 can be configured differently. According to the embodiment, for improving cleaning performance, the cleaning unit 63 includes a contact conductive fur brush 76 that rotates in a clockwise direction and arranged such that a peripheral surface of the fur brush 76 is to be made into contact with the photosensitive element 40. The cleaning unit 63 also includes an electric field roller 77 made of metal and a scraper 78. The electric field roller 77 rotates in a clockwise direction and applies bias to the fur brush 76. The scraper 78 is configured such that its end portion comes into contact with the electric field roller 77. Toners removed from the electric field roller 77 by the scraper 78 fall down on a collection screw 79 and then the toners are collected by the collection screw 79.

Thus, the cleaning unit 63 removes residual toners from the photosensitive element 40 by using the fur brush 76 that rotates in a clockwise direction along the photosensitive element 40. Then, toners adhered to the fur brush 76 are removed by the electric field roller 77 that is subjected to application of bias and rotates in a clockwise direction while coming into contact with the fur brush 76. The scraper 78 then cleans the toners adhered to the electric field roller 77. Toners collected by the cleaning unit 63 are gathered on one side of the cleaning unit 63 by the collection screw 79, and then returned to the developing unit 61 by a toner recycle unit 80, so that collected toners are reused. The neutralizing unit 64 includes a neutralizing lamp (not shown) and the like, and applies a light to the photosensitive element 40 to neutralize a surface potential of the photosensitive element 40. The neutralized surface of the photosensitive element 40 is then uniformly charged by the charging unit 60 and subjected to optical writing processing.

Referring back to FIG. 3, the secondary transfer unit 22 is arranged below the belt unit. The secondary transfer unit 22 includes the secondary transfer belt 24 that is extended around the secondary transfer rollers 23 and endlessly moves around the secondary transfer rollers 23. One of the secondary transfer rollers 23 serves as a secondary transfer roller to be subjected to application of secondary transfer bias by a power source (not shown). This secondary transfer roller (one of the secondary transfer rollers 23) and the roller 16 of the belt unit sandwich the intermediate transfer belt 10 and the secondary transfer belt 24. As a result, the secondary transfer nip is formed on a contacted area between the intermediate transfer belt 10 and the secondary transfer belt 24, in which the intermediate transfer belt 10 and the secondary transfer belt 24 move in the same direction. The sheet conveyed to the secondary transfer nip by the registration rollers 49 is subjected to secondary transfer processing in which a full-color toner image on the intermediate transfer belt 10 is secondary transferred at one time onto the sheet due to a secondary transfer electric field and nip pressure. As a result, a full-color image is formed on the sheet. After passing through the secondary transfer nip, the sheet is removed from the intermediate transfer belt 10 and falls down toward the surface of the secondary transfer belt 24. Then, the sheet is conveyed to the fixing unit 25 along with movement of the intermediate transfer belt 10 and the secondary transfer belt 24. The secondary transfer processing can be performed by using a transfer charger or the like instead of the secondary transfer roller.

A portion of the intermediate transfer belt 10 that has passed through the secondary transfer nip then reaches a supporting position of the supporting roller 15. At the supporting position, the intermediate transfer belt 10 is sandwiched by the belt cleaning unit 17 that comes into contact with a top surface (loop peripheral surface) of the intermediate transfer belt 10 and the supporting roller 15 that comes into contact with a back surface of the intermediate transfer belt 10. The belt cleaning unit 17 removes residual toners from the loop peripheral surface and then the intermediate transfer belt 10 moves into the primary transfer nip for each of K, Y, M, C. Consequently, toner images are superimposed one on top of the other.

The belt cleaning unit 17 includes two fur brushes 90 and 91. The fur brushes 90 and 91 rotate in a clockwise direction while brush portions come into contact with the intermediate transfer belt 10 to remove residual toners from the intermediate transfer belt 10. Furthermore, cleaning bias is applied to the fur brushes 90 and 91 by a power source (not shown) so that removed residual toners are electrostatically gathered and collected.

Metal rollers 92 and 93 come into contact with the fur brushes 90 and 91, respectively, and rotate in the same or an opposite direction. A negative voltage is applied by a power source 94 to the metal roller 92 that is arranged on an upstream side of the intermediate transfer belt 10 in a moving direction. On the other hand, a positive voltage is applied by a power source 95 to the metal roller 93 that is arranged on a downstream side of the intermediate transfer belt 10 in the moving direction. The metal rollers 92 and 93 come into contact with end portions of blades 96 and 97, respectively. With this configuration, the fur brush 90 on the upstream side cleans the surface of the intermediate transfer belt 10 along with the movement of the intermediate transfer belt 10 in a direction indicated by an arrow in FIG. 3. At this time, if −700 volts is applied to the metal roller 92 while −400 volts is applied to the fur brush 90, positively charged toners on the intermediate transfer belt 10 are electrostatically transferred onto the fur brush 90. Then, toners transferred onto the fur brush 90 are further transferred onto the metal roller 92 due to a potential difference and removed by the blade 96.

Thus, toners on the intermediate transfer belt 10 are removed by the fur brush 90. At this state, however, a number of toners are still remained on the intermediate transfer belt 10. The residual toners are negatively charged due to negative bias applied to the fur brush 90 due to charge injection or discharging. Then, positive bias is applied by using the fur brush 91 on the downstream side to clean and remove the toners. Removed toners are transferred from the fur brush 91 to the metal roller 93 due to a potential difference, and removed by the blade 97. Toners removed by the blades 96 and 97 are collected in a tank (not shown).

Most of residual toners are removed from the intermediate transfer belt 10 after cleaning is performed by the fur brush 91. However, a few residual toners are still remained on the intermediate transfer belt 10. Theses toners are positively charged due to positive bias applied to the fur brush 91, and then transferred onto the photosensitive elements 40 (K, Y, M, C) due to a transfer electric field applied at the primary transfer nips. Then, the toners are collected by the cleaning unit 63.

The registration rollers 49 are generally grounded while they are used. However, it is possible to apply bias for removing dusts from the sheet conveyed into the registration rollers 49.

The sheet reversing unit 28 (see FIG. 2) is arranged below the secondary transfer unit 22 and the fixing unit 25 such that the sheet reversing unit 28 is in parallel to the tandem unit 20. Due to the sheet reversing unit 28, a sheet is conveyed in a reverse direction by a switching valve (not shown) after image fixing processing on one side of the sheet is finished. Then, the sheet is inverted and conveyed again into the secondary transfer nip. The same secondary transfer processing and image fixing processing are performed on the other side of the sheet, and the sheet is discharged on the sheet tray 57.

Figure 5A:
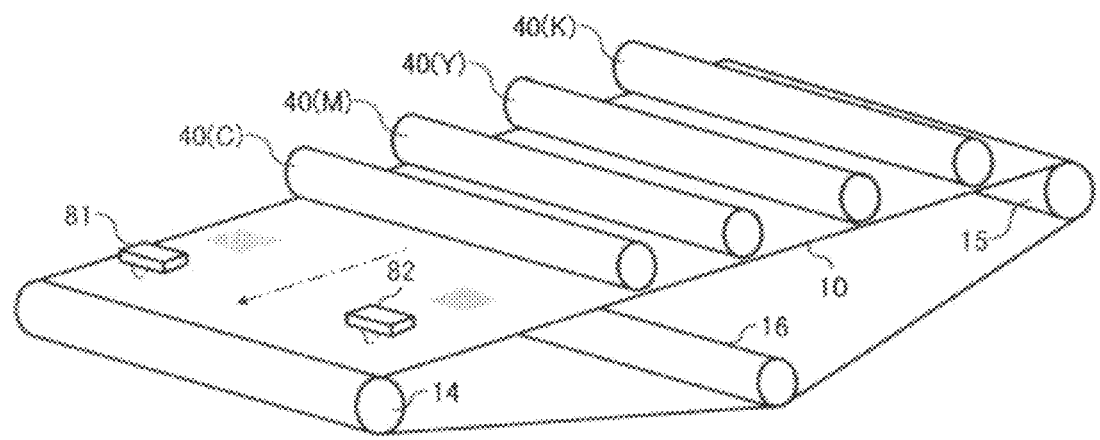
FIG. 5A is a perspective view of optical sensors that detect density of a toner image on a surface of the intermediate transfer belt shown in FIG. 3.

FIG. 5A is a perspective view of optical sensors 81 and 82 that detect density of a toner image on the surface of the intermediate transfer belt 10. The optical sensors 81 and 82 face the surface of the intermediate transfer belt 10 at positions near the supporting rollers 14. That is, the optical sensors 81 and 82 are arranged on peripheral portions of the intermediate transfer belt 10 across the moving direction of the intermediate transfer belt 10. When detecting density of a toner image or adjusting density of a toner image, test images (test pattern images) with five different densities are sequentially formed for each color (C, M, Y, K) on the peripheral portions of the intermediate transfer belt 10. The optical sensors 81 and 82 then detect the densities (amount of toners).

Figure 5B:
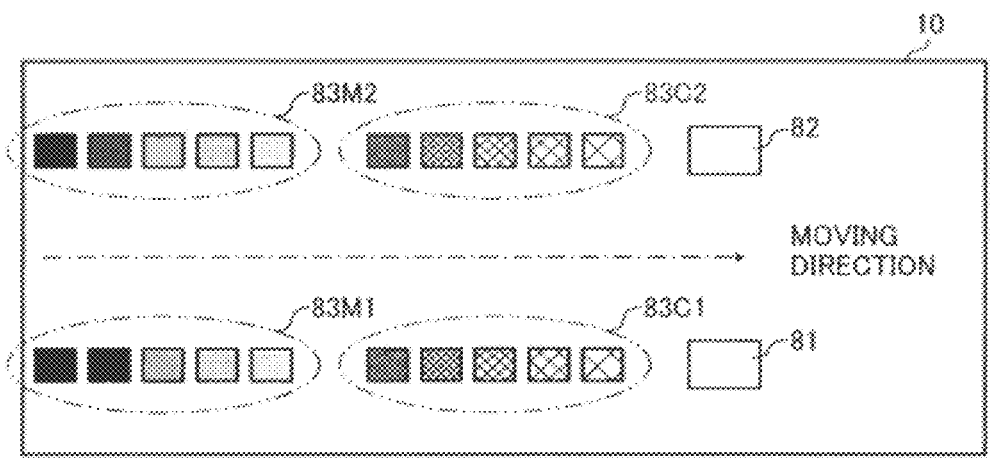
FIG. 5B is a plan view of test patterns as toner images and formed on the intermediate transfer belt shown in FIG. 5A.

FIG. 5B is a plan view of the test patterns as toner images formed on the intermediate transfer belt 10. Specifically, the optical sensors 81 and 82, test patterns (toner images) 83C1 and 83C2 for C, and test patterns (toner images) 83M1 and 83M2 for M are arranged on the intermediate transfer belt 10.

Figure 6A:
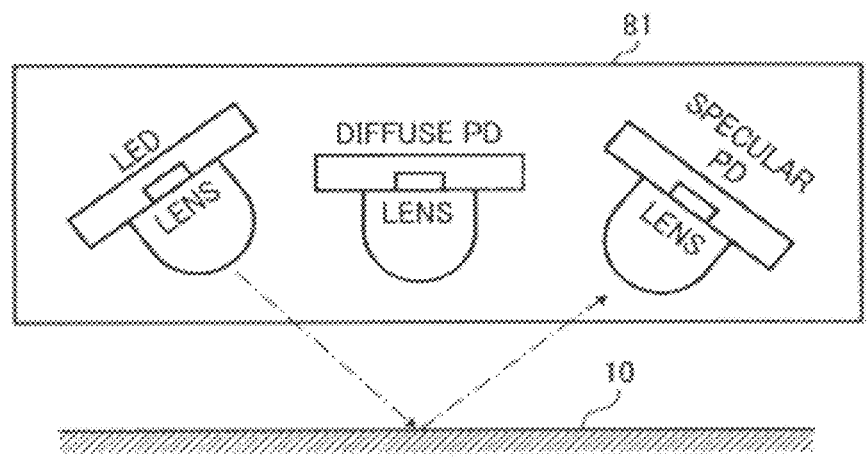
FIG. 6A is a schematic diagram of the optical sensor shown in FIG. 5A.

FIG. 6A is a schematic diagram of the optical sensor 81. The optical sensor 81 detects dirt on the surface of the intermediate transfer belt 10 by applying a light to the intermediate transfer belt 10. The optical sensor 81 includes an LED that obliquely applies a light to the intermediate transfer belt 10, a specular photo diode (PD) that receives a specular light from the intermediate transfer belt 10, and a diffuse PD that receives a diffuse light from the intermediate transfer belt 10. The optical sensor 82 has the same structure as the optical sensor 81. The intermediate transfer belt 10 is generally made of highly smooth material to prevent retention of toners on the intermediate transfer belt 10. For example, the intermediate transfer belt 10 is made of polyvinylidene fluoride (PVDF) or polyimide with a luster surface.

Figure 6B:
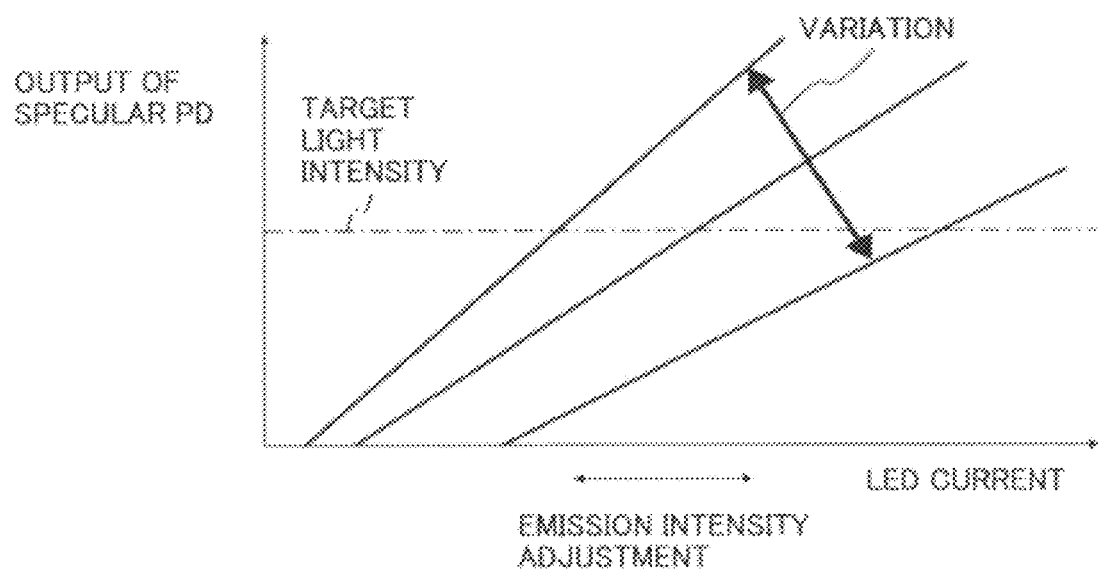
FIG. 6B is a graph of a relationship between a current value of an LED in the optical sensor shown in FIG. 6A and a level of a photodetection signal output from a specular photodiode (PD) in the optical sensor.

FIG. 6B is a graph of a relationship between a current value of the LED in the optical sensor 81 that applies a light to the intermediate transfer belt 10 and a level of a photodetection signal output from the specular PD. For adjusting density of a toner image, emission intensity adjustment (emission intensity adjustment value R), developing bias correction (developing bias adjustment value Q), and exposure correction (exposure adjustment value P) are performed. Specifically, the emission intensity adjustment is performed by adjusting a current value of the LED of the optical sensors 81 and 82 so that intensity of a reflected light from the intermediate transfer belt 10 is set to a reference value (target light intensity shown in FIG. 6B). The developing bias correction is performed by adjusting a characteristic line of the development potential verses toner image density to a reference line. The developing bias is a difference between a surface potential of the photosensitive element and a potential of the developing roller. In the emission intensity adjustment, the received light intensities of the optical sensors 81 and 82 are adjusted to the target light intensity shown in FIG. 6B. Specifically, an individual difference of luminous efficiencies of the LEDs and variation of the received light intensities of the optical sensors 81 and 82 caused by temperature change, change over time, or dirt on the surface of the intermediate transfer belt 10 are adjusted by using photodetection signals of the specular PDs in the optical sensors 81 and 82.

When adjusting density of a toner density based on the developing bias correction (adjustment value Q) and the exposure correction (adjustment value P), test patterns (e.g., the toner image 83C1 shown in FIG. 5A) with five different densities are formed for each color on the intermediate transfer belt 10, so that the optical sensors 81 and 82 detect the densities.

Figure 7A:
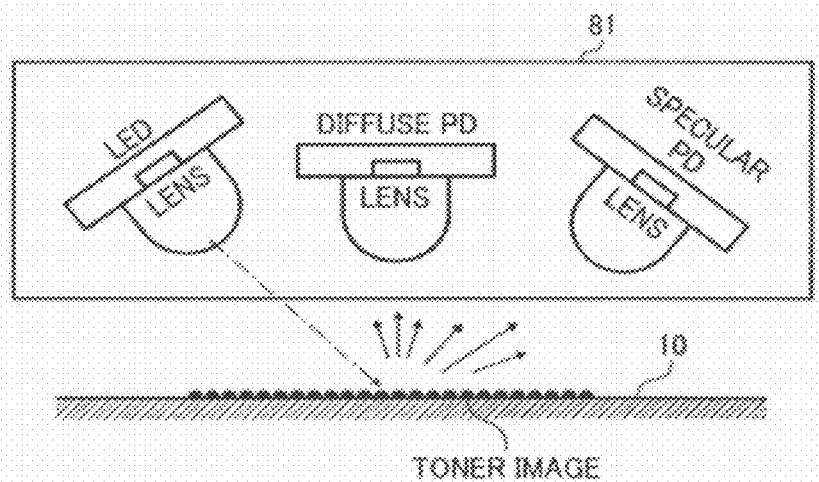
FIG. 7A is a schematic diagram of the optical sensor shown in FIG. 5A when the optical sensor detects density of a toner image of a test pattern transferred on the intermediate transfer belt.
Figure 7B:
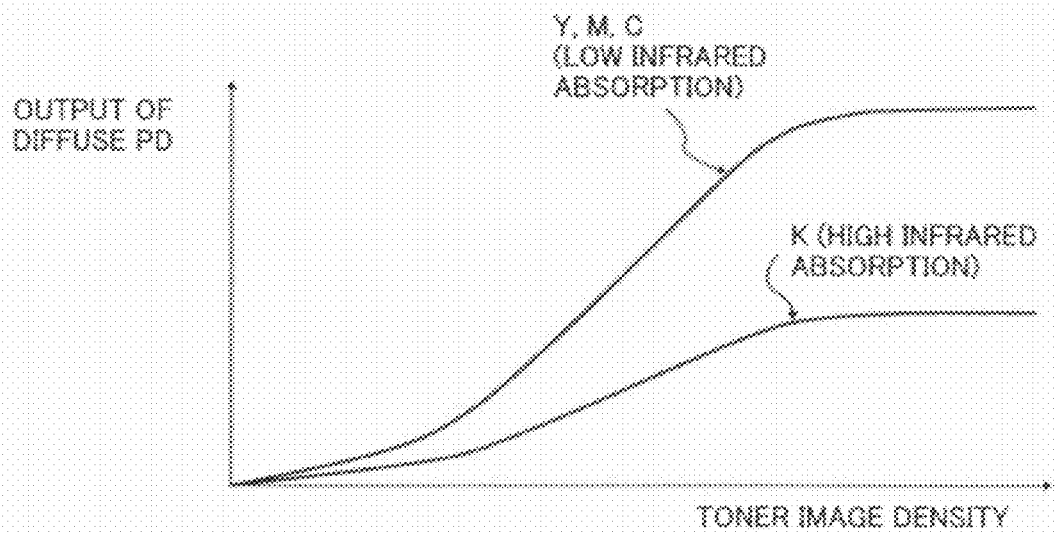
FIG. 7B is a graph of a relationship between density of a toner image and a level of a photodetection signal output from a diffuse PD shown in FIG. 7A.

FIG. 7A is a schematic diagram of the optical sensor 81 that detects density of a toner image of a test pattern on the intermediate transfer belt 10. FIG. 7B is a graph of a relationship between density of a toner image and a level of a photodetection signal output from the diffuse PD in the optical sensor 81.

As shown in FIG. 7A, when the toner images of the test patterns on the surface of the intermediate transfer belt 10 pass right under the optical sensor 81, that is, when each of the toner images of the test patterns comes right under the optical sensor 81, the optical sensor 81 applies a light to each of the toner images to detect its density. That is, a CPU 517 (FIG. 8) converts a signal detected by the diffuse PD that mainly receives a diffuse light of the toner image into diffuse light data by analog-to-digital (A/D) conversion. Then, the CPU 517 loads and converts the diffuse light data into toner density data based on a look-up table (LUT) that is generated based on characteristics of toner density verses output of the diffuse PD and used for converting output of the diffuse PD into toner density. Thus, the diffuse light data is converted into the toner density data.

Because toners contain colorants for each color, the LED light sources of the optical sensors 81 and 82 are formed as near-infrared or infrared light sources with a wavelength of about 840 nanometers that is less subject to colorant contained in toners. However, black toners are generally colored by carbon black due to cost reduction. Such black toners have high infrared absorption in an infrared region. Therefore, as shown in FIG. 7B, sensitivity of black toner density is lower than those of other colors.

FIG. 8 is a block diagram of an electric system of the copier 601. The electric system includes a system controller 501, the operation board 500, an HDD 503, a communication control device I/F board 504, a LAN I/F board 505, a facsimile control unit (FCU) 506, a board unit 507, the engine control board 510, an I/O control board 513, a scanner board (sensor board unit (SBU)) 511, and a laser diode board (LDB) 512. The controller 501 controls an entire system of the copier 601. The operation board 500 is connected to the controller 501. The HDD 503 stores therein image data. The communication control device I/F board 504 performs communication with externals via an analog line. The FCU 506 is connected to a universal PCI bus. The board unit 507 includes an IEEE1394 board, a wireless LAN board, a USB board, and the like. The engine control board 510 is connected to the controller 501 via a PCI bus. The I/O control board 513 is connected to the engine control board 510 and controls input and output of the copier 601. The SBU 511 reads an original (image) to be copied. The LDB 512 applies an image light of image data onto a photosensitive element, that is, performs optical writing. More specifically, the communication control device I/F board 504 immediately sends a notice to a remote diagnosis system in externals when an event indicative of a failure occurs or maintenance is required in the copier 601. Therefore, potential problems can be promptly recognized based on the notice and necessary counteractions such as maintenance or order of necessary parts can be taken as appropriate. Furthermore, the communication control device I/F board 504 is used for transmitting usage status of a device, and the like.

The scanner 300 optically reads an original. That is, the scanner 300 scans the original with an original lighting light source and provides an image of the original on the CCD 36. The CCD 36 photoelectrically converts an image of the original, that is, a reflected light of the light applied to the original, into image signals of R, G, B. The CCD 36 is a three-line color CCD that generates image signals of R, G, B of an even pixel channel (EVENch) and an odd pixel channel (ODDch) and outputs the signals to an analog ASIC of the SBU 511. The SBU 511 includes the analog ASIC, a CCD (not shown), a circuit that generates a driving timing of the analog ASIC. An output of the CCD 36 is sampled and held by a sample and hold circuit (not shown) in the analog ASIC, and then converted into image data of R, G, B by A/D conversion. Then, the image data is subjected to shading correction and output to an image data processing unit (IPP) in the engine control board 510 via an image data bus of an output I/F 520.

The IPP is a programmable processing unit that performs image processing such as a segmentation processing (segmentation: determination whether image is in a text region or a photographic region), background removal processing, gamma correction by scanners, filtering processing, color correction processing, magnification change processing, image edit processing, gamma correction by printers, and gradation processing. The IPP performs correction processing on the image data transferred from the SBU 511 to correct signal degradation caused by quantization to an optical system and a digital signal (signal degradation of a scanner system), and then writes the image data to a frame memory 521.

The controller 501 includes a CPU, a ROM, a RAM, a nonvolatile (NV)-RAM, an ASIC, an I/F circuit (not shown), and the like. The ROM is used for controlling the controller 501. The RAM serves as a work area of the CPU. The NV-RAM includes a built-in lithium battery (not shown) and a timer, and stores therein backup data stored in the RAM. The ASIC controls system bus and peripherals (e.g., FIFO) of the CPU.

The controller 501 has functions of a plurality of applications such as the printer 100 that includes a scanner application, a facsimile application, and a printer application, or a copier, and controls the entire system. The controller 501 decodes data input from the operation board 500 and displays settings and status data of the system on a display unit of the operation board 500. A number of units are connected to the PCI bus, so that image data or a control command is transferred between the units by using image data bus or a control command bus in a time-sharing manner.

The communication control device I/F board 504 is a communication I/F board between a communication control device 522 and the controller 501. Communication with the controller 501 is established by using full-duplex asynchronous serial communication. The communication control device I/F board 504 is connected to the communication control device 522 using RS-485 multidrop I/F. Communication with a management apparatus in a remote place is established via the communication control device I/F board 504.

The LAN I/F board 505 is a communication I/F board that is connected to the internal LAN 600 (FIG. 1) and used for communication between the internal LAN 600 and the controller 501. The LAN I/F board 505 is provided with a PHY chip (not shown). The LAN I/F board 505 is connected to the controller 501 via a standard communication I/F such as a PHY chip I/F and an I2C bus I/F. Communication with external devices is established via the LAN I/F board 505.

The HDD 503 serves as application database and image database. The application database contains application programs of a system and device attribute information of a printer or an imaging processing device. The image database contains image data, such as data of a read image or a written image, and document data. The HDD 503 is connected to the controller 501 via a physical I/F and an electric I/F compliant with ATA/ATAPI-4.

The operation board 500 includes a CPU, a ROM, a RAM, and an ASIC (LCD controller (LCDC)) that controls an LCD and key input. The ROM stores therein control programs of the operation board 500 for controlling read of input of data and display of data. The RAM serves as a work area of the CPU. The controller 501 and the operation board 500 perform controls of input and display of settings and status data of the system based on communication between them.

Writing signals of K, Y, C, M output from a work memory of the controller 501 are input to LD writing circuits of K, Y, C, M (not shown) in the LDB 512, respectively. Then, the LD writing circuits perform LD current control (modulation control) on input signals and output the signals to each LD.

The engine control board 510 is a process controller that mainly performs imaging control for image forming. The engine control board 510 includes a CPU, an IPP, a ROM, a RAM, a NV-RAM, and an I/O ASIC. The IPP performs imaging processing. The ROM stores therein software programs for controlling copying and printing. The RAM is used for controlling copying and printing. The NV-RAM is provided with an SRAM and a memory that detects power OFF and stores detection data in EEPROM. The I/O ASIC is provided with a serial I/O and communicates signals with the CPU that performs various controls. The I/O ASIC controls I/Os (e.g., counters, fans, solenoids, and motors) installed near the engine control board 510. The I/O control board 513 and the engine control board 510 are connected to each other using a synchronous serial I/F.

The I/O control board 513 includes the CPU 517 and performs I/O control of the copier 601. Examples of the I/O control includes read of detection signals, analog control, detection of a sheet jam, and sheet conveying control. The detection signals are detected by a photosensitive element sensor (P sensor (not shown)) arranged on the photosensitive element 40, the optical sensors 81 and 82, and other various sensors 516. The photosensitive element sensor (P sensor) serves as a temperature sensor, a voltage sensor, a toner amount sensor, or the like. The optical sensors 81 and 82 serve as toner density sensors. An I/F circuit 515 connects the various sensors 516 and actuators (motors, clutches, and solenoids). The optical sensors 81 and 82 are included in the various sensors 516.

A power supply unit (PSU) 514 supplies power to the copier 601. Upon turning ON (open) of a main switch (SW), commercial power is supplied. Due to supply of the commercial power, commercial alternating current (AC) is supplied to an AC control circuit 540. Then, the PSU 514 supplies a necessary direct current (DC) voltage to each control board by using AC control output that is rectified and smoothed by the AC control circuit 540. The CPU in each of the control boards operates with a constant voltage generated by the PSU 514.

The copier 601 includes a data acquiring unit that acquires various data related to status or conditions in each component. The data acquiring unit includes the engine control board 510, the I/O control board 513, the various sensors 516, the operation board 500, and the like. The engine control board 510 is a control unit that controls the entire hardware of the copier 601. The engine control board 510 includes the ROM as a data storage unit that stores therein control programs, the RAM as a data storage unit that stores therein calculation data or control parameters, and the CPU as a calculating unit.

In the copier 601, the data acquiring unit detects various statuses at a predetermined timing and generates status evaluation data based on detection data. The engine control board 510 adjusts control parameters for each operation of the copier 601 and determines or detects occurrence of a failure. The detection data, evaluation data, and values of the control parameters are stored as status data in the NV-RAM of the engine control board 510. That is, according to the embodiments, the status data contains values of the control parameters that affect imaging characteristics, the detection data detected by status sensors, and the evaluation data generated based on the detection data.

A detailed explanation about data to be acquired by the data acquiring unit is given below.

(a) Detection Data

The detection data is obtained for determining status or an operational condition of the copier 601. Examples of the status and the operational condition include driving status, property of a recording medium, property of developer, property of a photosensitive element, processing status of electrophotographic data, environmental conditions, and property of a printing object.

(a-1) Driving System Data

Rotation frequency of a photosensitive element, a current value of a driving motor, or a temperature of a driving motor can be driving system data. The rotation frequency is detected by an encoder and the like.

Driving status of a cylindrical or a belt-shape rotation member can be the driving system data. Examples of the rotation member include a fixing roller, a sheet feed roller, and a driving roller.

Sound data caused by driving is detected by a microphone arranged inside or outside a device.

(a-2) Sheet Feed Status

Sheet feed status is obtained by causing a transmissive or a reflective optical sensor, or a contact-type sensor to read a leading edge or a trailing edge of a conveyed sheet. Examples of the sheet feed status include occurrence of a sheet jam, timing shift of sheet delivery at the leading edge or the trailing edge, and variation in directions perpendicular to a sheet conveying direction.

A sheet feed speed is obtained from detected timings by a plurality of the sensors.

Whether a sheet is slipped from a sheet feed roller at a time of sheet feeding is obtained by comparing a measured rotation frequency of the sheet feed roller and a shift amount of the sheet.

(a-3) Property of Recording Medium (e.g., Sheet)

Sheet property largely affects stability of image quality and sheet delivery. Sheet property data can be obtained in the following manner.

Thickness of a sheet is detected by causing a pair of rollers to sandwich the sheet so that an optical sensor detects a relative positional change of the rollers. Alternatively, thickness of a sheet is obtained by detecting a variation amount equivalent to a shift amount of a member pushed by the sheet.

Surface roughness of a sheet is obtained by causing a guide member to come into contact with the sheet before image transfer to detect whether vibration or noise occurs due to sliding at a contacted portion between the surface of the sheet and the guide member.

Level of gloss of the surface of a sheet is obtained by applying a beam at a predetermined incident angle to the sheet and measuring a reflected beam in a mirror reflection direction by using a sensor.

Hardness of a sheet is obtained by applying pressure to the sheet and detecting a variation amount (amount of curve) of the sheet due to the pressure.

Whether a sheet is a recycled paper is determined by applying ultraviolet ray and detecting transparency of the sheet.

Whether a sheet is a backing sheet is determined by applying a light from a linear light source such as an LED array to the sheet and detecting a reflected light from the sheet by using a solid-state image sensor such as a CCD.

Whether a sheet is an OHP film is determined by applying a light to the sheet and detecting a specular light with an angle different from that of a transmitted light.

Moisture content of a sheet is obtained by measuring infrared absorption or microwave absorption of a light.

Amount of curl in a sheet is detected by an optical sensor or a contact-type sensor.

Electrical resistance of a sheet is obtained from measurement by a pair of electrodes (e.g., sheet feed rollers) abutting to the sheet. Alternatively, electrical resistance value of a sheet can be assumed from a value obtained by measuring a surface potential of a photosensitive element or an intermediate transfer belt after an image is transferred onto the sheet.

(a-4) Property of Developer

Property of developer (toners or carriers) largely affects electrophotographic functions in a system. That is, property of developer largely affects performance of the entire system. Therefore, data about property of developer is indispensable. Toner property and carrier property are described below.

Examples of the toner property include a charged amount, charge distribution, flowability, a level of cohesion, density, electric resistance, an amount of additives, consumption, a remaining amount, and toner density (ratio between toner and carrier).

Examples of the carrier property include magnetic property, a thickness of coating, and an amount of spent.

Generally, it is difficult to singularly detect each one of the above property in a copier. Therefore, it is preferable to integrally measure property of developer. The property of developer can be measured in the following manner.

A test latent image is formed on a photosensitive element and then developed under a predetermined development condition to form a toner image. Then, reflection density (light reflectivity) of the toner image is measured.

A pair of electrodes is arranged in a developing device to measure a relationship between an applied voltage and current (e.g., resistance or permittivity).

A coil is arranged in a developing device to measure volt-ampere characteristics (inductance).

A level sensor is arranged in a developing device to measure amount of developer. The level sensor can be an optical sensor or a capacitance sensor.

(a-5) Property of Photosensitive Element

Similar to the property of developer, property of a photosensitive element largely affects electrophotographic functions. Examples of data about the property of a photosensitive element include a thickness of coating of a photosensitive element, surface property (friction factor or smoothness), a surface potential (before and after processing), surface energy, a scattered light, temperature, color, a surface position, a linear speed, a potential decay speed, electric resistance, capacitance, and surface moisture content. With regard to a copier, the following data can be obtained.

Variation in capacitance due to variation in thickness of coating is obtained by detecting current that flows from a charging member to a photosensitive element. Thickness of coating is obtained by checking a voltage applied to the charging member and predetermined volt-ampere characteristics of dielectric thickness of a photosensitive element.

A surface potential and a temperature are obtained well-known sensors.

A linear speed is detected by an encoder mounted on a rotation axis of a photosensitive element.

A scattered light from a photosensitive element is detected by an optical sensor.

(a-6) Electrophotographic Process Status

A toner image is formed by an electrophotographic copier in the following manner. A photosensitive element is uniformly charged, a latent image is formed using a laser light (an image is exposed), the latent image is developed by charged toners (color particles), a toner image is transferred onto a transfer member (color toner images are superimposed onto an intermediate transfer member or a recording medium, or onto a photosensitive element at a time of developing), and the toner image is fixed onto a recording medium. Status of the above processing largely affects output of a system, such as an output image. Therefore, status data need to be acquired to evaluate stability of the system. Examples of the status data of the electrophotographic process are as follows.

A charged potential and a potential of exposed regions are detected by well-known sensors.

A gap between a charging member and a photosensitive element in contactless charging is detected by measuring intensity of a light that passes through the gap.

An electromagnetic wave due to charging is obtained by a broadband antenna.

Noise due to charging, exposure intensity, and a wavelength of an exposing light are obtained.

Furthermore, status of a toner image can be obtained in the following manner.

A pile height (a height of a toner image) is obtained by measuring a depth from a longitudinal direction by a displacement sensor and a length of a shielded light from a lateral direction by a linear sensor with a parallel light.

Charge amount of toners is obtained based on a potential of an electrostatic latent image of a single-colored region and a potential of a developed image of the electrostatic latent image obtained by a voltage sensor and a ratio between a measured potential and an amount of adhered toners calculated by a reflection density sensor.

Dot fluctuation or the like is obtained from a dot-pattern image on a photosensitive element detected by an infrared sensor or another dot-pattern image on an intermediate transfer member detected by an area sensor with a wavelength corresponding to each color, through appropriate processing.

An offset amount (after an image is fixed) is obtained by detecting and comparing each corresponding position of a sheet and a fixing roller by an optical sensor.

An amount of remained transfer is obtained based on intensity of a light reflected from a remained pattern of a predetermined pattern detected by an optical sensor arranged at a position where transfer processing finishes on a photosensitive element or a belt.

Color shading due to superimposition of images is detected by a full-color sensor that detects a sheet with a fixed image.

(a-7) Property of a Toner Image

Density and colors of an image are optically detected. Either one of a reflected light and a transmitted light can be used. A wavelength of a light to be applied can be set depending on color. Density and data about a monochrome color can be measured from an image on a photosensitive element or an intermediate transfer member. Combination status of colors, such as color shading, need to be measured from an image on a sheet.

Gradation is obtained by detecting reflection density of a toner image formed on a photosensitive element or a toner image transferred onto a transfer member for each color grade by an optical sensor.

Sharpness is obtained by reading an image developed or a transferred from a repeated-line pattern image obtained by a fixed focal length lens with a small spot diameter or a high-resolution line sensor.

Graininess (surface roughness) is obtained in the same manner as that used for obtaining the sharpness. That is, a half-tone image is read and noise content is calculated.

Registration skew is obtained by optical sensors arranged at both ends where registration is completed in a main-scanning direction and acquiring a difference between a timing of turning ON of a registration roller and timings of detection by the sensors.

Color shift is obtained by detecting an edge portion of a superimposed image on an intermediate transfer member or a sheet by using a spot sensor having a fixed focal length lens with a small spot diameter or a high-resolution line sensor.

Banding (unevenness of density in a sheet conveying direction) is obtained by measuring unevenness of density on a sheet in a sub-scanning direction by using a spot sensor with a small diameter or a high-resolution line sensor and measuring an amount of signals with a predetermined frequency.

Degree of gloss (shading) is obtained by detecting a state of a sheet with a uniform image by using a specular optical sensor.

Fog is obtained by reading a background of an image on one of a photosensitive element, an intermediate transfer member, and a sheet by using an optical censor capable of detecting a relatively wide area. Alternatively, fog is obtained by acquiring image data of a plurality of areas in a background by using a high-resolution area sensor and counting the number of toner particles in the image.

(a-8) Physical Property of a Printing Object from an Image Forming Apparatus

Image flow or a faint image is determined by detecting a toner image on one of a photosensitive element, an intermediate transfer member, and sheet by an area sensor and performing image processing on acquired image data.

Amount of toner dusts is obtained by acquiring an image on a sheet by a line sensor or an area sensor and calculating an amount of toners dispersed around a pattern area.

Pinholes are detected from an image on one of a photosensitive element, an intermediate transfer belt, and a sheet by a high-resolution line sensor.

State of a sheet, such as curl, corrugation, folding, or the like, is detected by a displacement sensor. It is effective to set a sensor near side edges of a sheet to detect sheet folding.

Dirt or scratch on a side edge of a sheet is obtained by imaging and analyzing a side edge of a particular number of discharged sheets by an area sensor arranged near a sheet discharge tray.

(a-9) Environmental Status

Temperature is detected by using a thermocouple, a variable resistance element, a pyroelectric element, a thermomagnetic element, or the like. The thermocouple obtains thermoelectromotive force generated as a signal at a junction between different metals or between a metal and a semiconductor. The variable resistance element is made of a metal or a semiconductor of which resistivity depends on temperature. The pyroelectric element generates an electrical potential on a surface of a particular crystal because positive or negative charges move to opposite ends due to change in temperature. The thermomagnetic element detects change in magnetic property due to change in temperature.

Humidity is obtained by optical measurement such as measurement of light absorption of $H_2O$ or OH-group. Humidity is also obtained by a humidity sensor that measures change in electric resistance value caused by water vapor adsorption on material.

Various gases are detected by measuring change in electric resistance in an oxide semiconductor caused by gas adsorption.

Air flow (direction, speed, type) is detected by optical measurement or the like. An air-bridge type flow sensor is effective because it is compact and can be easily mounted on a system.

Air pressure or pressure is detected by using pressure-sensitive material, measuring mechanical displacement of a membrane, or the like. Oscillation can be detected in the same manner.

(b) Control Parameter

Performance of a copier depends on a control unit. Therefore, it is effective to use input/output parameters of the control unit.

(b-1) Image Forming Parameter

Image forming parameter is directly obtained from calculation processing performed by the control unit for image forming. Examples of the image forming parameter are as follows.

A set value of a process condition is set by the control unit. Examples of the set value include a charge potential, a developing bias value, or a set value of fixing temperature.

A set value of various parameters for image processing such as halftone processing or color correction processing is set.

Various parameters are set by the control unit for operation of a device. Examples of the various parameters include a sheet feed timing or a runtime in a preparation mode before image processing.

(b-2) User Operation Log

Frequency of each operation selected by a user can be a user operation log. Examples of the operation include the number of colors, the number of copies, and instruction about image quality.

Frequency of use of a sheet for each size can be a user operation log.

(b-3) Power Consumption

Total power consumption within an entire use period or a particular use period (one day, one week, or one month), or distribution, a variation amount (differential), and an accumulated value (integral) of the total power consumption can be a power consumption parameter.

(b-4) Data about Consumption of Supplies

Total usage of toners, photosensitive elements, or sheets within an entire use period or a particular use period (one day, one week, or one month), or distribution, a variation amount (differential), and an accumulated value (integral) of the total usage can be data about consumption of supplies.

(b-5) Data about Occurrence of a Failure

Frequency of occurrence of a failure (for each type) within an entire use period or a particular use period (one day, one week, or one month), or distribution, a variation amount (differential), and an accumulated value (integral) of the frequency can be data about occurrence of a failure.

(b-6) Data about Operation Time (Runtime Data)

Operation time of a copier is measured by a measuring unit and stored in a storage unit.

(b-7) Number of Printing (Data about the Number of Operations)

The number is incremented ever one printing and a counted number is stored in a storage unit.

(c) Data about an Input Image

The following data is obtained from image data directly sent from a host computer or image data obtained from image processing on an image of an original read by a scanner.

The accumulated number of color pixels is obtained from counting of each pixel in image data containing R, G, B signals.

With a segmentation method disclosed in, for example, Japanese Patent No. 2621879, image data of an original is separated into text, halftone dot, photograph, and background, and ratio of the text to the halftone dot or the like can be obtained. Similarly, a ratio of color text to monochrome text or the like can be obtained.

Distribution of toner consumption in a main-scanning direction is obtained by counting the accumulated number of color pixels in each of the segmentations obtained by dividing an image into a plurality of areas in the main-scanning direction.

Image size is obtained from an image size signal generated by a control unit or distribution of color pixels in image data.

Type of a character (size or font) is obtained by attribute data of a character.

Detailed explanation about a method of acquiring various data to be referred to by the copier 601 is given below.

(1) Temperature Data

The copier 601 includes a variable resistance element as a temperature sensor that acquires temperature data. The variable resistance element has a simple structure based on simple principle and can be ultra compact.

(2) Humidity Data

A humidity sensor that can be compact is effective. Humidity sensor is based on principles such that when humidity-sensitive ceramics adsorb water vapor, ion conductivity increases due to adsorbed water, so that electric resistance of the ceramics decreases. The humidity-sensitive ceramics are made of porous material such as alumina-based, apatite-based, or $ZrO_2$—MgO based.

(3) Oscillation Data

An oscillation sensor is basically the same as a sensor that measures air pressure or the like. In consideration with installation onto a system, a sensor that is made of silicon and can be ultra compact is effective. The oscillation sensor measures a level of motion of an oscillator formed on a diaphragm made of thin silicon based on change in capacitance between opposite electrodes arranged opposite to the oscillator. Oscillation can be measured by using piezoresistive effect of Si diaphragm.

(4) Data about Toner Density in Developer (for Four Colors)

Toner density is detected and converted into data for each color. Well-known toner density sensors are effective. For example, a sensing system disclosed in Japanese Patent Application Laid-open, No. H6-289717 can be used. The sensing system detects toner density by measuring a change in permeability of developer in a developing device.

(5) Data about Uniformly-Charged Potential on a Photosensitive Element (for Four Colors)

A uniformly-charged potential of each of the photosensitive elements 40 (K, Y, M, C) is detected. Well-known surface potential sensors that detect a surface potential of an object are effective.

(6) Data about Potential on a Photosensitive Element after Exposure (for Four Colors)

A surface potential of each of the photosensitive elements 40 (K, Y, M, C) is detected after optical writing is completed in a manner similar to (5).

(7) Data about Percentage of a Color Area (for Four Colors)

A percentage of a color area for each color is obtained from an accumulated value of color pixels and an accumulated value of all pixels in input image data.

(8) Data about Amount of Toners in a Developed Image (for Four Colors)

Density of a toner image developed on each of the photosensitive elements 40 (K, Y, M, C) (amount of adhered toners per unit area) is obtained based on a received light intensity signal from the optical sensors 81 and 82.

(9) Tilt of a Leading Edge of a Sheet

Optical sensors are arranged within a sheet feed path between the sheet feed rollers 42 and the secondary transfer nip in the sheet feed unit 200 so that the optical sensors detect side edges of a leading end of a sheet in a direction perpendicular to a sheet conveying direction. A time from an output of a driving signal from the sheet feed rollers 42 to a time when a sheet passes through each of the optical sensors is measured, so that a tilt of the sheet in the sheet conveying direction is obtained based on a difference between detected times.

(10) Data about a Timing of Sheet Discharging

An optical sensor detects a sheet after the sheet passes through the discharging rollers 56 (see FIG. 2). The timing is measured based on a time at which a driving signal is output from the sheet feed rollers 42.

(11) Data about Total Current of a Photosensitive Element (for Four Colors)

Current flows from each of the photosensitive elements 40 (K, Y, M, C) to ground is detected. The current is detected by a current measuring unit arranged between a substrate of each of the photosensitive elements 40 (K, Y, M, C) and a ground terminal.

(12) Data about Driving Power of a Photosensitive Element (for Four Colors)

Driving power (current×voltage) used by a driving source (motor) of a photosensitive element during its operation is detected by using an ammeter or a voltmeter.

A timing of acquiring the above data is described below.

The above data (1) to (12) is read by the I/O control board 513 in response to a command from the engine control board 510 (i.e., the CPU of the engine control board 510) at an each predetermined timing. The engine control board 510 adds the total number of copies to read data and stores that data in a status database (not shown) allocated in the NV-RAM in the engine control board 510. Then, the engine control board 510 determines a status of each unit in the copier 601, adjusts control parameters depending on the status as appropriate, and determines a failure. The engine control board 510 stores data generated by status determination, such as status evaluation data, adjustment values of control parameters, and contents of a failure in the status.

FIG. 9 is a flowchart of a process of adjusting density of a toner image by the engine control board 510. When an image forming apparatus is powered ON or a predetermined number of printings are performed, a process control operation for updating a default state of an image forming apparatus is executed. The process control operation runs based on determination whether a normal operation signal is received or image forming operation has been completed by the normal operation signal, in response to issuance of a process adjustment operation signal from an upper controller. A process of adjusting density of a toner image in the process control operation is explained below with reference to FIG. 9.

That is, explanation is given about adjustment of toner image density (IDA) in which control parameters such as the emission intensity adjustment value R, the developing bias adjustment value Q, and the exposure adjustment value P are set. In the IDA, the engine control board 510 drives an imaging mechanism without imaging (Step S1). The engine control board 510 then adjusts emission intensity by a specular PD signal by converging received light signals of the specular PD in the optical sensors 81 and 82 into digital signals and adjusting current values of the LEDs in the optical sensors 81 and 82 so that the emission intensity becomes a reference value (target light intensity shown in FIG. 6) (Step S2). As a result, toner image density can be measured with desired precision regardless of variation or change over time of light emitting elements or light receiving elements or status change of a surface (surface dirt) of a photosensitive element or an intermediate transfer belt over time. Then, the adjustment value R is obtained (a difference to a fixed reference current value). The adjustment value R contains data about status of a surface (dirt) of a photosensitive element or an intermediate transfer belt.

Test pattern images with five different densities for each color (e.g., the toner image 83C1 or the like shown in FIG. 5B) are formed on a photosensitive element using a reference charging voltage and a reference developing bias, and then transferred onto the intermediate transfer belt 10 (Step S3). A diffuse PD signal from the test pattern images is measured and toner density of the test patterns transferred onto the intermediate transfer belt 10 is detected (Step S4).

FIG. 10 is a graph of a relationship (a characteristic line) between a development potential at a time of forming a toner image of the test pattern transferred on the intermediate transfer belt 10 and toner density detected by the optical sensors 81 and 82. A slope γ and an intercept x0 are calculated from a characteristic line that is a line obtained by linear approximation between the development potential and amount of adhered toners based on five points of received signals for each color (Step S5). Then, developing bias correction and exposure intensity correction are performed in which the intercept x0 is corrected to a reference intercept of the characteristic line and the slope γ is corrected to a reference slope of the characteristic line. The developing bias adjustment value Q and the exposure adjustment value P are obtained as differences to reference values (Step S6). The adjustment values R, Q, P are added with the total number of copies and then stored in the NV-RAM of the engine control board 510.

In the embodiments, developing bias and exposure intensity are adjusted. However, other process control values, such as charging potential or transfer current, that affect image density can be corrected.

The process control is performed to correct variation in charging amount of toners due to temperature change or humidity change or variation in sensitivity of a photosensitive element within an allowable range. Meanwhile, when a particular failure or events indicative of a failure or a maintenance request occur, measured values or parameters determined based on the measured values are disturbed. For example, a cleaner that removes residual toners from a photosensitive element after an image is transferred to maintain an appropriate charging exposure is generally made as a blade cleaning member. The blade cleaning member is provided with a blade that is made of urethane rubber and slides on the photosensitive element. With this cleaner, some toners are remained under the blade without being caught by the blade. Most of the remained toners pass through a charging and exposing unit and are collected at the time of developing. However, some toners lose their charging characteristics due to friction of the blade or their shapes are deformed, so that the toners are not collected even at the time of developing. As a result, some toners are non-electrostatically adhered to a region of a transfer member regardless whether the region is an image region or a non-image region and even transferred onto a sheet.

Figure 11A:
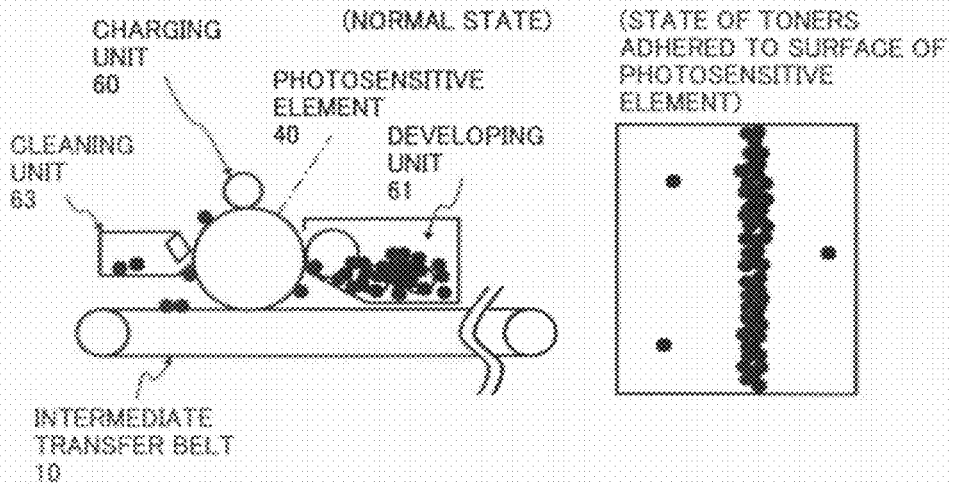
FIG. 11A is a schematic diagram for explaining how toners adhere to a surface of an image carrier in a normal state.

FIG. 11A is a schematic diagram for explaining how toners adhere to a surface of an image carrier in a normal state. The photosensitive element 40, the charging unit 60 subjected to application of charging bias, the developing unit 61 that develops an electrostatic latent image formed on a surface of the photosensitive element 40 into a toner image, and the cleaning unit 63 that cleans the photosensitive element 40 are arranged around the intermediate transfer belt 10.

As described above, a small amount of toner particles adhere to a non-image region as shown in FIG. 11A. However, the amount of the toner particles is too small to degrade image quality.

If a contact portion between the blade and the photosensitive element 40 is worn out due to continued sliding over time, cleaning performance of the blade degrades, so that more and more toners remain without being removed by the blade. If a large amount of toners pass by the blade at one time, the charging device degrades its charging performance due to dirt by the toners. Furthermore, performance of the exposing unit is degraded due to attenuation of the toners, and the developing unit cannot collect such a large amount of toners. As a result, an obtained image contains defects, such as a disturbing line, which is not acceptable to a user and requires replacement of the blade or the like.

Figure 11B:
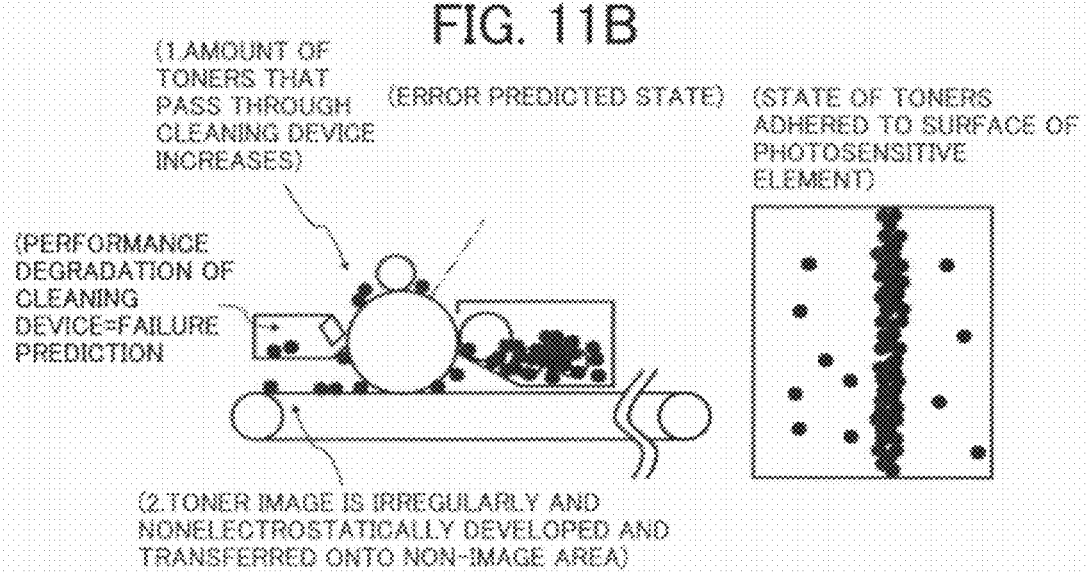
FIG. 11B is a schematic diagram for explaining how toners adhere to a surface of an image carrier in a maintenance sign detected state.

FIG. 11B is a schematic diagram for explaining how toners adhere to a surface of an image carrier in a maintenance-sign detected state. Although the amount of toners remained on the entire surface of the image carrier gradually and uniformly increases a little before a situation shown in FIG. 11B, critical image degradation hardly occurs in such a state. Therefore, a user cannot notice a failure. This state is called "mild scumming" as a maintenance sign that indicates a failure of a cleaner.

A relationship between a range of variation due to environmental change or change over time and variation due to mild scumming is described below.

Figure 12A:
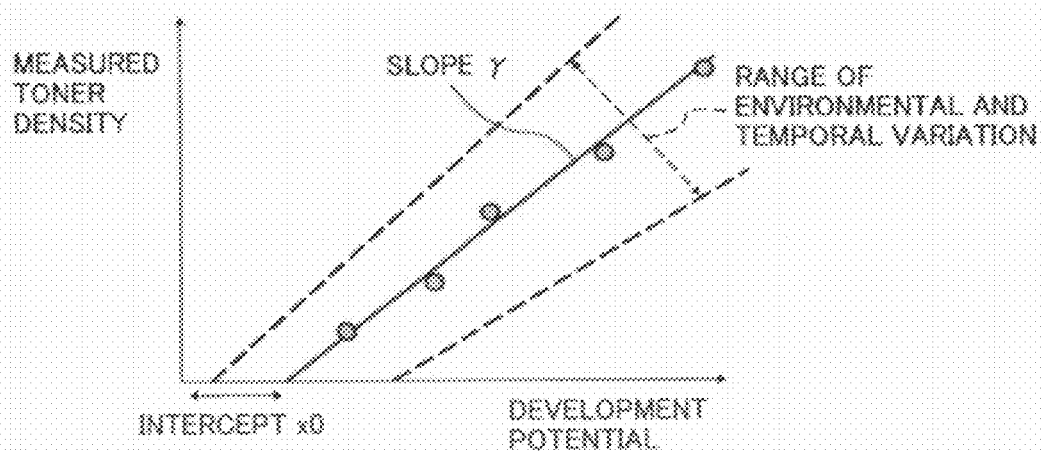
FIG. 12A is a graph of a characteristic line (solid line) with a variation range (dotted line) between a development potential and toner density when particular dirt is not present on the surface of the intermediate transfer belt.
Figure 12B:
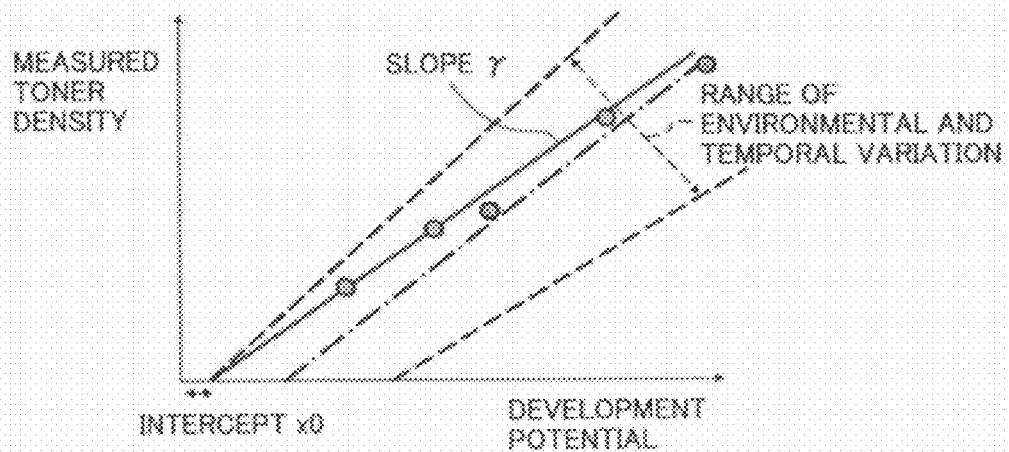
FIG. 12B is a graph of a characteristic line (solid line) with a variation range (dotted line) when a little dirt is present on the surface of the intermediate transfer belt.
Figure 13A:
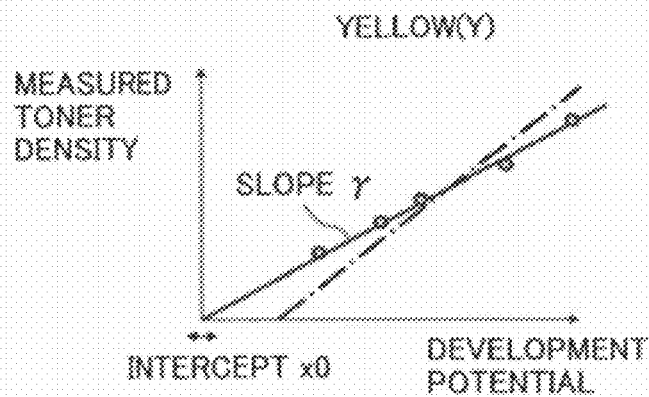
FIGS. 13A to 13D are graphs of characteristic lines (solid lines) of different colors when dirt is present on the surface of the intermediate transfer belt.
Figure 13B:
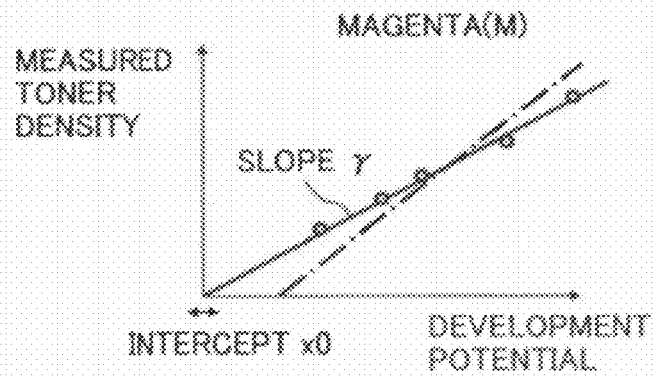
Figure 13C:
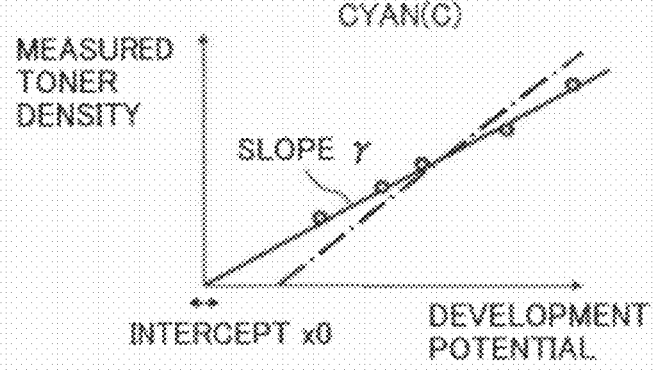
Figure 13D:
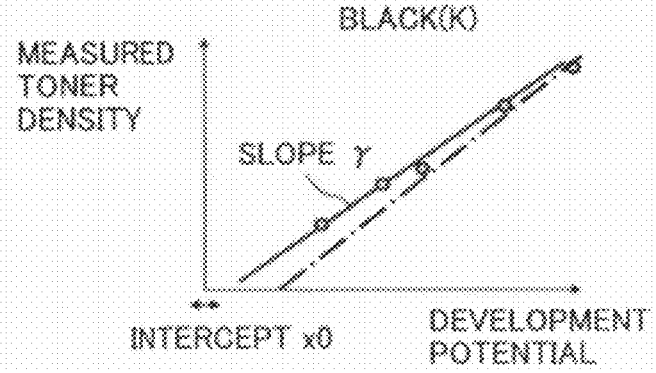

FIG. 12A is a graph of the characteristic line (solid line) with a variation range (dotted line) between a development potential and toner density when particular dirt is not present on the surface of the intermediate transfer belt 10. FIG. 12B is a graph of the characteristic line (solid line) with a variation range when a little dirt is present on the surface of the intermediate transfer belt 10.

Due to such dirt (toners), a measured value in a low toner density region of the characteristic line shown in FIG. 12B becomes larger that of the characteristic line shown in FIG. 12A. That is, a slope γ and an intercept x0 decrease. A characteristic line for each color at this state is shown in FIGS. 13A to 13D.

FIGS. 13A to 13D are graphs of the characteristic lines (solid lines) of different colors when dirt is present on the surface of the intermediate transfer belt 10. Generally, variation due to the dirt is not much different from a range of an environmental and temporal variation in toners or photosensitive elements. Therefore, it is difficult to determine occurrence of a failure from a variation in the slope γ or the intercept x0 for each color or variation in the adjustment value (correction parameter) P or Q determined based on the variation of the slope γ or the intercept x0. Thus, it is difficult to generate an alarm indicative of a failure or the like with good precision.

Due to such difficulties, a conventional device issues an alarm indicating a failure only when a target device is in a critical state. Therefore, it is difficult to promptly detect an event or a sign indicative of a failure or a maintenance necessity before a failure actually occurs.

FIG. 14 is a block diagram of the management apparatus 630. The management apparatus includes a system controller 638, a data collecting and distributing unit 631, the status database 632, the target-data generating unit 633, a target data memory 634, a constant database 636, the maintenance sign determining unit 635, a display control unit 637, and the display device 640. The system controller 638 controls the management apparatus 630. The status database 632 stores therein status data received from the copiers 601 to 607. The maintenance sign determining unit 635 performs first determination and second determination on target data 1 to n. In the first determination, each of the target data 1 to n is compared with a stamp determination reference value. In the second determination, weighted majority decision is performed. The maintenance sign determining unit 635 includes a trend determination table (not shown) containing a result of the first determination. The trend determination table will be described later. The constant database 636 stores therein the sign determination reference table (see FIG. 20) that contains a reference value used for the first determination and a weight value used for the second determination, in an associated manner. The data collecting and distributing unit 631 receives a communication request from one of the copiers 601 to 607, and then requests that copier to send status data. The data collecting and distributing unit 631 receives a plurality of types of status data from that copier at one time. Upon receipt of the status data, the data collecting and distributing unit 631 records received data in a new file and adds the file to a database for that copier in the status database 632. As much as a few thousands of copiers are to perform communication, and status data for each copier is stored in the status database 632 in real time in a manner described above. An inference engine for a maintenance sign determination is performed by the target-data generating unit 633, the target data memory 634, the maintenance sign determining unit 635, the constant database 636, and the display control unit 637. Due to the inference engine, maintenance sign determination is performed based on status data in the status database 632. When a maintenance sign is detected, an alarm is displayed on the display device 640 to notify an operator in a management center of the management apparatus 630. The maintenance sign determination is performed by computation containing relatively a small number of processing steps. Therefore, the inference engine can be implemented in each of the copiers. However, the inference engine is preferentially implemented in the management apparatus 630, so that inference quality can be assuredly and integrally improved when a target data generation method (e.g., a feature amount calculation method) or determination constants are enhanced. Furthermore, determination is performed using a boosting method containing relatively a small number of processing steps. Therefore, it is possible to continuously perform determination at a high processing speed on a large amount of data log (accumulated status data). In a conventional technology, a device performs primary status determination and then performs secondary determination when it is necessary, which leads to complicated implementation. According to the embodiment, such problems can be resolved due to a boosting method.

When an alarm that indicates a maintenance sign is issued from the inference engine in the maintenance sign determination, an operator sends a notice to a user of that copier to check a status. In addition, the operator takes necessary actions such as order of necessary parts by using a parts management system. For example, the operator calls a person who is responsible to call reception, so that service engineers make a visit to maintenance. The service engineer conducts maintenance such as replacement of necessary parts and then input operation report in the parts management system so that operation history can be reviewed.

Processing of accumulation of status data is described below.

Figure 15:
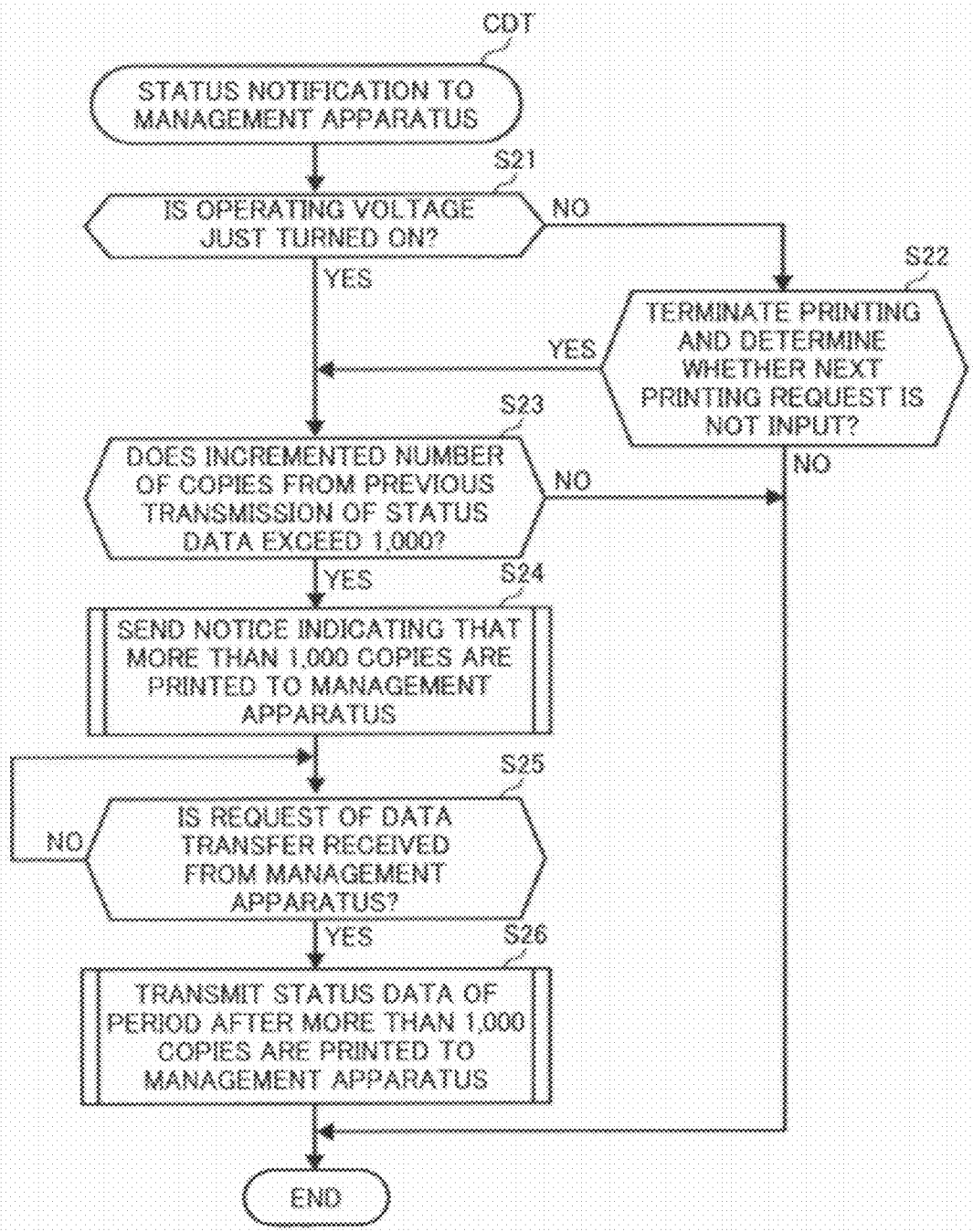
FIG. 15 is a flowchart of a process of transmitting status data from the copier to the management apparatus shown in FIG. 1.

FIG. 15 is a flowchart of a process of transmitting status data from the copier 601 to the management apparatus 630. The engine control board 510 determines whether an operating voltage is just turned ON (Step S21). When the operating voltage is just turned ON (Yes at step S21), the engine control board 510 determines whether the incremented number of copies from previous transmission of status data to the management apparatus 630 exceeds 1000 (Step S23). On the other hand, when the operating voltage is not just turned ON (No at step S21), the engine control board 510 terminates printing and copying operation (hereinafter, "printing" indicates both printing and copying as appropriate) and then determines whether a next printing request is not input (Step S22). When the printing is terminated and the next printing request is not input (Yes at Step S22), process control proceeds to Step S23. On the other hand, when the printing is terminated and the next printing request is input (No at Step S22), process control ends.

When the incremented number of copies from previous transmission of status data to the management apparatus 630 exceeds 1000 (Yes at Step S23), the engine control board 510 sends a notice indicating that unsent status data is accumulated to the management apparatus 630 via the controller 501 of the copier 601 (Step S24). Then, the engine control board 510 determines whether a request for transfer of status data is received from the data collecting and distributing unit 631 (Step S25). Upon receipt of the request of transfer of status data from the data collecting and distributing unit 631 (Yes at Step S25), the controller 501 transmits status data that is accumulated in the NV-RAM of the engine control board 510 just after previous transmission of status data to the management apparatus 630 (Step S26). When the incremented number of copies from previous transmission of status data to the management apparatus 630 does not exceed 1000 (No at Step S23), process control ends.

The other copiers perform the same status data transmission to the management apparatus 630. The copier can be configured to make communication with the management apparatus 630 at a predetermined interval of a motor operation time because the incremented number of copies is not always proportional to a driving time of a motor that causes degradation of a machine. The predetermined interval can be set or adjusted as appropriate to adjust data amount to be communicated.

Figure 16:
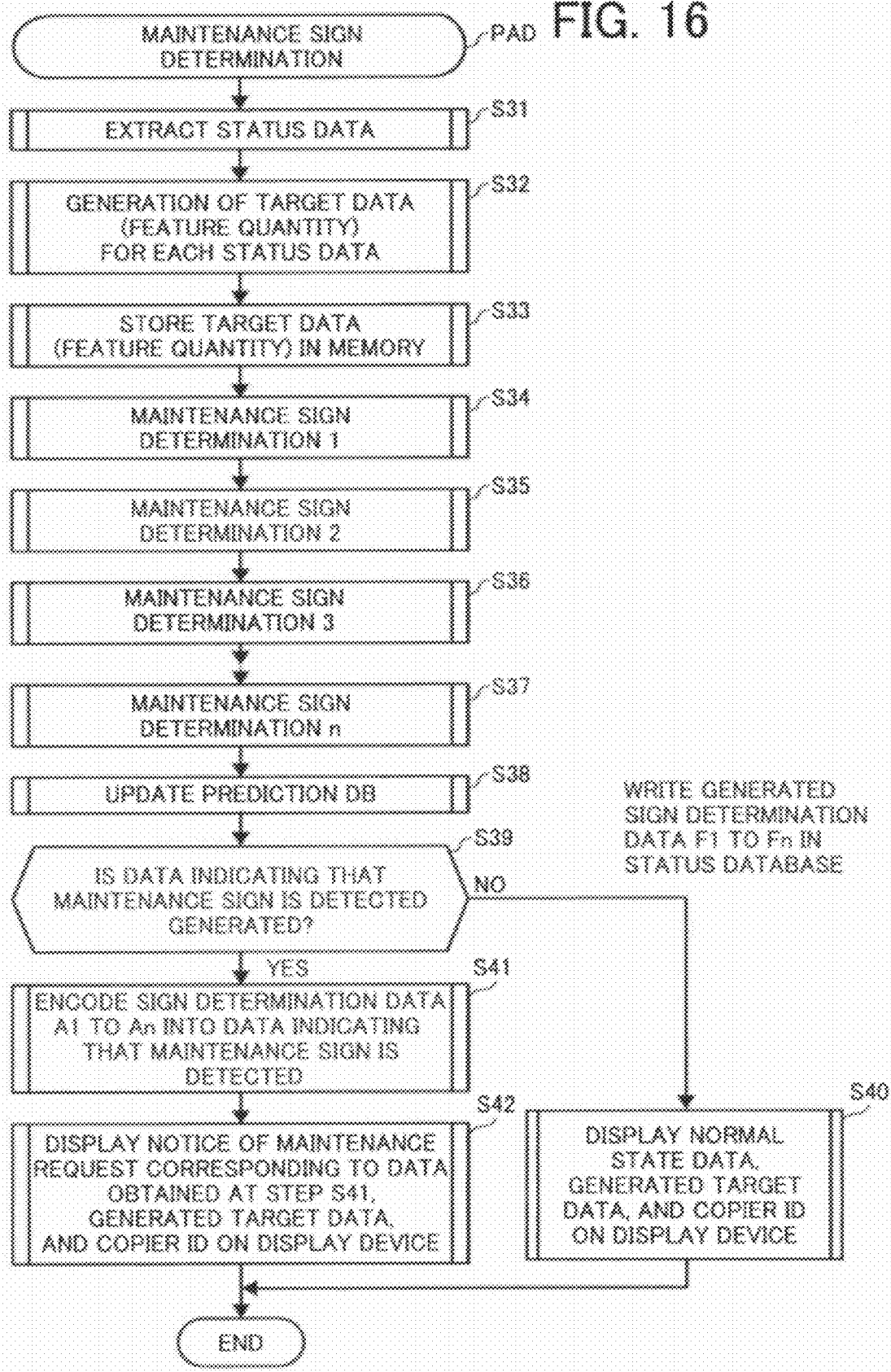
FIG. 16 is a flowchart of a process of maintenance sign determination performed by the management apparatus shown in FIG. 1.
Figure 18A:
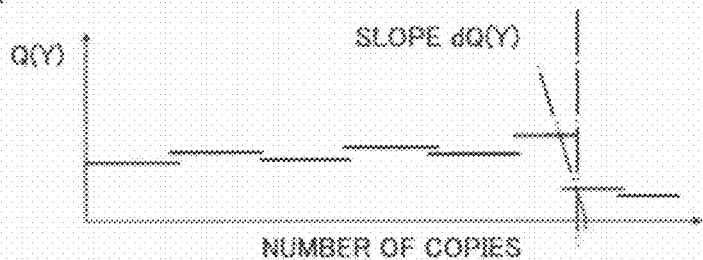
FIGS. 18A to 18D are graphs representing changes of developing bias adjustment values for each color when toner density is adjusted.
Figure 18B:
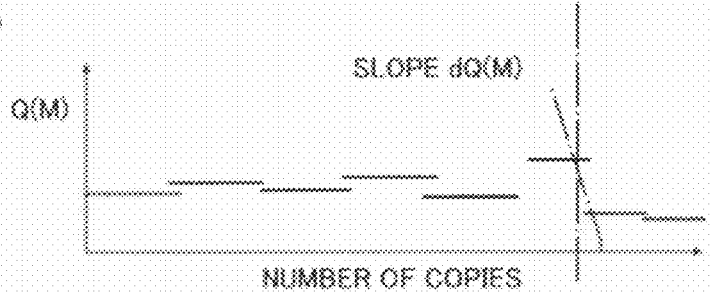
Figure 18C:
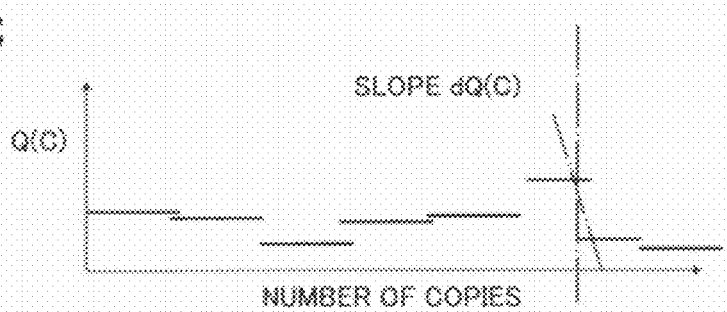
Figure 18D:
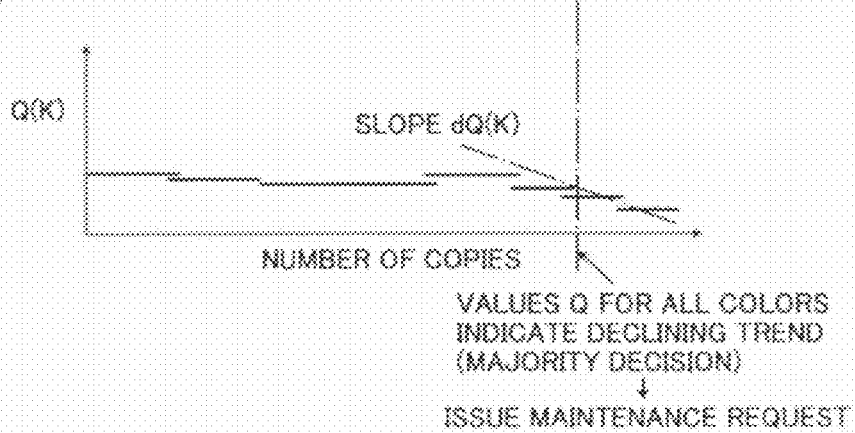

FIG. 16 is a flowchart of maintenance sign determination PAD performed by the system controller 638 of the management apparatus 630. The system controller 638 executes the maintenance sign determination PAD on a status data group in the status database 632 for a target copier upon receipt of status data from the copier as described above. In the first embodiment, 31 types of status data in the status data group are subjected to the maintenance sign determination PAD.

In the maintenance sign determination PAD, the management apparatus 630 sequentially extracts 16 types of status data from the latest one with respect to each status data R, Q, P among the 31 types of the status data based on feature amount calculation performed by the target-data generating unit 633 that executes the inference engine of the maintenance sign determination (Step S31). Then, feature amount is calculated with respect to each of the status data R, Q, P (Step S32). According to the first embodiment, an index value indicative of feature is obtained from a temporal distribution (variation pattern) of the 16 types of the status data. The index value is obtained using particular processing that is determined with respect to each data (each of the status data R, Q, P). As shown in FIG. 17, the feature amount contains ten types of data $Rv1$, $Rv2$, $Q(Y)v$, $Q(M)v$, $Q(C)v$, $Q(K)v$, $P(Y)v$, $P(M)v$, $P(C)v$, $P(K)v$. The first determination (Step S34) is performed only on the above feature amount for an image in black (K) such that occurrence of a cleaning failure (cleaning incompletion) on the photosensitive element 40 (K) and/or a cleaning failure (including fixation of dirt) on the intermediate transfer belt 10 is determined.

FIG. 17 is a flowchart of a process of generating target data (feature amount) of the emission intensity adjustment value R of the optical sensors 81 and 82, the developing bias adjustment value Q for each color, and the exposure adjustment value P for each color. Only processing for calculating feature amount of the emission intensity adjustment value R, the developing bias adjustment value Q, and the exposure adjustment value P is described below. A feature amount $Rv1$ of an emission intensity adjustment value R1 of the optical sensor 81 is calculated (Step S51). The emission intensity adjustment value R1 is generated such that the number of copies between the latest data and the oldest data among the 16 types data is equally divided by 15, and a value of data corresponding to each division point is calculated by interpolation or extrapolation, and a new data group containing new 16 types of data is generated (Step S511). Then, following values are calculated from the new 16 types of data: mean value $Rtm1$ of the adjustment value R1; mean value $Rsm1$ from the latest data to the fourth data; mean value $Rsm2$ from the fifth data to the eighth data; mean value $Rsm3$ from the ninth data to the twelfth data; mean value $Rsm4$ from the thirteenth data to the sixteenth data; difference value $Rsm1-Rsm2$; difference value $Rsm2-Rsm3$; difference value $Rsm3-Rsm4$; and maximum difference value $Rsmm1$ of the calculated difference values (Step S512). Then, the feature amount $Rv1$ of the emission intensity adjustment value R1 is obtained by $Rv1 = Rk \times |Rsmm1|/|Rtm1|$ (Step S513). The Rk is a factor (a fixed value) for adjusting a range of calculation values. Thus, the feature amount $Rv1$ of the emission intensity adjustment value R is calculated at Step S51. Other feature quantities are calculated in the following steps similar to Step S51. A feature amount $Rv2$ of an emission intensity adjustment value R2 of the optical sensor 82 is calculated at Step S52. Feature quantities $Q(Y)v$, $Q(M)v$, $Q(C)v$, $Q(K)v$ of the developing bias adjustment values $Q(Y)$, $Q(M)$, $Q(C)$, $Q(K)$ for adjusting density of color toners are calculated at Steps S53 to S56, respectively. Feature quantities $P(Y)v$, $P(M)v$, $P(C)v$, $P(K)v$ of the exposure intensity adjustment values $P(Y)$, $P(M)$, $P(C)$, $P(K)$ for adjusting density of color toners are calculated at Steps S57 to S60, respectively.

The calculated feature quantities of the developing bias adjustment values $Q(Y)$, $Q(M)$, $Q(C)$, $Q(K)$ correspond to slopes or speeds of changes of adjustment values as shown in FIGS. 18A to 18D, respectively. That is, FIGS. 18A to 18D are graphs representing changes of developing bias adjustment values for each color due to adjustment of toner density.

The feature amount is a target data to be subjected to the maintenance sign determination. The feature amount can be obtained by various calculation formulas using a difference value as described above, a regression value of a signal change, and a standard deviation, a maximum value, or a mean value of a plurality of types of latest or near latest data. For extracting feature amount of signals in a time-series manner, an arbitrary method can be used as appropriate from among various methods such as ARIMA model.

A maintenance sign is detected when a signal that is stable in a normal state particularly fluctuates. It is preferable to determine what feature amount extraction method is to be employed based on the maintenance sign. An index of a time can be not only the total number of copies but also a timestamp of a total operating time or an actual time. Furthermore, a feature amount that is obtained without time-series calculation or status data itself can be the target data of the maintenance sign determination. For example, a status detected value at a time of status detection can be added to the target data. That is, the target data to be subjected to the maintenance sign determination is either one or both of the feature amount generated based on status data and the status data.

Referring back to FIG. 16, the calculated feature amount and the generated other target data are stored in the target data memory 634 (Step S33). At Steps S34 to S37, the maintenance sign determination is performed n times using several types or all types of the target data in the generated target data group. Then, a sign determination reference table is updated by storing generated sign determination data F1 to Fn in the status database 632 (Step S38).

FIG. 19 is a flowchart of data processing commonly performed in the maintenance sign determination 1 to n at Steps S34 to S37 shown in FIG. 16. As described above, at Steps S34 to S37, the maintenance sign determination is performed n times (Steps S34 to S37). In each of the maintenance sign determination, a trend of each target data used in each of the maintenance sign determination is determined and positive/negative sign data sgn is generated (Step S71). Then, a trend determination table (an area of the RAM in the management apparatus 630) (not shown) is updated by writing a result of trend determination to the trend determination table (Step S72). In the trend determination, a stamp determination is performed as the first determination for determining whether each target data is larger or smaller than a reference value. In the stamp determination, the target data is binarized in the following manner. When the target data is equal to or smaller than the reference value b of each data type (indicated by, e.g., an identification number for each of the data R, Q, P) in the sign determination reference table corresponding to the currently performed the maintenance sign determination (one of 1 to n) stored in the constant database 636, the target data is set to "0" indicating that a maintenance sign is not detected. On the other hand, when the target data is larger than the reference value b, the target data is set to "1" indicating that a maintenance sign is detected.

Next, weighted majority decision as the second determination is performed on a result of the trend determination (Step S73). Specifically, a weight value a set for each target data in the sign determination reference table (FIG. 20) is added to the target data. That is, when a trend determination result is "1" indicating that a maintenance sign is detected, the weight value α is added as a negative (−) value to the target data and when the trend determination result is "0" indicating that a maintenance sign is not detected, the weight value α is added as a positive (+) value to the target data. The positive/negative sign data is represented as sgn and an added value corresponds to a maintenance sign index value F. The maintenance sign index value F is stored in a sign index value table (not shown) provided for each maintenance sign determination (Step S74). The maintenance sign index value table corresponds to one area of the RAM in the management apparatus 630. When the maintenance sign index value F is smaller than zero, sign determination data A set to "1" indicating that a maintenance sign is detected is generated and when the maintenance sign index value F is larger than zero, sign determination data A set to "0" indicating that a maintenance sign is not detected is generated (Step S75).

FIG. 23 is a flowchart of a processing procedure of the first determination at Step S34.

In the first determination at Step S34, each of the target data Rv1, Rv2, Q(Y)v, Q(M)v, Q(C)v, Q(K)v, P(Y)v, P(M)v, P(C)v, P(K)v is binarized (Step S81). Specifically, when the target data is equal to or smaller than the reference value b of each data (e.g., each data is identified by No. 1 to 10) in a sign determination reference table of the first maintenance sign determination, the target data is set to "0" indicating that a maintenance sign is not detected. On the other hand, when the target data is larger than the reference value b, the target data is set to "1" indicating that a maintenance sign is detected. The sign determination reference table contains similar data shown in FIG. 20 although a total status data number is not 31 but 10 because of the number of the target data Rv1, Rv2, Q(Y)v, Q(M)v, Q(C)v, Q(K)v, P(Y)v, P(M)v, P(C)v, P(K)v. In this state, reference values b1 to b10 are stored in the sign determination reference table as the reference value b. Then, calculated positive/negative sign data sgn is added to the trend determination table (Step S82).

Figure 21A:
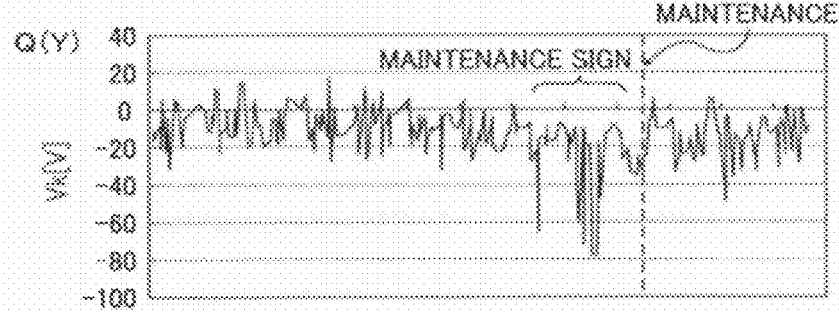
FIGS. 21A to 21E are graphs representing changes of developing bias adjustment values for each color in the copier and the maintenance sign index value calculated by a maintenance sign determining unit generated based on the developing bias adjustment value.
Figure 21B:
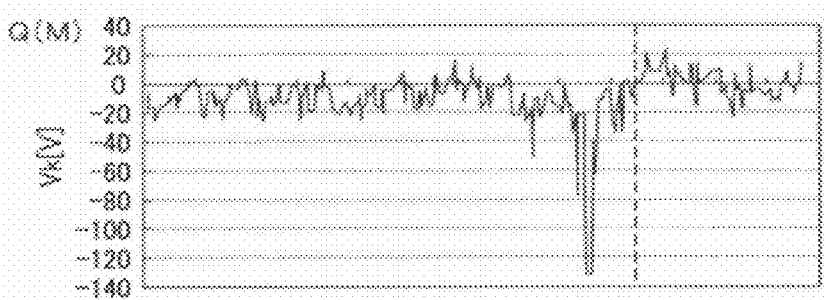
Figure 21C:
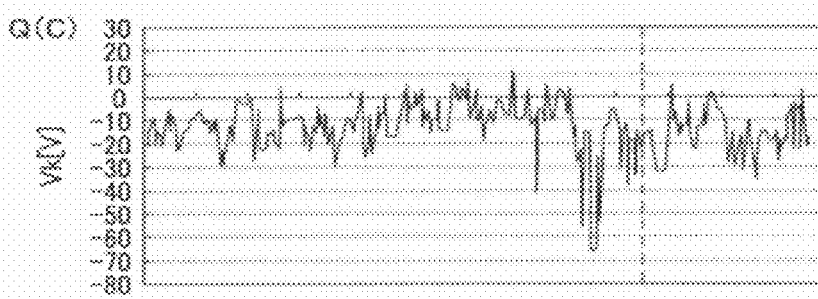
Figure 21D:
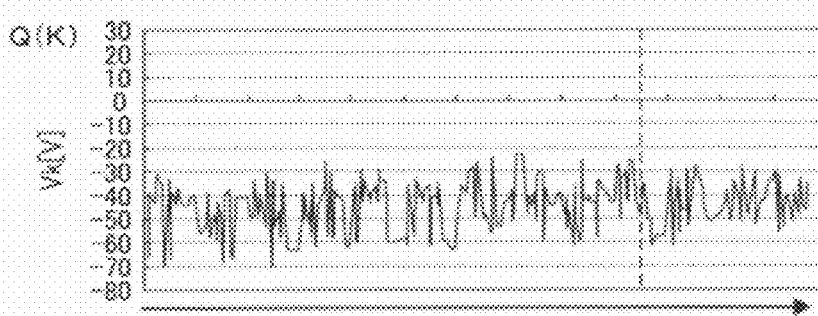
Figure 21E:
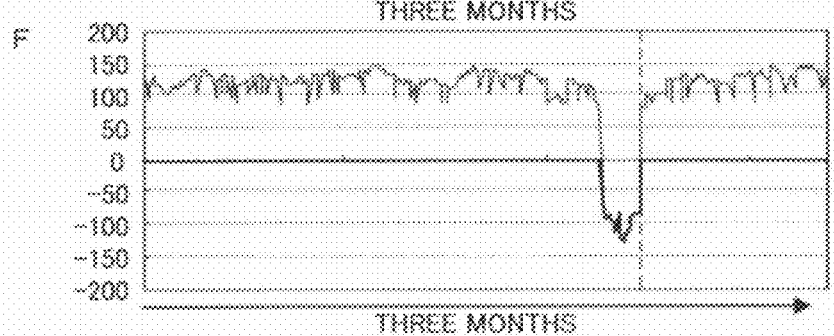

Next, weighted majority decision as the second determination is performed on a result of the trend determination. A maintenance sign index value Fbc is calculated (Step S83). Specifically, the weight value α (α1 to α10) set for each target data in the sign determination reference table is added to the target data as a negative (−) value when a trend determination result is "1" indicating that a maintenance sign is detected and as a positive (+) value when the trend determination result is "0" indicating that a maintenance sign is not detected. The positive/negative sign data is represented as sgn and an added value corresponds to the maintenance sign index value Fbc. The maintenance sign index value Fbc is added to a maintenance sign index value table 1 (not shown) of the first determination, so that the maintenance sign index value is updated (Step S84). FIG. 21E is an example of the maintenance sign index value Fbc, and a few other examples are shown in FIGS. 22A to 22E. When the maintenance sign index value Fbc is smaller than zero, sign determination data A set to "1" indicating that a maintenance sign is detected is generated and when the maintenance sign index value Fbc is larger than zero, sign determination data A set to "0" indicating that a maintenance sign is not detected is generated (Step S85).

Referring back to FIG. 16, continued explanation is given. The 31 types of target data generated at Step S32 are classified into groups that determine particular signs of a failure such as a cleaning failure, an incomplete image, registration error on a sheet, toner scarcity, or hardware error. One type of target data can be classified into a plurality of groups. In the first maintenance sign determination at Step S34, the 10 types of target data (feature amount) Rv1, Rv2, Q(Y)v, Q(M)v, Q(C)v, Q(K)v, P(Y)v, P(M)v, P(C)v, P(K)v are set in a group that is used for determining signs indicating cleaning failure. Through the second maintenance sign determination at Step S35 to the n-th maintenance sign determination at Step S37, other signs indicative of registration error on a sheet, toner scarcity, hardware error, or other errors are determined.

When the first to the n-th maintenance sign determination are performed, the inference engine of the maintenance sign determination in the management apparatus 630 determines whether sign determination data A1 to An are set to "1" indicating that a maintenance sign is detected (Step S39). When all types of the sign determination data A1 to An are set to "0" indicating that a maintenance sign is not detected (No at Step S39), notification data that indicates a normal state, generated target data, and ID of a target copier are displayed on the display device 640 (Step S40). When one or more of the sign determination data A1 to An are set to "1" indicating that a maintenance sign is detected (Yes at Step S39), a sign (trend) of a detected state (e.g., a cleaning failure, an incomplete image, registration error on a sheet, toner scarcity, or hardware error) is encoded to data indicative of the detected state (Step S41), and that data or a command for requesting maintenance to resolve the detected state are displayed on the display device 640, in association with a calculated feature amount and an ID of a target copier (Step S42).

When receiving input indicative of data initialization due to completion of maintenance from the operation board 500, the engine control board 510 performs exception processing so that a change of the target data being processed just after completion of maintenance is not erroneously determined as a maintenance sign. In the exception processing according to the first embodiment, status data right after completion of maintenance is written to the status database (NV-RAM), appended with data indicating that the status data is updated. When the appended data is contained in the 16 types of status data extracted at Step S31, the target-data generating unit 633 does not generate target data and does not perform the trend determination in each of the maintenance sign determination 1 to n at Step S32. Then, the target-data generating unit 633 sets the trend determination data of the status data to "0" indicating that a maintenance sign is not detected.

When recognizing an abnormal state from the collected status data, the engine control board 510 displays a notice of the abnormal state on a display of the operation board 500 and sends a status data set, details (type) of the abnormal state, and a notice of occurrence of the abnormal state to the management apparatus 630. The data collecting and distributing unit 631 receives the above data, stores the data in a status database of a target copier, and displays data about the abnormal state from among the received data on the display device 640. The abnormal state may be a state that is not to be determined by the maintenance sign determination PAD. In that case, a reference value and a weight value may not be appropriately adjusted for the abnormal state. To avoid such a situation, the management apparatus 630 is provided with a function (a computer program) for updating the sign determination reference table so that the reference value and the weight value for each constant table in the management apparatus 630 can be changed as appropriate. Therefore, an operator who has administrator right can adjust the reference value and the weight value in the sign determination reference table by using this function.

The management apparatus 630 performs determining unit generation processing based on interactive operation with an operator who has administrator right. In the determining unit generation processing, the reference value b and the weight value a to be used in the trend determination (first determination) and the sign determination (second determination) of the maintenance sign determination (1 to n) that are most effective (most related maintenance sign determination) to detect (determine) a maintenance sign that has not been determined by the management apparatus 630 and are notified by a copier are generated (corrected) based on status data of a group of copiers of a single model collected from the status database 632. Then, a sign determination reference table that contains the above data is generated and the corresponding sign determination reference table in the constant database is updated. The management apparatus 630 determines whether a maintenance sign is detected in each copier by using the first determining unit and the second determining unit. Then, the management apparatus 630 updates the reference value and the weight values used by the first determining unit and the second determining unit such that the reference value and the weight value are adjusted based on status data in the status database in response to data indicating a maintenance sign and transmitted from a group of the copier 601 of a single model. After the above processing, the management apparatus 630 can determine the maintenance sign that has been notified by a copier.

In the maintenance sign determination PAD, each determination is defined only by the reference value b in the stamp determination for each target data, the sign (sgn) of the weight value $\alpha$ when the target data is larger than the reference value b, and the weight value $\alpha$. Furthermore, the weighted majority decision is a calculation represented by $\Sigma sgn \times \alpha$ in which a large weight value $\alpha$ is added to target data that is more influential. Therefore, processing load on the weighted majority decision is extremely small.

The sign determination reference table (FIG. 20) is described in detail below. FIG. 20 is an example of the sign determination reference table containing a reference value b used for the trend determination for each target data and a weight value $\alpha$ to be added to the trend of each target data when calculating a maintenance sign index value F. The sign determination reference table contains an identification number (No.) for each target data, the reference value b, the weight value $\alpha$, the trend determination result sgn as a positive/negative sign data, in an associated manner. The sign determination reference table provided in the management apparatus 630 is generated by using supervised learning algorithm such as a boosting method. The boosting method is a well known art that is disclosed in, for example, "Information geometry for statistical pattern identification", Mathematical science No. 489, March 2004. Specifically, status data obtained from a normal state and another status data from a state in which a maintenance sign is detected are prepared. For example, the above status data is obtained from a status data log acquired when a device is subjected to an endurance test. That is, when a failure occurs, a period before the failure is estimated as a maintenance sign detected period and used as the status data. According to the present invention, status data logs were acquired from more than 10 image forming apparatuses subjected to examination for three months to collect and examine failure events.

FIGS. 21A to 21E are graphs representing changes of the developing bias adjustment values Q(Y), Q(M), Q(C), Q(K) for each color in the copier 601 and the maintenance sign index value F generated and calculated by the maintenance sign determining unit 635. Specifically, FIGS. 21A to 21D depict changes of the developing bias adjustment values Q(Y), Q(M), Q(C), Q(K) within three months when a copier has experienced a cleaning failure for black color and then the cleaning failure has been resolved. Although a large number of types of other status data were also collected and used, the status data (the developing bias adjustment value) Q is representatively described below because it largely changed. It can be seen from FIGS. 21A to 21D that the developing bias values Q(Y), Q(M), Q(C) largely change before the cleaning failure is detected.

In this state, the target data generation processing (including feature amount calculation processing) described in connection with Steps S32 and S51 is performed. From among the generated 31 types of target data, a few types or all types (j) of the target data to be subjected to the maintenance sign determination (one of 1 to n) is depicted in a graph with a total number of copies on x-axis. Then, a maintenance sign detected period is estimated from the graph. A period corresponding to the maintenance sign detected period is labeled to −1 (the maintenance sign detected period) and the rest of the period is labeled to +1 (a normal period). Then, iterative learning is performed j times by boosting, so that reference values b1 to bj, positive/negative sign data sgn1 to sgnj, and weight values α1 to αj are generated. The reference values b1 to bj and the weight values α1 to αj are contained in the sign determination reference table. FIG. 20 is an example of the sign determination reference table when j=31.

FIG. 21E is a graph representing an exemplary maintenance sign index value F calculated based on the sign determination reference table described above. It can be found from FIG. 21E that learning is appropriately performed using the labeled and supervised data, so that a weak determining unit (the first determination at Steps S71 and S81) that changes the maintenance sign index value F to a negative value only in the maintenance sign detected period and a strong determining unit (the second determination at Steps S73 to S75 and S83 to S85) that performs weighted majority decision are generated.

Explanation is given on an examination result whether the determining units can obtain an appropriate result from test data that has not been used for learning with reference to FIGS. 22A to 22E. The examination is performed such that feature quantities are extracted in the above manner from the status data of five copiers (Nos. 1 to 5) in which the same failures occur. FIGS. 22A to 22E are graphs representing changes of the maintenance sign index values F in five different copiers. It can be found from FIGS. 22A to 22E that the maintenance sign index values F obtained based on the reference values b and the weight values α changed to negative values in a desired manner only in the maintenance sign detected periods before failures occur. Thus, it is confirmed that the maintenance sign can be determined in a desired manner.

As described above, the first determining unit can determine a maintenance trend by determining whether the target data is smaller or larger than a reference value set for each target data. Therefore, it is possible to reduce calculation load and attain desired determination precision. Furthermore, the first determining unit can be a device having a simple structure, such as a stamp determining device, that performs simple data processing. Therefore, it is possible to reduce calculation load and attain desired determination precision. Moreover, a determination result indicating that a maintenance sign is detected is output and notified to an operator, so necessary maintenance can be promptly performed based on the maintenance sign before a failure actually occurs. Furthermore, it is possible to determine whether a sign indicating an image density error (color density error for a color image) caused by a cleaning failure is present. When it is determined that a sign indicating a cleaning failure is detected, such determination by the second determining unit can be converted into data indicating a cleaning sign. Therefore, it is possible to prevent occurrence of the cleaning failure. Moreover, when it is determined that a sign indicative of a cleaning failure is present, data indicating that the sign is detected is output. Therefore, it is possible to prevent occurrence of a cleaning failure and perform maintenance in a planned manner.

Furthermore, a determination reference value used by the first determining unit can be adjusted by a first updating unit and a weight value used by the second determining unit can be adjusted by a second updating unit. Therefore, the management apparatus can perform the maintenance sign determination with updated adjustment values. Thus, determination precision can be enhanced based on a maintenance sign determination result by the management apparatus.

Moreover, the maintenance sign determination is integrally performed by the management apparatus, so that it is possible to assuredly and integrally improve a quality of inference when a data generation method (e.g., a feature amount calculation method) is improved or a determination constant is updated. Furthermore, the boosting method containing relatively a small number of processing procedures is used for the determination. Therefore, it is possible to sequentially perform the determination on a large amount of logs (accumulated status data) at a high processing speed.

Moreover, target data is generated based on a plurality of types of status data and the maintenance sign determination is performed on that data. Therefore, it is possible to perform the maintenance sign determination based on perspective target data with desired precision.

A second embodiment of the present invention is described below. A management system according to the second embodiment includes the same hardware as that described in the first embodiment.

The management apparatus 630 according to the second embodiment performs the following processing based on interactive operation with an operator that operates the management apparatus 630 via the personal computer PCa. In the processing, the reference value b and the weight value α used in the trend determination (the first determination) and the sign determination (the second determination) are generated as the sign determination reference table based on status data of a group of copiers of a single model collected from the status database 632. The trend determination (the first determination) and the sign determination (the second determination) are performed to detect (determine) a maintenance sign that has not been determined by the management apparatus 630 using a few or all of the 31 types of target data and are notified by a copier. Then, the management apparatus 630 generates an additional sign determination reference table containing the above data. The management apparatus 630 also generates an additional maintenance sign determination containing processing such as maintenance sign trend determination (first determination), weighted majority decision and sign determination (second determination), and display of a result of the maintenance sign determination on target data based on the additional sign determination reference table. Then, the additional maintenance sign determination is added to an inference engine of the maintenance sign determination. The inference engine generates a target data group, and performs the maintenance sign determination 1 to n described in the first embodiment and the additional maintenance sign determination in a serial manner. Other configurations and functions of the second embodiment are the same as those described in the first embodiment.

As described above, when the management apparatus cannot determine whether a maintenance sign is detected based on the target data, the first determining unit and the second determining unit are additionally set in the management apparatus so that a maintenance sign notified by an image forming apparatus can be determined by the management apparatus. Therefore, the maintenance sign determination can be more reliable.

A third embodiment of the present invention is described below. A management system according to the third embodiment includes the same hardware as that described in the first embodiment.

The management apparatus 630 according to the third embodiment generates status data for generating the 31 types of target data described above and maintenance sign determination that uses both the status data and other status data. The management apparatus 630 performs the following processing based on interactive operation with an operator that operates the management apparatus 630 via the personal computer PCa. In the processing, a new target data group, the reference value b, and the weight value α used in the trend determination (the first determination) and the sign determination (the second determination) are generated as the sign determination reference table based on status data of a group of copiers of a single model collected from the status database 632. The trend determination (the first determination) and the sign determination (the second determination) are performed to detect (determine) a maintenance sign that has not been determined by the management apparatus 630 using a few or all of the 31 types of target data and status data other than the 31 types of target data and are notified by a copier. Then, the management apparatus 630 generates an additional sign determination reference table containing the above data. The management apparatus 630 also generates an additional maintenance sign determination containing processing such as maintenance sign trend determination (first determination), weighted majority decision and sign determination (second determination), and display of a result of the maintenance sign determination on target data based on the additional sign determination reference table. Then, the additional maintenance sign determination is added to an inference engine of the maintenance sign determination. Similarly, at Step S32 in which target data is generated in the maintenance sign determination PAD, target data related to new target data that is added due to the additional maintenance sign determination is generated.

After the additional maintenance sign determination is added, a target data group is calculated (Step S32). Then, the management apparatus 630 performs the maintenance sign determination 1 to n described in the first embodiment and the additional maintenance sign determination in a serial manner. Other configurations and functions of the third embodiment are the same as those described in the first embodiment.

As described above, if the management apparatus cannot detect a sign corresponding to a failure based on the target data in the existing maintenance sign determination, the management apparatus generates new target data. Then, an additional first determining unit and an additional second determining unit detects whether a maintenance sign is present based on the generated new target data are set in the management apparatus. Therefore, it is possible to determine a maintenances sign corresponding to the failure before that failure actually occurs. Thus, it is possible to improve determination precision against unknown failures and handle a plurality of failures.

A fourth embodiment of the present invention is described below. A management system according to the fourth embodiment includes the same hardware as that described in the first embodiment.

The management apparatus 630 according to the fourth embodiment determines a system error of the management system that includes a plurality of copiers and the management apparatus 630.

FIG. 24 is a flowchart of the maintenance sign determination PADa performed by the management apparatus 630 according to the fourth embodiment. Processing performed at Steps S31 to S38 are the same as those described in connection with FIG. 16. The system controller 638 of the management apparatus 630 determines whether one or a few of generated sign determination data A1 to An are set to "1" indicating that a maintenance sign is detected in the maintenance sign determination 1 to n (Step S39). When it is determined that one or a few of the sign determination data A1 to An is set to "1" indicating that a maintenance sign is detected in the maintenance sign determination 1 to n (Yes at Step S39), the system controller 638 adds the number of the sign determination data that is set to "1" to the total number Tan that represent the total number of detection of the maintenance sign in the status database 632 for all copier gropes (Step S44). Then, the system controller 638 determines whether the updated number Tan is equal to or larger than a set value Tva (Step S45). When it is determined that the updated number Tan is equal to or larger than the set value Tva (Yes at Step S45), the system controller 638 displays a notice indicating that maintenance is necessary to the system on the display device 640 (Step S46), and process control proceeds to Step S41. For example, it is possible to notify a system error when the updated number Tan largely exceeds the set value Tva.

On the other hand, when it is determined that the updated number Tan is smaller than the set value Tva (No at Step S45), the sign determination data is encoded to data indicating a sign (trend) corresponding to a detected state (e.g., a cleaning failure, an image error, registration error on a sheet, toner scarcity, or hardware error) (Step S41). Then, the detected sign or a notice indicating that maintenance is necessary to resolve a state indicated by the detected sign is displayed on the display device 640, in association with a calculated feature amount and an ID of a target copier (Step S42).

When it is determined that the sign determination data A1 to An are not set to "1" indicating that a maintenance sign is detected in the maintenance sign determination 1 to n (No at Step S39), the system controller 638 displays data indicating a normal state, generated target data, and an ID of a target copier on the display device 640, in an associated manner (Step S40).

In the first to the fourth embodiments, a plurality of the maintenance sign determination 1 to n are sequentially (in a serial manner) performed using a pair of inference engines (the target-data generating unit 633, the target data memory 634, the maintenance sign determining unit 635, and the constant database 636). However, it is possible to provide a plurality of pairs (n pairs) of the inference engines even with backup engines depending on the n number of the maintenance sign determination 1 to n or according to needs, so that the inference engines are executed in parallel (simultaneously).

As described above, how many times the maintenance sign is detected can be displayed on a display unit and pairs of the maintenance sign determination can be performed in a serial or a parallel manner. Therefore, the maintenance sign determination can be performed at a high processing speed and with desired precision.

Figure 25:
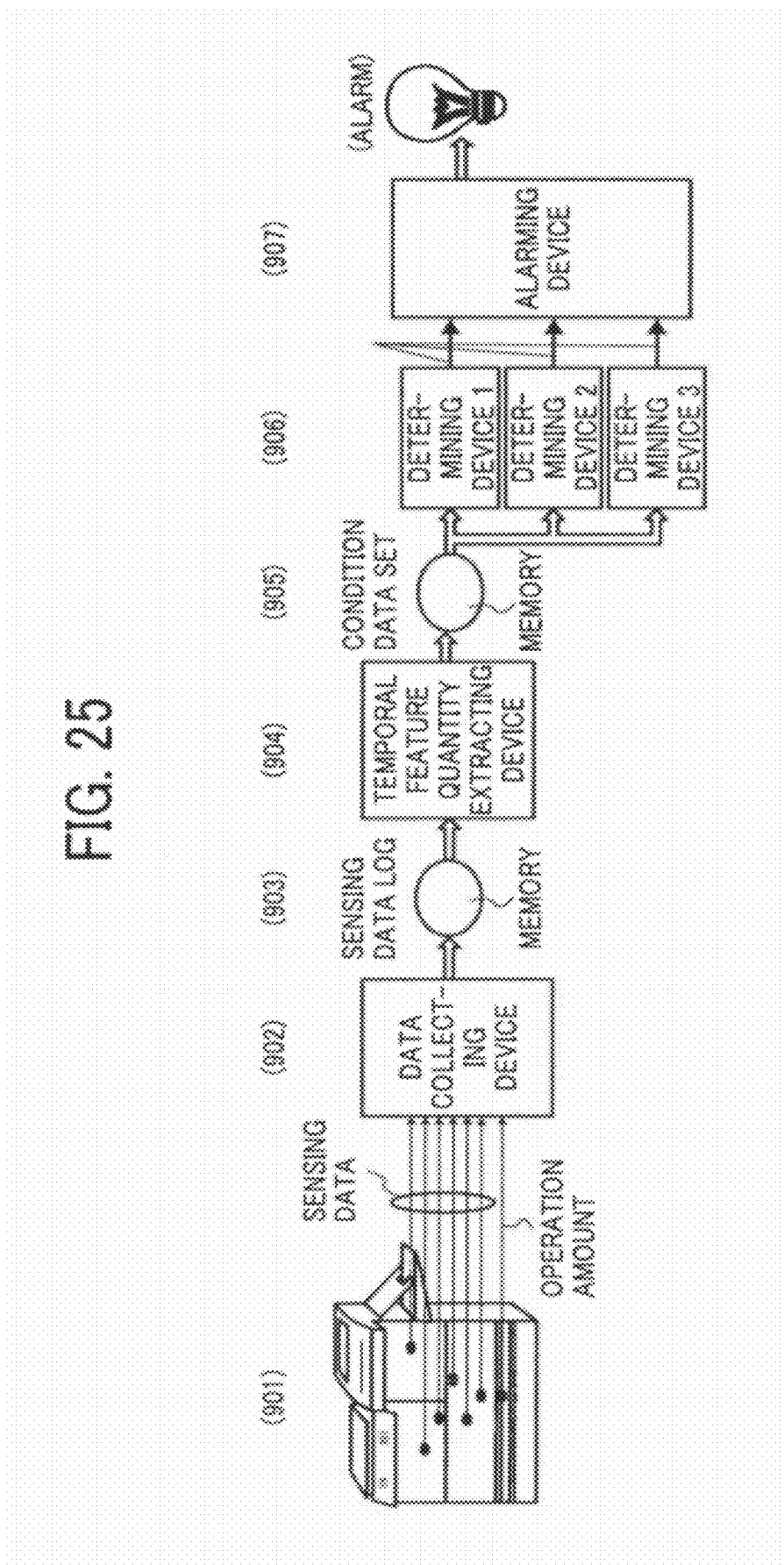
FIG. 25 is a schematic diagram of a system that implements an operation status determination method according to a fifth embodiment of the present invention.

A fifth embodiment of the present invention is described below. FIG. 25 is a schematic diagram of a maintenance sign determination system that implements an operation status determination method according to the fifth embodiment. The maintenance sign determination system includes an image forming apparatus 901, a data collecting device 902, a temporal feature amount extracting device 904, a determining device 906, and an alarming device 907. Memories 903 and 905 are recording media such as an HDD. The memory 903 stores therein sensing data and the memory 905 stores therein temporal feature amount and the like. For convenience of explanation, reference numerals assigned in the fifth embodiment are different from those in the previous embodiments.

The image forming apparatus 901 transmits a sensing signal to the data collecting device 902. Examples of the sensing signal include the correction parameters P (the exposure intensity adjustment value) and Q (the developing bias adjustment value).

Figure 26:
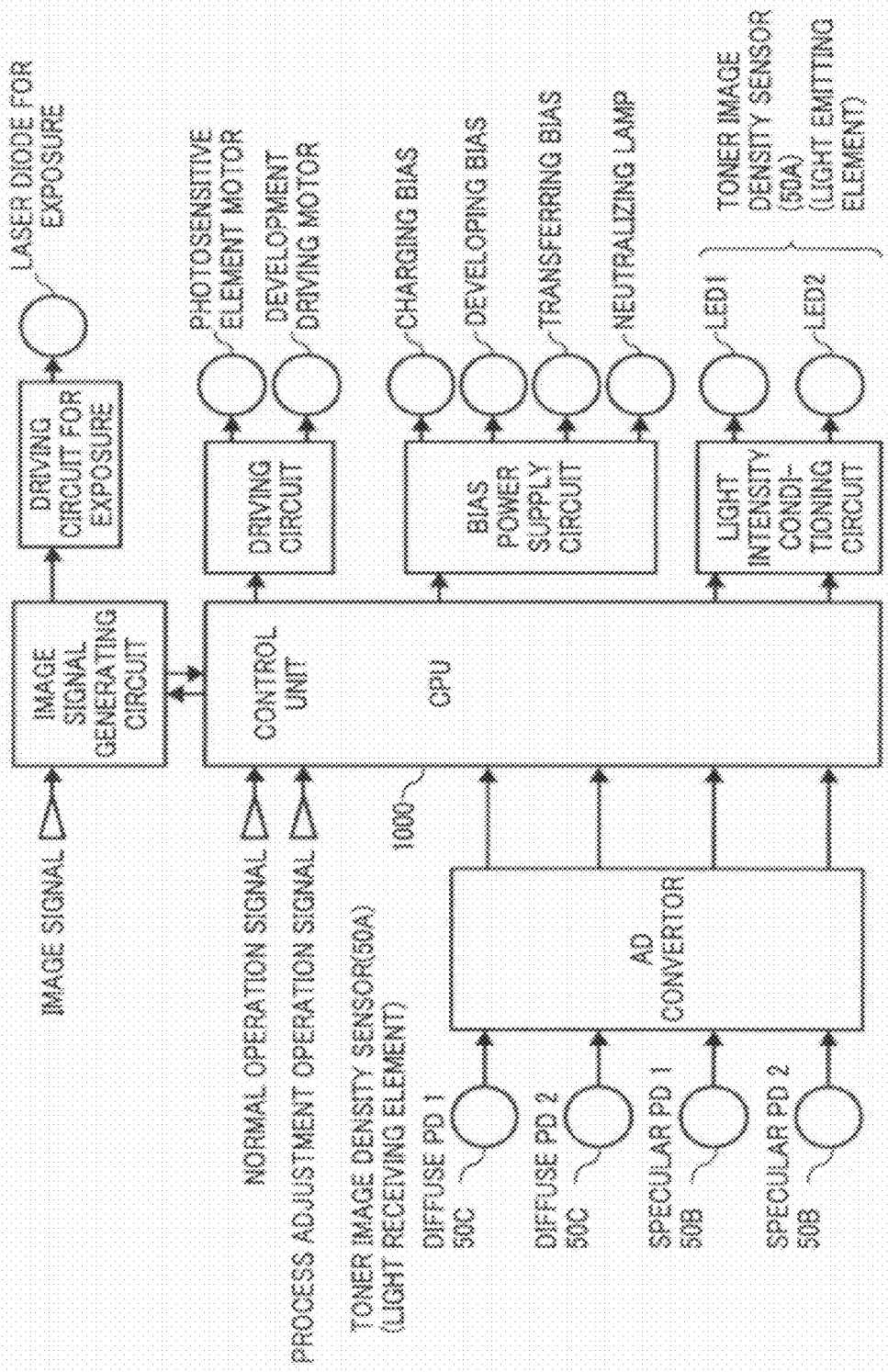
FIG. 26 is a block diagram of a control unit that implements the operation status determination method according to the fifth embodiment.

FIG. 26 is a block diagram of a control unit (CPU) 1000 and toner image density sensors 50A connected to an input side of the control unit 1000. In the configuration shown in FIG. 26, it is assumed that toner images are formed on two positions and two toner image density sensors are arranged for the two toner images. Only two specular PDs SOB and two diffuse PDs 50C are shown in FIG. 26. However, the number of PDs can be changed depending on the number of imaging devices.

The control unit 1000 activates an image signal generating circuit upon receipt of a normal operation signal from an upper control device of the image forming apparatus, and then laser diode for exposure flashes in response to an image signal. The control unit 1000 sequentially outputs bias output due to imaging processing with a driving motor, such as a photosensitive element motor, and a charging bias, so that image forming is executed. In an electrophotographic image forming apparatus, image density likely to change due to degradation over time or environmental variation. Therefore, the control unit 1000 is provided with a process control sensor such as the toner image density sensors 50A to stabilize density of an image.

The control unit 1000 performs a process control operation for updating a default stat of an image forming apparatus when the image forming apparatus is powered ON or a predetermined number of printings are performed. The process control operation runs based on determination whether a normal operation signal is received or image forming operation has been completed by the normal operation signal, in response to issuance of a process adjustment operation signal from an upper controller.

In the process control operation, correction processing is performed first by the toner image density sensors 50A. As shown in FIG. 9, the image signal generating circuit is in a state indicating that there is no image, and the control unit 1000 adjusts light intensity so that a light receiving signal from the surface of a photosensitive element is set to a predetermined value.

As a result, it is possible to precisely measure toner image density regardless of variation or change over time in a light receiving element and a light emitting element or change of the surface state of the photosensitive element over time.

Next, a particular test image, that is, toner images containing patch patterns as shown in FIG. 5B, is automatically output, and the toner image density sensors 50A optically measures density and a position of a corresponding toner image on the photosensitive element. The process control operation is the same as that described in the first embodiment, and therefore the same explanation is not repeated.

The control unit 1000 is used as a status signal extracting device and the correction parameters P and Q correspond to status signals. The data collecting device 902 records the status signal as a log in processing indicated by reference numeral 903. The temporal feature amount extracting device 904 mathematically and statistically calculates whether particular change is found compared with movement of past signals. Then, the temporal feature amount extracting device 904 generates a condition data set at the time of calculation.

For example, when density characteristics as shown in FIGS. 13A to 13D are obtained for each color, logs of the adjustment values Q are updated as shown in FIGS. 18A to 18D. At this state, an approximate derivative value dQ is obtained by dividing a difference between the latest value Q and the second latest value Q as a temporal feature amount by an elapsed time or an operation usage.

Degree of degradation of a device depends on an operation amount. Therefore, it is preferable to employ an operation time or a counter value of the number of copies as the operation usage. The operation amount is generally managed by the CPU, so that the data collecting device can records the operation amount.

The data collecting device can be formed by the control unit 1000 and a memory unit (not shown) installed in the control unit 1000. Alternatively, the data collecting device can be realized another control unit (CPU) and a memory unit connected to the control unit 1000 via a network. In the first embodiment, a management apparatus of an image forming apparatus, that is, a controller as an upper device that controls the image forming apparatus is described. However, it is possible to collect and record a log by a particular server arranged separately from the apparatus or the controller via a communication unit such as a network.

As the temporal feature amount, a regression value of signal change, a standard deviation or a maximum value of a plurality of the latest data, or a mean can be the temporal feature amount, instead of the derivative value described above. It is possible to extract features of signals in a time-series manner by using an appropriate method such as the ARIMA model. An index of an elapsed time can be a timestamp of a total operation time or a timestamp of an actually elapsed time instead of the counter value of the number of copies.

A maintenance sign is detected when a signal that is stable in a normal state moves in a particularly instable way. From this view point, a feature amount extraction method can be selected as appropriate.

Furthermore, a feature amount obtained without calculation using time-series data can be included in a condition data set.

For example, a sensing signal value as it is can be added to the condition data set. Operation data such as a timestamp of an operation time or an elapsed time used for determining a lifetime of the device can be added.

Moreover, a signal indicating that maintenance is completed can be added to a log to perform exception processing so that transitional change in the condition data set right after maintenance is not erroneously determined as a maintenance sign.

Figure 27:
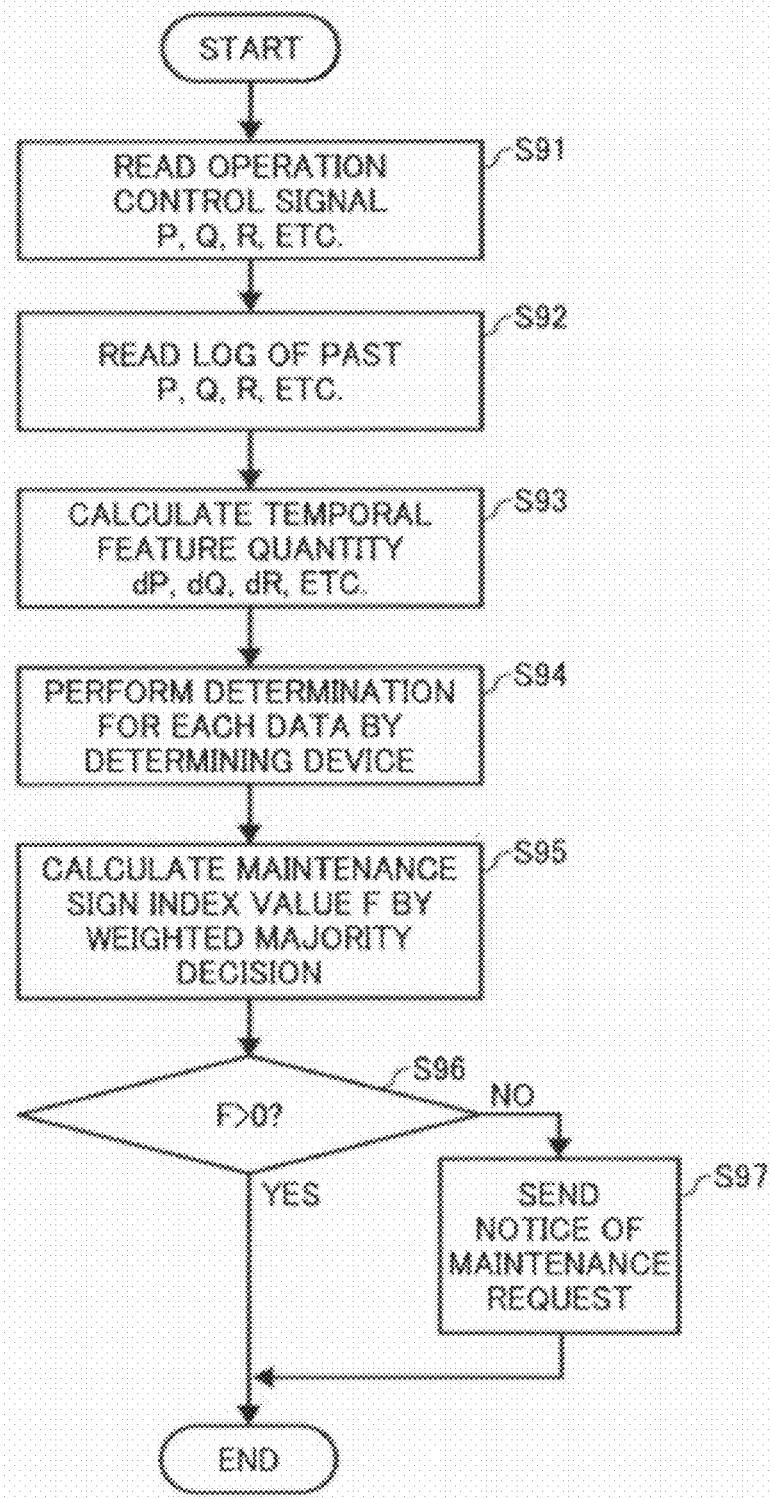
FIG. 27 is a flowchart of a processing procedure performed by the system shown in FIG. 25.
Figure 28A:
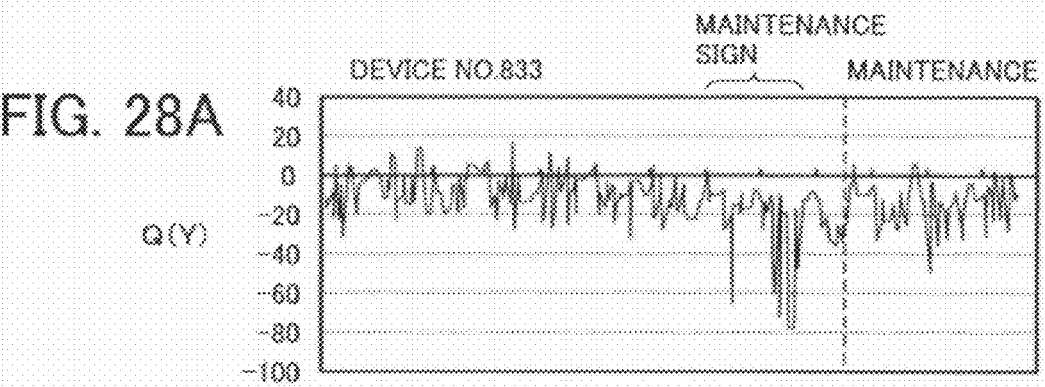
FIGS. 28A to 28D are graphs representing changes of parameters for each color when a cleaning failure occurs in the system shown in FIG. 25.
Figure 28B:
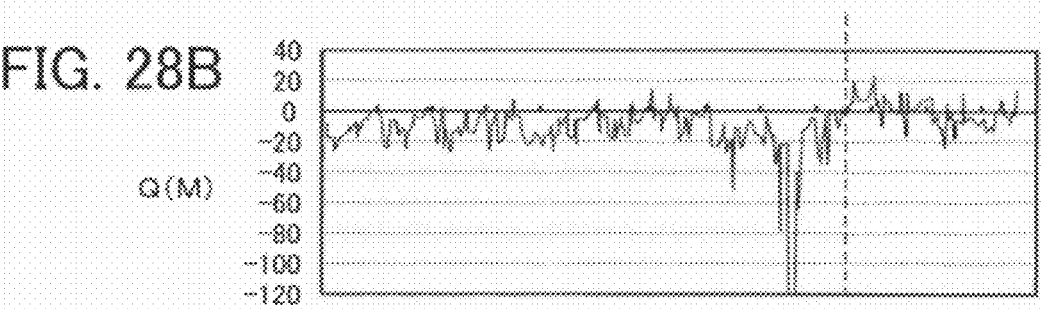
Figure 28C:
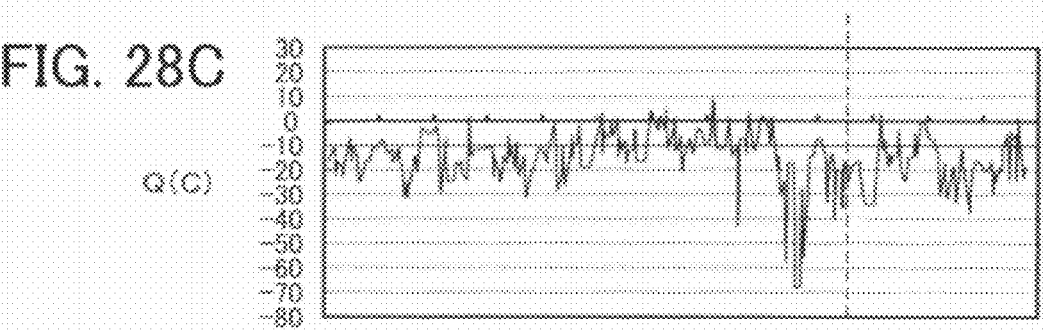
Figure 28D:
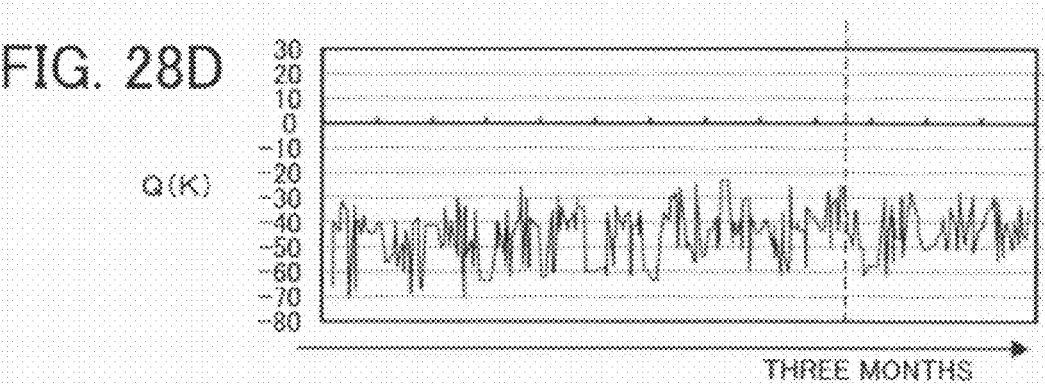
Figure 30A:
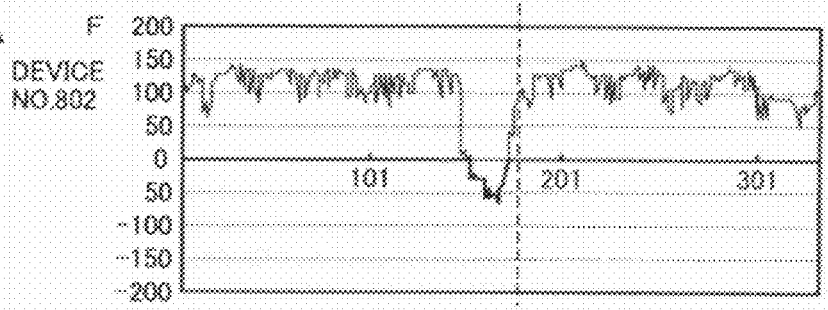
FIGS. 30A to 30E are graphs representing data obtained based on signals from a sensor shown in FIG. 26 when a failure occurs and then the failure is resolved.
Figure 30B:
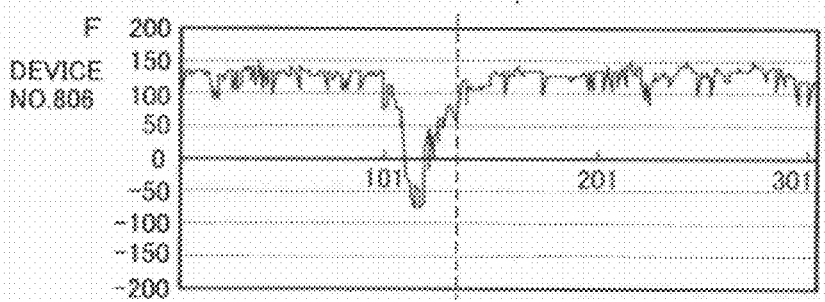
Figure 30C:
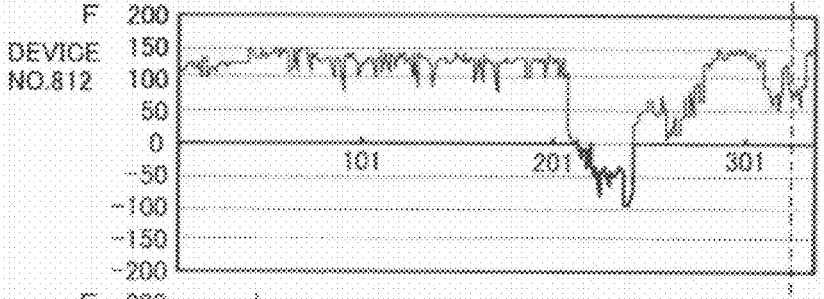
Figure 30D:
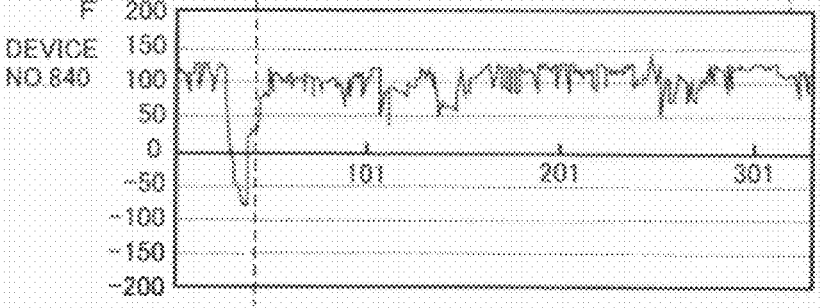
Figure 30E:
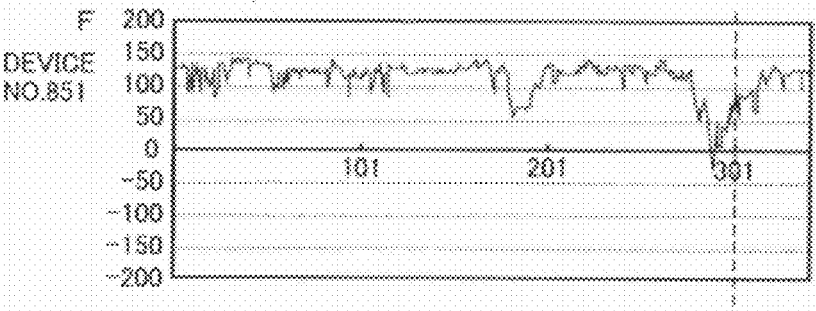

The condition data set obtained in the above manner is sent to the determining device 906. FIG. 27 is a flowchart of a processing procedure from receipt of a sensing signal to maintenance sign determination performed by the system shown in FIG. 25. In this processing, only the emission intensity adjustment value R, the developing bias adjustment value Q, the exposure light intensity adjustment value P are extracted as the feature amount.

The data collecting device 902 reads the values P, Q, R from the sensing data received from the image forming apparatus 901 (Step S91), and stores the sensing data in the memory 903. The temporal feature amount extracting device 904 reads the values P, Q, R from the past sensing data stored in the memory 903 (Step S92), and calculates temporal feature quantities dP, dQ, and dR (Step S93). The temporal feature amount is calculated such that an approximate derivative value dQ is obtained by dividing a difference between the latest value Q and the second latest value Q as a temporal feature amount by an elapsed time or an operation usage.

Degree of degradation of a device depends on an operation amount. Therefore, it is preferable to employ an operation time or a counter value of the number of copies as the operation usage. The operation amount is generally managed by the CPU, so that the data collecting device can records the operation amount.

As the temporal feature amount, a regression value of signal change, a standard deviation or a maximum value of a plurality of the latest data, or a mean can be the temporal feature amount, instead of the derivative value described above. It is possible to extract features of signals in a time-series manner by using an appropriate method such as the ARIMA model. An index of an elapsed time can be a timestamp of a total operation time or a timestamp of an actually elapsed time instead of the counter value of the number of copies. The feature amount can be obtained by using a method described in connection with FIG. 17.

The determining device 906 determines whether the condition data set (the feature amount such as dQ) indicates a normal state or a maintenance sign detected state (Step S94). That is, the determining device 906 arranged for each condition data set (the feature amount such as dQ) determines whether a device is in a normal state or in a maintenance sign detected state, and calculates the maintenance sign index value F by weighted majority decision (Step S95). When the maintenance sign index value F is larger than zero (Yes at Step S96), the determining device 906 determines that a maintenance sign is not detected, and terminates the maintenance sign determination. When the maintenance sign index value F is equal to or smaller than zero (No at Step S96), the determining device 906 determines that the maintenance sign is detected, and sends a maintenance request to a user or a service station by using the alarming device 907 (Step S97).

An expression of the maintenance sign index value F using a weighted majority calculation is described below. When a stamp determining device is used as the determining device 906, status determination is calculated in the following manner. The n number of stamp determining devices are provided for temporal feature amount calculation results C1 to Cn for the values P, Q, R, and the maintenance sign index value F using a weighted majority calculation is obtained by $$F = \sum_{i=1}^{n} \alpha i \times Outi$$

where $\alpha i$ is weight value set for each determining device.

The stamp determining device is effective because a CPU can perform calculation at an extremely high processing speed, and a desired precision can be attained by using the weighted majority decision. Therefore, it is possible to realize maintenance sign determination without increasing costs.

The stamp determining device is expressed as $$Outi = 1 (sgni \times (Ci - bi) \geq 0)$$

$$OUTi = -1 (sgni \times (Ci - bi) < 0)$$

where bi is threshold of each feature amount, and sgn is a determined positive/negative sign.

When the maintenance sign index value F obtained from the above expression is smaller than zero, it is determined that a maintenance sign is detected.

For determining a determination condition (determination of bi and sgni) and a weighted majority decision (determination of $\alpha i$) of the determining device used for the maintenance sign determination, a boosting method that contains supervised learning algorithm is effective. The boosting method is a well known art that is disclosed in, for example, "Information geometry for statistical pattern identification", Mathematical science No. 489, March 2004.

Specifically, sensing log data obtained from a normal state and another sensing log data obtained from a state in which a maintenance sign is detected are prepared. For example, sensing log data is obtained when a device is subjected to an endurance test, and when a failure occurs, a period before the failure is estimated as a maintenance sign detected period and used as the status data.

FIGS. 28A to 30E depict changes of data based on sensing log data acquired within three months when more than 10 image forming apparatuses are subjected to examination to collect and examine failures.

That is, FIGS. 28A to 28D are graphs representing changes of parameters Q(Y), Q(M), Q(C), Q(K) (values corresponding to an intercept X0 with opposite sign) for each color when a cleaning failure for black occurs in a test copier No. 833 and then the cleaning failure is resolved.

Although a large number of types of other status data were also collected and used, the status data (the developing bias adjustment value) Q is representatively described below because it largely changed. It can be seen from FIGS. 28A to 28D that the developing bias values Q(Y), Q(M), Q(C) largely change before the cleaning failure is detected.

The temporal feature amount extraction described above is performed to extract changes and a condition data set is generated.

A period corresponding to the maintenance sign detected period is labeled to −1 (the maintenance sign detected period) and the rest of the period is labeled to 1 (a normal period) based on estimation from the graph. Then, iterative learning is performed 100 times by boosting, so that reference values b1 to b100, positive/negative sign data sgn1 to sgn100, and weight values $\alpha 1$ to $\alpha 100$ are generated. FIG. 29 is a graph representing the maintenance sign determination value F obtained based on data used for learning.

It can be found from FIG. 29 that learning is appropriately performed using the labeled and supervised data, so that a weak determining unit that changes the maintenance sign index value F to a negative value only in the maintenance sign detected period and a strong determining unit that performs the weighted majority decision are generated. As described above, the operation status can be determined using image forming units for a plurality of colors.

Explanation is given on an examination result whether the determining units can obtain an appropriate result from test data that has not been used for learning with reference to FIGS. 30A to 30E. The examination is performed such that feature quantities are extracted in the above manner from the status data of five copiers (Nos. 1 to 5) in which the same failures occur. The reference numerals shown on the left side of the graph are the identification numbers of test copiers.

It can be found from FIGS. 30A to 30E that the maintenance sign index values F obtained based on the reference values b and the weight values $\alpha$ changed to negative values in a desired manner only in the maintenance sign detected periods before failures occur. Thus, it is confirmed that the maintenance sign can be determined in a desired manner.

Thus, when a status determination method that uses the temporal feature extracting device and the determining device is performed, it is possible to recognize a maintenance sign detected state based on the maintenance sign index value F as a result of the maintenance sign determination. Therefore, a failure, such as an undesired longitudinal line, can be prevented by replacing a target unit based on the maintenance sign before the failure actually occurs.

A status change before a failure actually occurs is generally detected not only in the image forming apparatus but in various devices that include an autonomous control unit such as a sensor. Therefore, the present invention can be applied to various devices to prevent losses caused by a failure in the devices. Furthermore, it is possible to detect a maintenances sign that indicates future problems with desired precision, so that a downtime caused by failures can be shortened.

As described above, according to the operation status determination method according to the fifth embodiment, whether a device is in a normal state, a failure detected state, or a maintenance sign detected state is statistically and mathematically determined based not on a distance in a space generated by status data groups in different units. That is, a state of the device is determined by using a sub determining unit provided for each status data for performing predetermination in consideration with physical difference such as units, and then the state is detected based on the weighted majority decision on results from the predetermination. Therefore, homogenization of the space generated by status data groups in different units is not necessary, and processing can be performed based on determination of appropriate weighting coefficients for performing the majority operation on the learning data. Thus, the state of the device can be determined only by a quantitative calculation method. The determination is performed after the temporal feature amount is calculated, so that various normal states are present due to different environments or different operation conditions. However, determination is performed based on whether temporally particular change occurs, so that it is possible to distinguish a status change due to different use conditions from a failure or a maintenance sign detected stated from among various normal states. Thus, it is possible to reliably perform the determination.

As described above, ineffective operation performed without recognizing a failure can be prevented, downtime from occurrence of a failure to recovery of the failure can be reduced, and planned maintenance can be performed. Thus, it is possible to save time and resources necessary for maintenance.

Furthermore, according to the fifth embodiment, an error determination rate is not repeatedly and uniformly calculated on all data every time the weight values are updated A calculation is performed using the weighted error determination rate only on data with which determination is failed. Therefore, processing load on a calculation can be reduced and resolve a problem due to an enormously large amount of calculation.

Moreover, the stamp determining device is employed that compares the feature amount with a threshold. Therefore, determination calculation can be performed in a simple manner. In addition, determination is performed with desired precision by using the weighted majority decision, so that relatively small hardware resources, such as a CPU or a memory, can obtain a determination result in relatively short time. Thus, it is possible to provide a cost effective method.

Furthermore, the operation status determination method according to the fifth embodiment can be implemented by an electrophotographic image forming apparatus that includes complicated processing such as charging, developing, transferring, and cleaning, so that it is possible to promptly detect a failure or a maintenance sign with desired precision and without increase of costs. As a result, it is possible to prevent occurrence of a failure, take necessary actions for troubleshooting, or perform planed maintenance. Thus, it is possible to loss caused by necessary maintenance can be reduced.

Moreover, in the image forming apparatus with the operation status determination method, it is possible to promptly detect a failure or a maintenance sign in full detail, with desired precision, and without increase of costs by using a sensor used for optimal operation of each processing and status value obtained from the sensor. Therefore, it is possible to prevent occurrence of a failure, take necessary actions for troubleshooting, or perform planed maintenance. Thus, it is possible to loss caused by necessary maintenance can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management apparatus, comprising:
    a data collecting unit that receives a plurality of types of status data from an image forming apparatus and stores the status data in a status database;
    a data generating unit that generates a plurality of types of target data for determining a maintenance sign, based on the status data;
    a first determining unit that determines a plurality of sign values based on whether each of the status data exceeds a corresponding predetermined reference value, each sign value being either a first value or a second value, wherein the first value is larger than the second value, and the first determining unit determines that the sign value is the first value when the status data exceeds the corresponding predetermined reference value and that the sign value is the second value when the status data does not exceed the corresponding predetermined reference value; and
    a second determining unit that performs weighted majority decision by multiplying the sign values by a corresponding weight value set for each of the status data and summing results of the multiplying to obtain a maintenance sign index value, and determines that there is a maintenance sign when the maintenance sign index value is less than a predetermined value.

2. The management apparatus according to claim 1, wherein
    the status data is one of a control parameter value that determines an imaging characteristic, detection data detected by a status sensor, and evaluation data generated based on the detection data, and
    the target data is at least one of the status data and a feature amount generated based on the status data.

3. The management apparatus according to claim 1, wherein the data generating unit includes a feature extracting unit that generates temporal target data indicating a temporal transition of the status data based on a predetermined number of pieces of status data selected backwards by time from temporally latest status data.

4. The management apparatus according to claim 1, further comprising a plurality of maintenance sign determining units each including the first determining unit and the second determining unit, wherein each of the maintenance sign determining units sequentially determines whether there is a maintenance sign using corresponding different status data of the plurality of types of status data.

5. The management apparatus according to claim 1, further comprising a plurality of maintenance sign determining units each including the first determining unit and the second determining unit, wherein
the maintenance sign determining units determine whether there is a maintenance sign in a parallel manner using corresponding different status data of the plurality of types of status data.

6. The management apparatus according to claim 1, further comprising a converting unit that converts a determination result from the second determining unit, which indicates that there is a maintenance sign, into output data associated with the maintenance sign of the image forming apparatus.

7. The management apparatus according to claim 6, further comprising a notifying unit that outputs a notice corresponding to the output data.

8. The management apparatus according to claim 1, wherein when the status data received from the image forming apparatus and stored in the status database contains completed status data that is status data indicating that a maintenance of the image forming apparatus is completed,
the data generating unit suspends generating the target data corresponding to the completed status data, and
the first determining unit determines that there is no maintenance sign with the status data.

9. The management apparatus according to claim 1, further comprising a first updating unit that updates the reference value of the status data.

10. The management apparatus according to claim 1, further comprising a second updating unit that updates the weight value of the status data.

11. A management system comprising:
the management apparatus according to claim 1; and
an image forming apparatus that transmits the status data to the management apparatus, wherein
when a failure occurs, the image forming apparatus transmits a notice indicating the failure to the maintenance apparatus, and
upon receiving the notice from the image forming apparatus, the management apparatus updates the reference value and the weight value to a new reference value and a new weight value, respectively, based on the status data stored in the status database.

12. The management system according to claim 11, wherein
a plurality of the image forming apparatuses are provided, and
the management apparatus updates the reference value and the weight value to a new reference value and a new weight value, respectively, based on status data of a group of image forming apparatuses of same model.

13. A management system comprising:
the management apparatus according to claim 1; and
an image forming apparatus that transmits the status data to the management apparatus, wherein
when a failure occurs, the image forming apparatus transmits a notice indicating the failure to the maintenance apparatus, and
the management apparatus generates an extra first determining unit and an extra second determining unit to determine whether there is a maintenance sign based on the status data stored in the status database in response to the notice from the image forming apparatus, and further determines whether there is a maintenance sign by using the extra first determining unit and the extra second determining unit.

14. A management system comprising:
the management apparatus according to claim 1; and
an image forming apparatus that transmits the status data to the management apparatus, wherein
the image forming apparatus further transmits other types of status data, other than the status data, to the maintenance apparatus and a notice indicating a failure to the maintenance apparatus when a failure occurs, and
the management apparatus further stores the other types of the status data in the status database, generates an extra first determining unit and an extra second determining unit to determine whether there is a maintenance sign based on the status data stored in the status database upon receiving the notice from the image forming apparatus, and determines whether there is a maintenance sign by using the extra first determining unit and the extra second determining unit.

15. The management system according to claim 11, wherein
a plurality of the image forming apparatuses are provided, and
the management apparatus stores status data transmitted from the image forming apparatus in a status database for each of the image forming apparatuses, and determines whether there is a maintenance sign for each of the image forming apparatuses.

16. A management apparatus, comprising:
a data collecting unit that receives a plurality of types of status data from an image forming apparatus and stores the status data in a status database;
a data generating unit that generates a plurality of types of target data for determining a maintenance sign, based on the status data, the data generating unit including a feature extracting unit that generates temporal target data indicating a temporal transition of the status data based on a predetermined number of pieces of status data selected backwards by time from temporally latest status data;
a first determining unit that determines a plurality of sign values based on whether each of the status data exceeds a corresponding predetermined reference value, each sign value being either a first value or a second value, wherein the first value is larger than the second value, and the first determining unit determines that the sign value is the first value when the status data exceeds the corresponding predetermined reference value and that the sign value is the second value when the status data does not exceed the corresponding predetermined reference value; and
a second determining unit that performs weighted majority decision by multiplying the sign values by a corresponding weight value set for each of the status data and summing results of the multiplying to obtain a maintenance sign index value, and determines that there is a maintenance sign when the maintenance sign index value is less than a predetermined value, wherein
the image forming apparatus includes
a photosensitive element,
a charging unit that charges a surface of the photosensitive element,
an exposing unit that applies a light on the surface of the photosensitive element charged by the charging unit to form an electrostatic latent image, a developing unit that develops the electrostatic latent image formed on the photosensitive element with toner, to form a toner image, a transferring unit that transfers the toner image formed on the photosensitive element onto a recording sheet via an intermediate transfer member, an optical sensor that applies a first light onto a surface of the intermediate transfer member and detects density of the toner image on the intermediate transfer member, an intensity adjusting unit that adjusts light intensity of a reflected light of the first light to a reference level, and a density adjusting unit that adjusts density of a toner image of a test pattern formed on the intermediate transfer member by adjusting a developing bias of the developing unit and exposure intensity of the exposing unit based on a value detected by the optical sensor, the status data contains at least one of a first physical parameter indicative of a result of adjustment of light intensity by the optical sensor and a second physical parameter indicative of a result of adjustment of density by the density adjusting unit, the feature extracting unit generates the temporal target data for each of the first physical parameter and the second physical parameter, the first determining unit makes a determination on each of the first physical parameter and the second physical parameter, and the second determining unit performs weighted majority decision and makes a determination based on the first physical parameter and the second physical parameter.

17. An operation status determination method, comprising:

extracting a plurality of status signals based on an output of at least one sensor;

calculating, based on previously stored status signals corresponding to values of the status signals at an earlier time, a temporal feature amount of each of the status signals;

generating a determining device for each temporal feature amount; and determining an operation status of a device by performing weighted majority decision on a determination result from the determining device;

wherein the determining step includes determining a plurality of sign values based on whether each of the status signals exceeds a corresponding predetermined reference value, each sign value being either a first value or a second value, wherein the first value is larger than the second value, and the determining step determines that the sign value is the first value when the corresponding status signal exceeds the corresponding predetermined reference value and that the sign value is the second value when the corresponding status signal does not exceed the corresponding predetermined reference value; and performing weighted majority decision by multiplying the sign values by a corresponding weight value set for each of the status signals and summing results of the multiplying to obtain a maintenance sign index value, and determining that there is a maintenance sign when the maintenance sign index value is less than a predetermined value.

18. The operation status determination method according to claim 17, further comprising:

calculating including generating the determining device and calculating a weight value used for the weighted majority decision by using a learning algorithm;

selecting a determining device that minimizes a weighted error determination rate every time the weight value is updated; and determining a status of the device by performing the weighted majority decision on all selected determining devices after a predetermined number of learning is repeated.

19. The operation status determination method according to claim 17, wherein the determining device is a stamp determining device that compares data with a predetermined threshold.

20. An image forming apparatus that implements the operation status determination method according to claim 17.

* * * * *